(12) United States Patent
Rizzi

(10) Patent No.: US 10,334,002 B2
(45) Date of Patent: Jun. 25, 2019

(54) COMMUNICATION DEVICE AND METHOD

(71) Applicant: Edoardo Rizzi, Longmont, CO (US)

(72) Inventor: Edoardo Rizzi, Longmont, CO (US)

( * ) Notice: Subject to any disclaimer, the term of this patent is extended or adjusted under 35 U.S.C. 154(b) by 0 days.

(21) Appl. No.: 15/750,091

(22) PCT Filed: Sep. 21, 2016

(86) PCT No.: PCT/US2016/052901
§ 371 (c)(1),
(2) Date: Feb. 2, 2018

(87) PCT Pub. No.: WO2017/053440
PCT Pub. Date: Mar. 30, 2017

(65) Prior Publication Data
US 2018/0227341 A1 Aug. 9, 2018

Related U.S. Application Data

(60) Provisional application No. 62/222,306, filed on Sep. 23, 2015.

(51) Int. Cl.
*H04N 7/15* (2006.01)
*G06Q 10/10* (2012.01)
*H04L 12/58* (2006.01)
*H04L 29/06* (2006.01)
*G06F 3/0488* (2013.01)

(52) U.S. Cl.
CPC ......... *H04L 65/403* (2013.01); *G06Q 10/101* (2013.01); *H04L 51/046* (2013.01); *H04L 51/10* (2013.01); *H04L 65/1089* (2013.01); *H04L 65/4015* (2013.01); *H04N 7/155* (2013.01); *G06F 3/04883* (2013.01)

(58) Field of Classification Search
CPC combination set(s) only.
See application file for complete search history.

(56) References Cited

U.S. PATENT DOCUMENTS

| | | |
|---|---|---|
| 8,296,437 B2 | 10/2012 | Pankratov |
| 8,520,024 B2 | 8/2013 | Guthrie et al. |
| 8,539,028 B2 | 9/2013 | Anka |
| 8,782,168 B2 | 7/2014 | Anka |
| 8,862,684 B2 | 10/2014 | Tyukasz et al. |
| 8,886,724 B2 | 11/2014 | Anka |
| 8,929,546 B2 | 1/2015 | Vukoszavlyev et al. |
| 9,020,203 B2 | 4/2015 | Dillavou et al. |

(Continued)

*Primary Examiner* — Phung-Hoang J Nguyen
(74) *Attorney, Agent, or Firm* — Thomas J. Lavan

(57) ABSTRACT

A device is provided. The device includes a processor, a screen, and a memory including an application configured to record, transmit, receive, play, display, and group visual messages. Visual messages include a video, a snapshot, a reference to the video or snapshot, a drawing, audio content, a reference to the drawing or audio content, and a timestamp, a time reference within the video, a Global Positioning System coordinate, a user ID, a participant ID, or a reference to the timestamp, GPS coordinate, user ID, and participant ID. The application displays and maintains drawings on the screen for an amount of time not related to a duration of a video. The video and snapshot are recorded as part of an original video or snapshot visual message, and the drawing and audio content are not embedded in the video or the snapshot and are recorded as part of the visual message.

51 Claims, 27 Drawing Sheets

(56) References Cited

U.S. PATENT DOCUMENTS

| | | |
|---|---|---|
| 2007/0157303 A1 | 7/2007 | Pankratov |
| 2008/0154908 A1* | 6/2008 | Datar ................. G06F 17/30817 |
| 2009/0210778 A1* | 8/2009 | Kulas ................... G06Q 10/107 |
| | | 715/201 |
| 2009/0297118 A1* | 12/2009 | Fink .................... G06F 17/3082 |
| | | 386/278 |
| 2010/0005180 A1 | 1/2010 | Tyukasz et al. |
| 2010/0241736 A1 | 9/2010 | Anka |
| 2012/0324368 A1 | 12/2012 | Putz et al. |
| 2013/0111068 A1 | 5/2013 | Tyukasz et al. |
| 2013/0111217 A1 | 5/2013 | Kopasz et al. |
| 2013/0238749 A1 | 9/2013 | Anka |
| 2013/0254330 A1 | 9/2013 | Maylander et al. |
| 2013/0308827 A1 | 11/2013 | Dillavou et al. |
| 2014/0176533 A1 | 6/2014 | Dillavou et al. |
| 2015/0019260 A1 | 1/2015 | Samani et al. |
| 2015/0172599 A1* | 6/2015 | Caldwell ................. G06T 13/40 |
| | | 348/14.03 |

\* cited by examiner

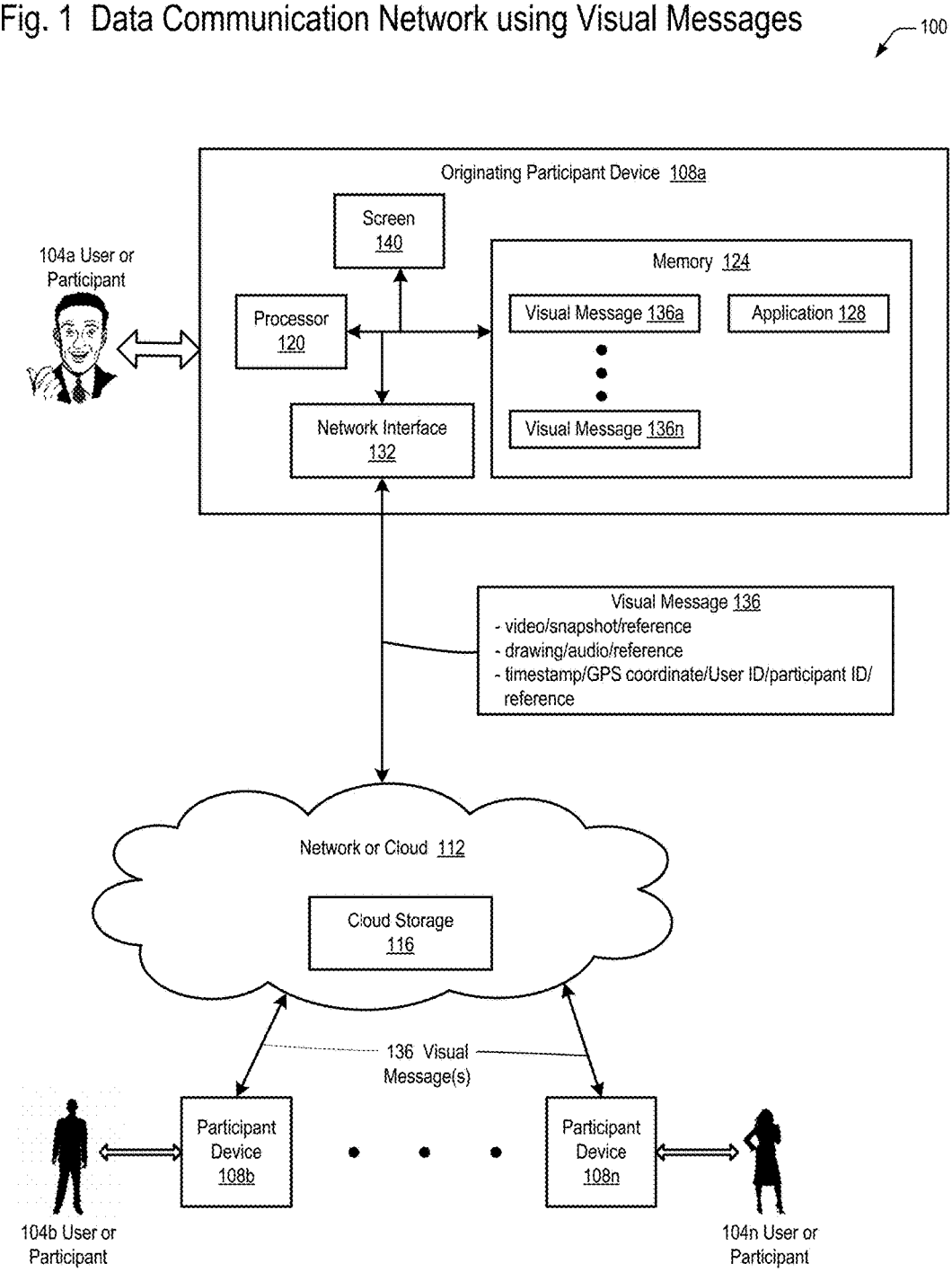

Fig. 2 Device Functional Elements
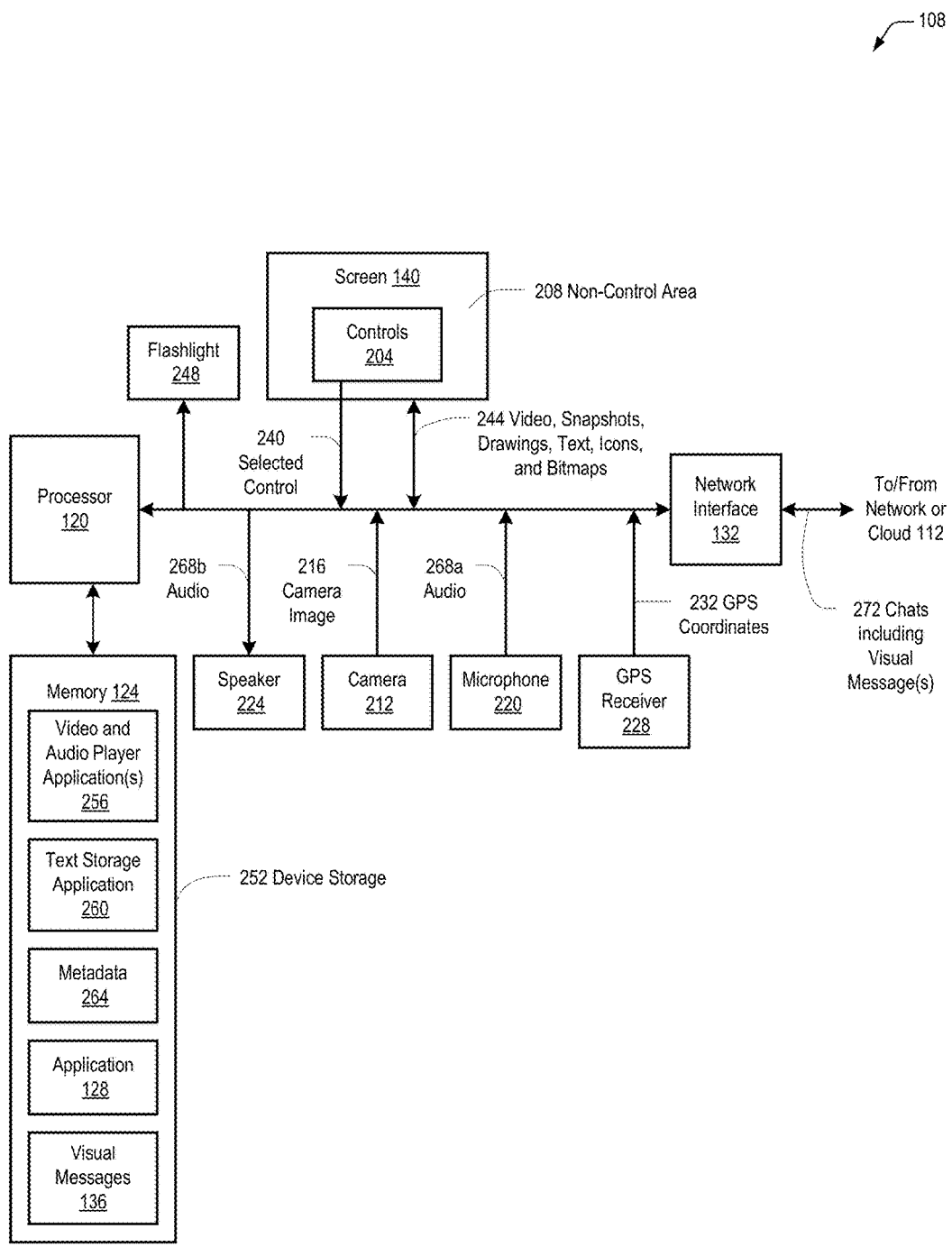

Fig. 3 Metadata
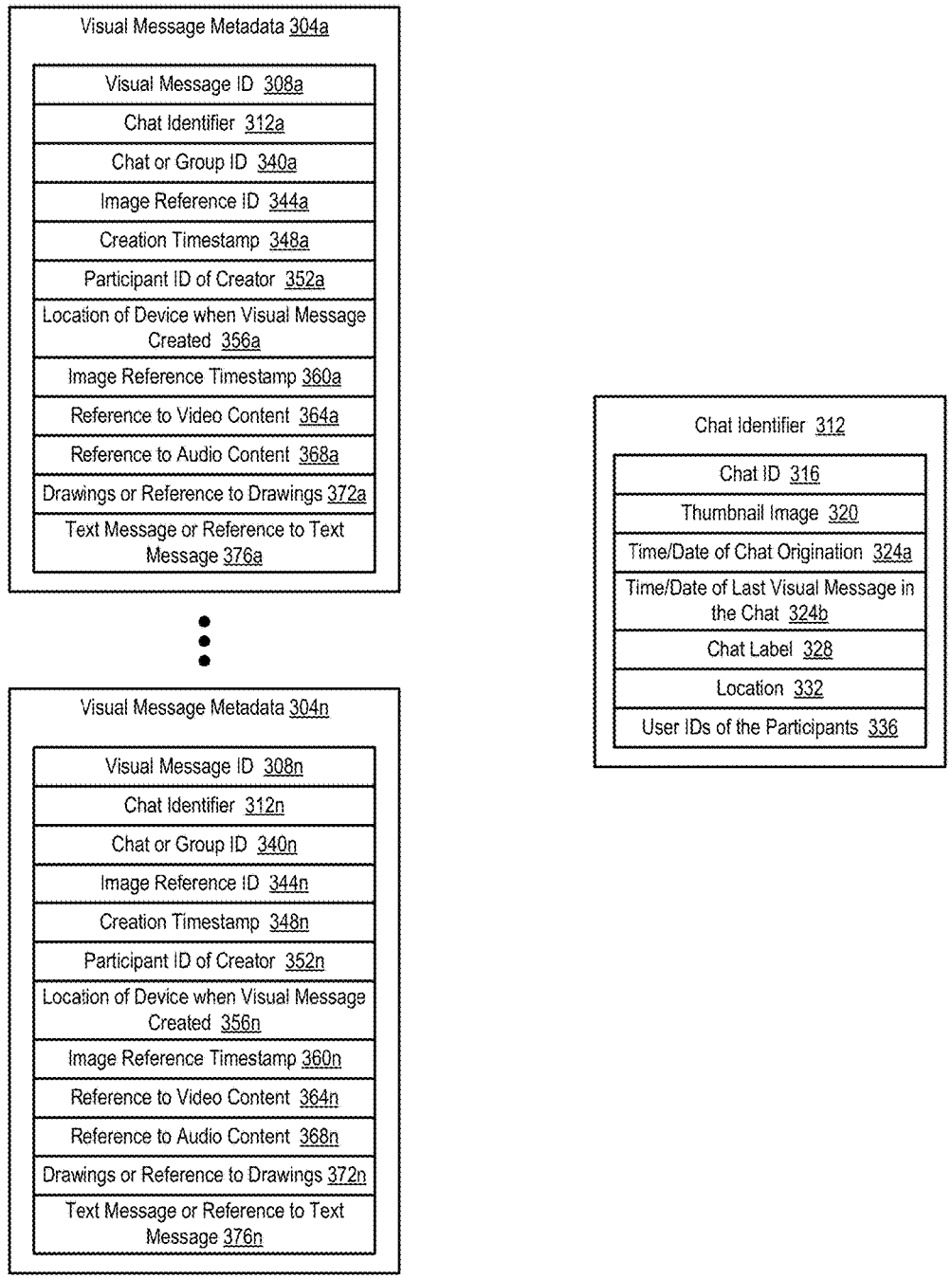

Fig. 4A  Content for a Visual Message with Original Video Content
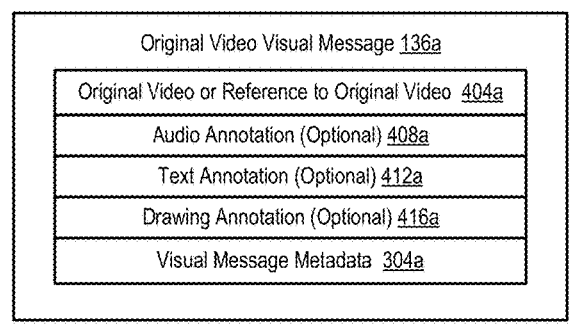
Fig. 4B  Content for a Visual Message with Original Snapshot Content
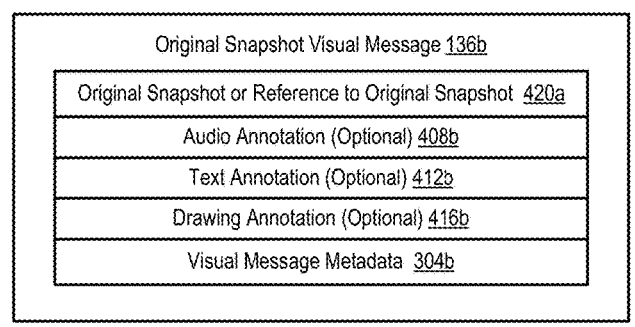

Fig. 4C  Content for a Visual Message with Non-Original Snapshot Content
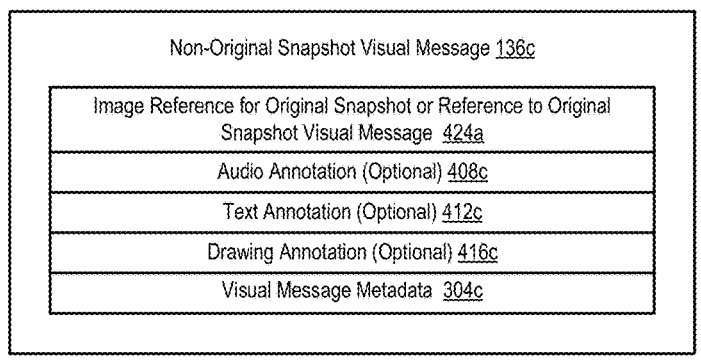
Fig. 4D  Content for a Visual Message with Non-Original Video Content
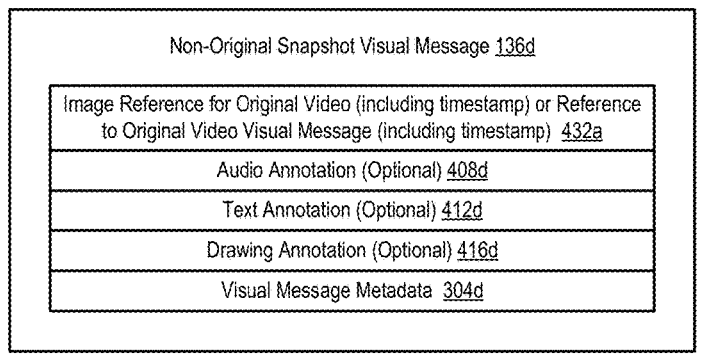

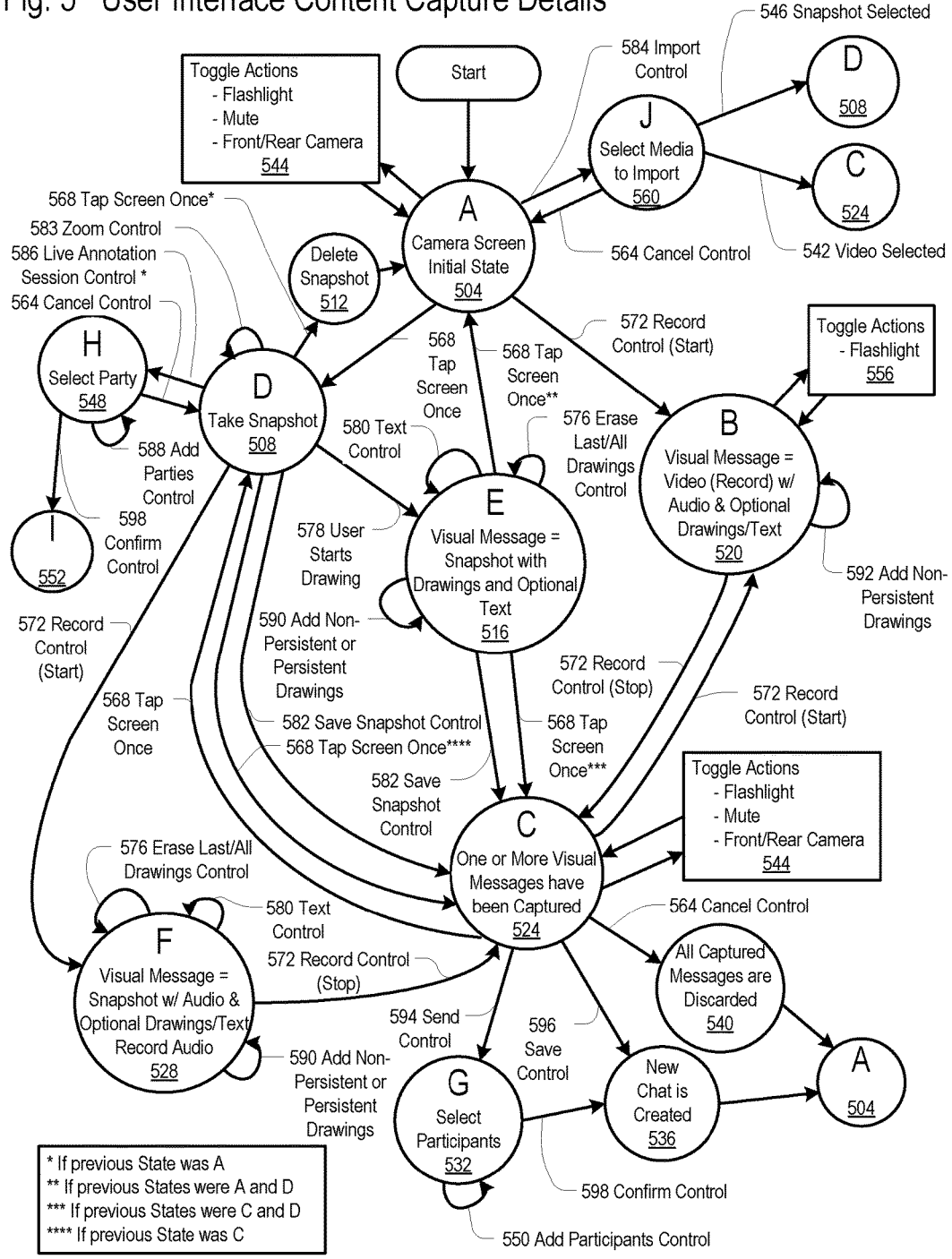
Fig. 5 User Interface Content Capture Details

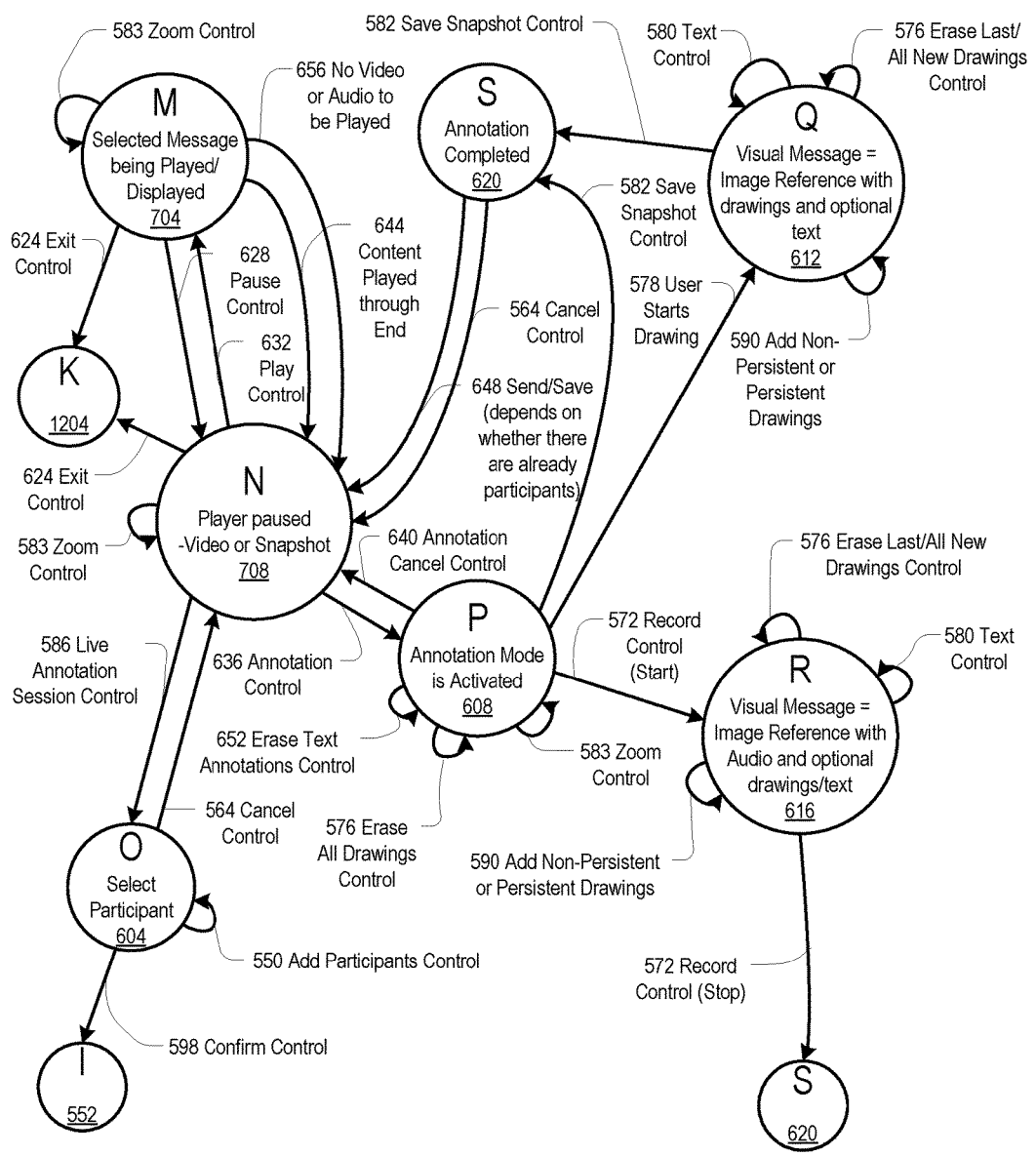
Fig. 6 User Interface Annotation of Existing Visual Message Details

Fig. 7 User Interface Media Player Details
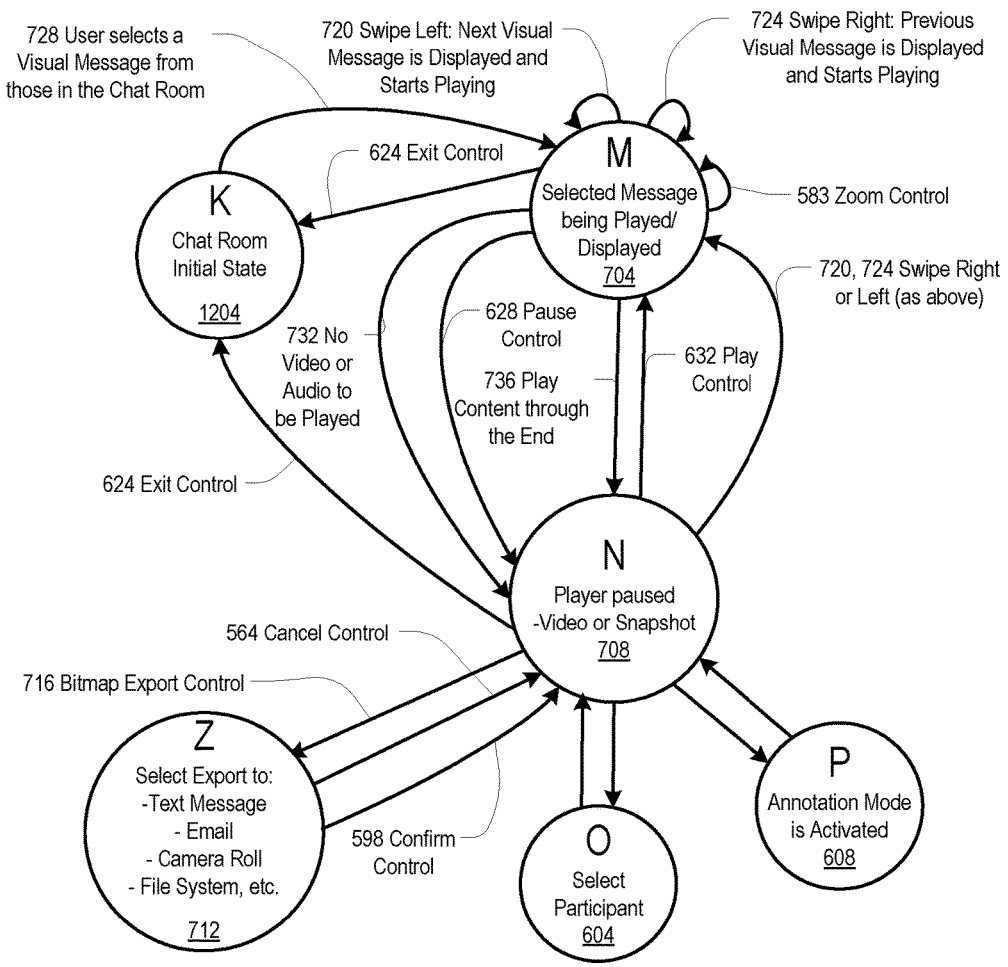

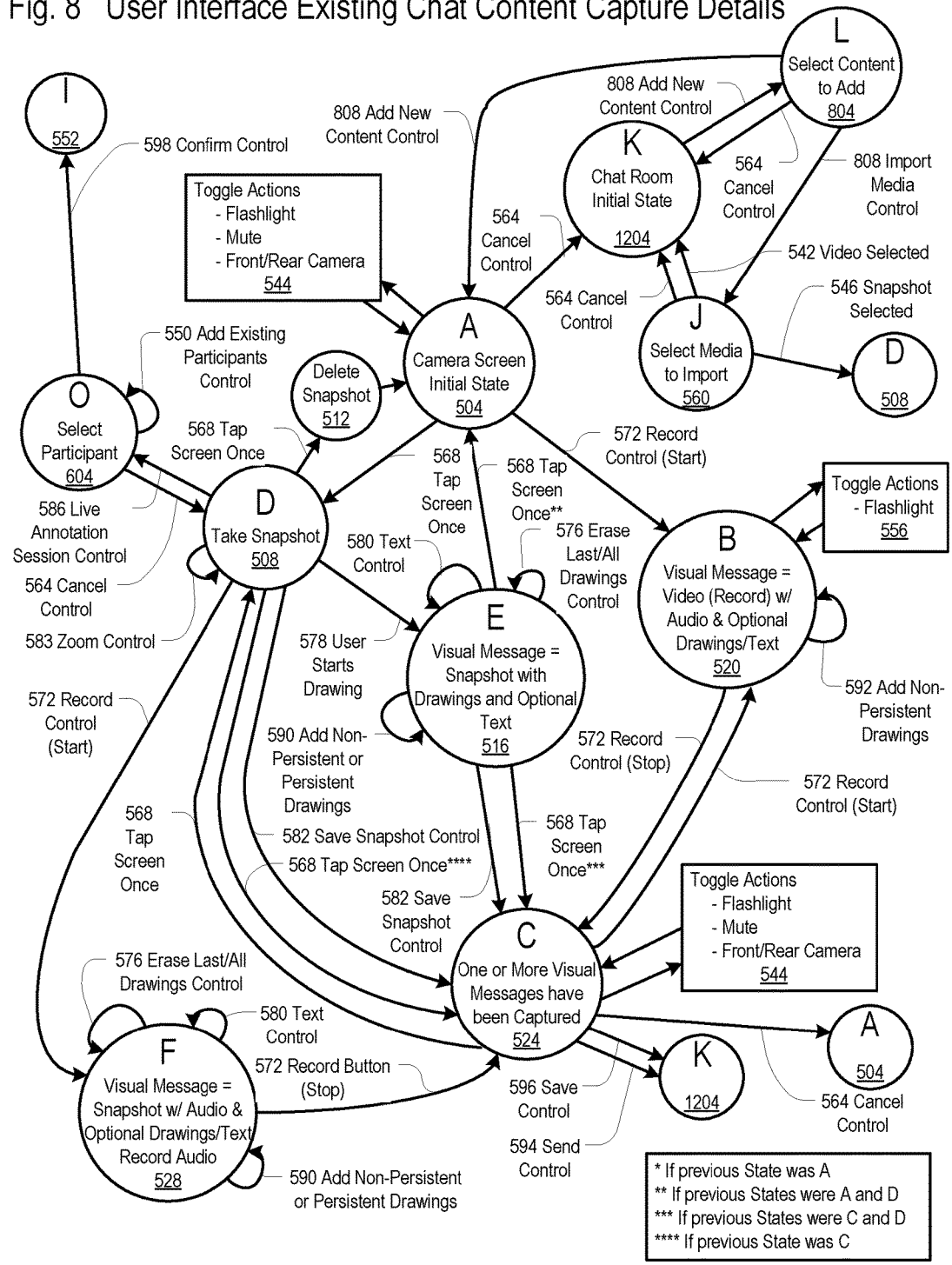
Fig. 8 User Interface Existing Chat Content Capture Details

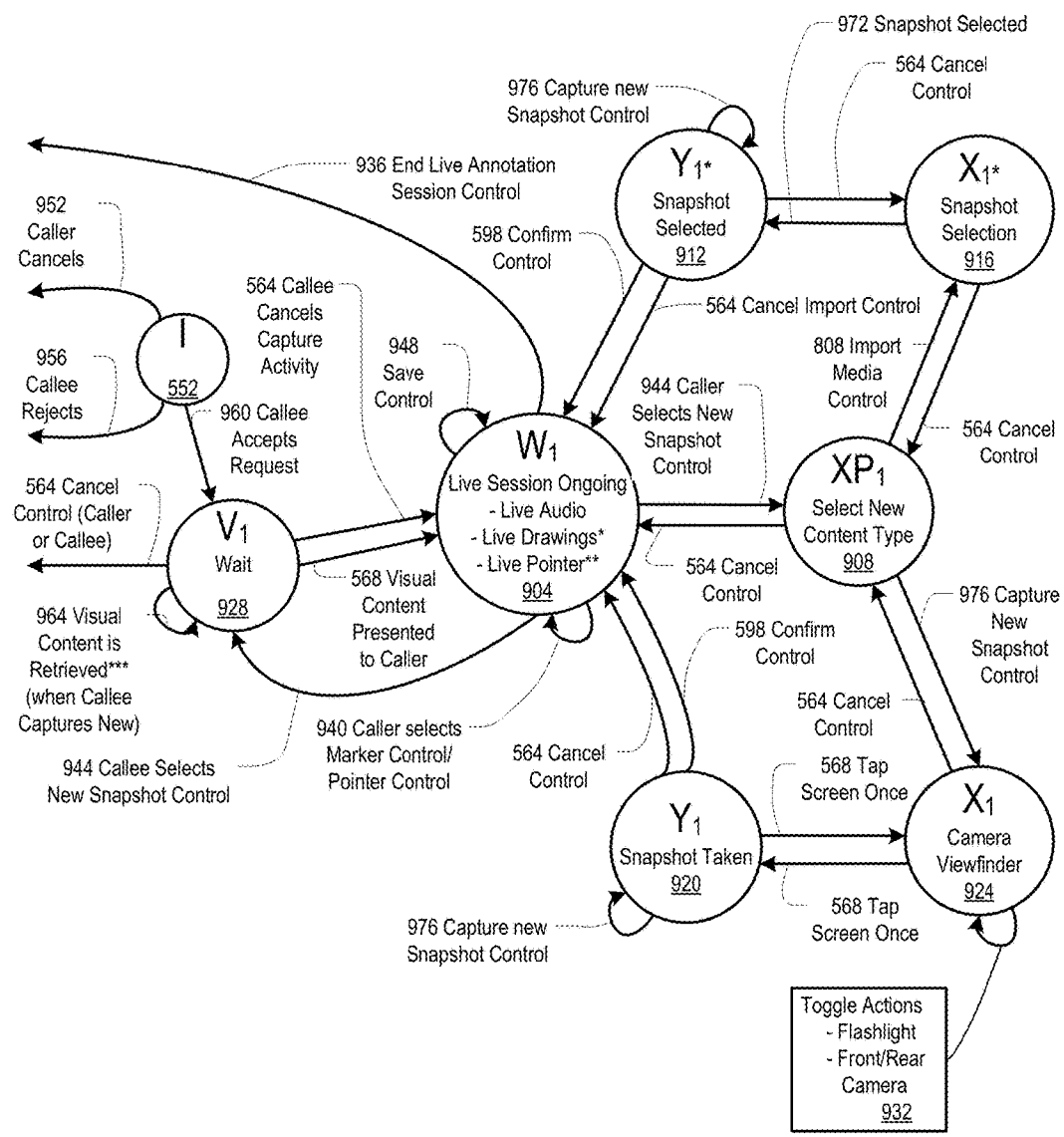
Fig. 9  User Interface Live Annotation Details for Caller

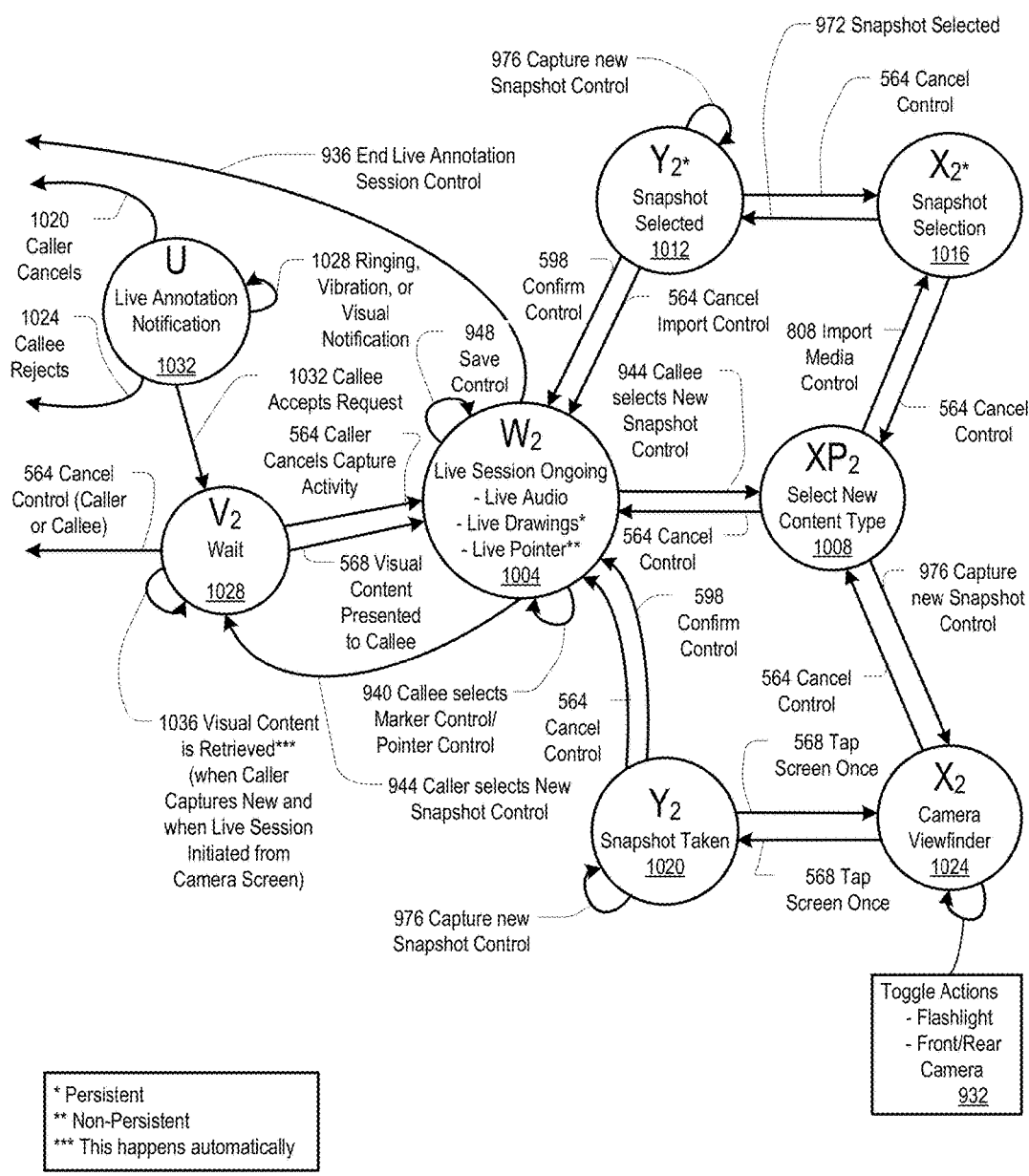
Fig. 10 User Interface Live Annotation Details for Callee

Fig. 11  User Interface Chats Screen Details
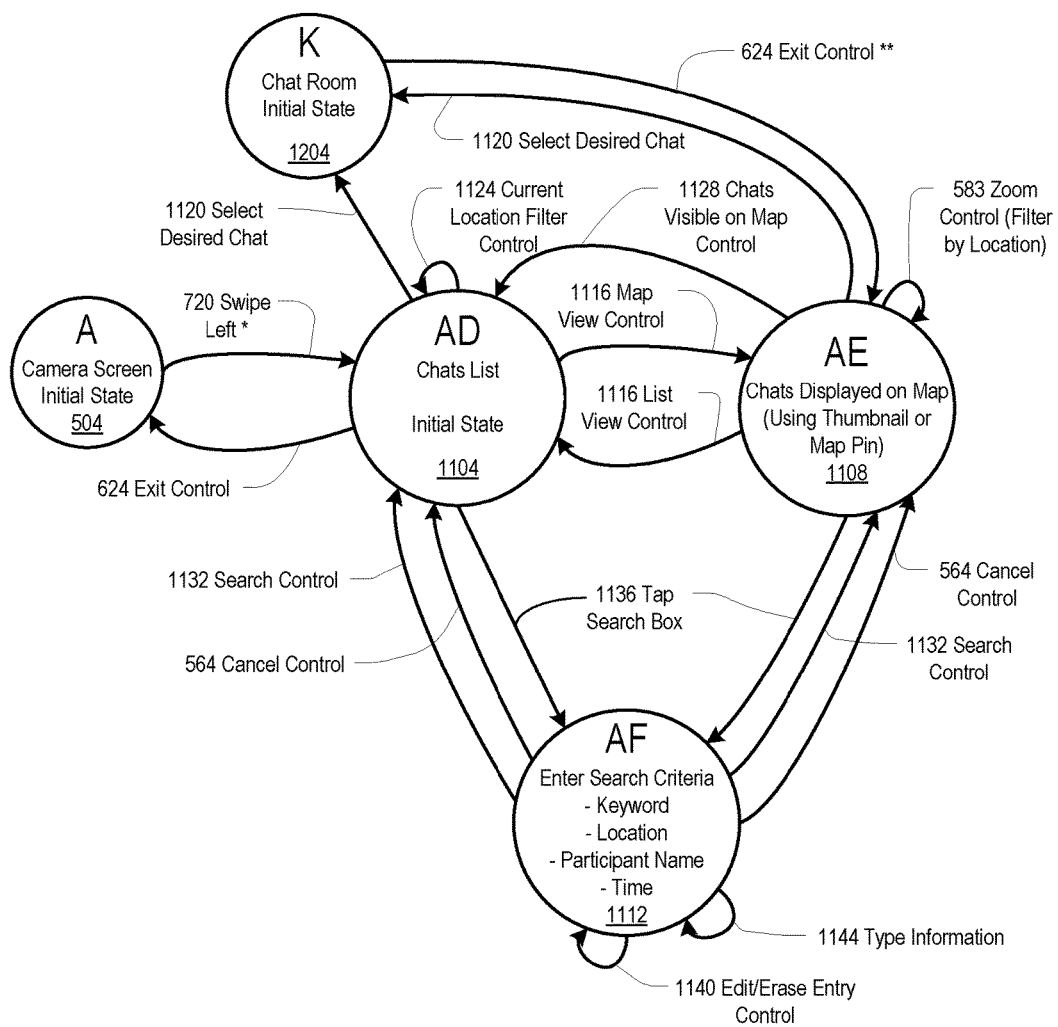

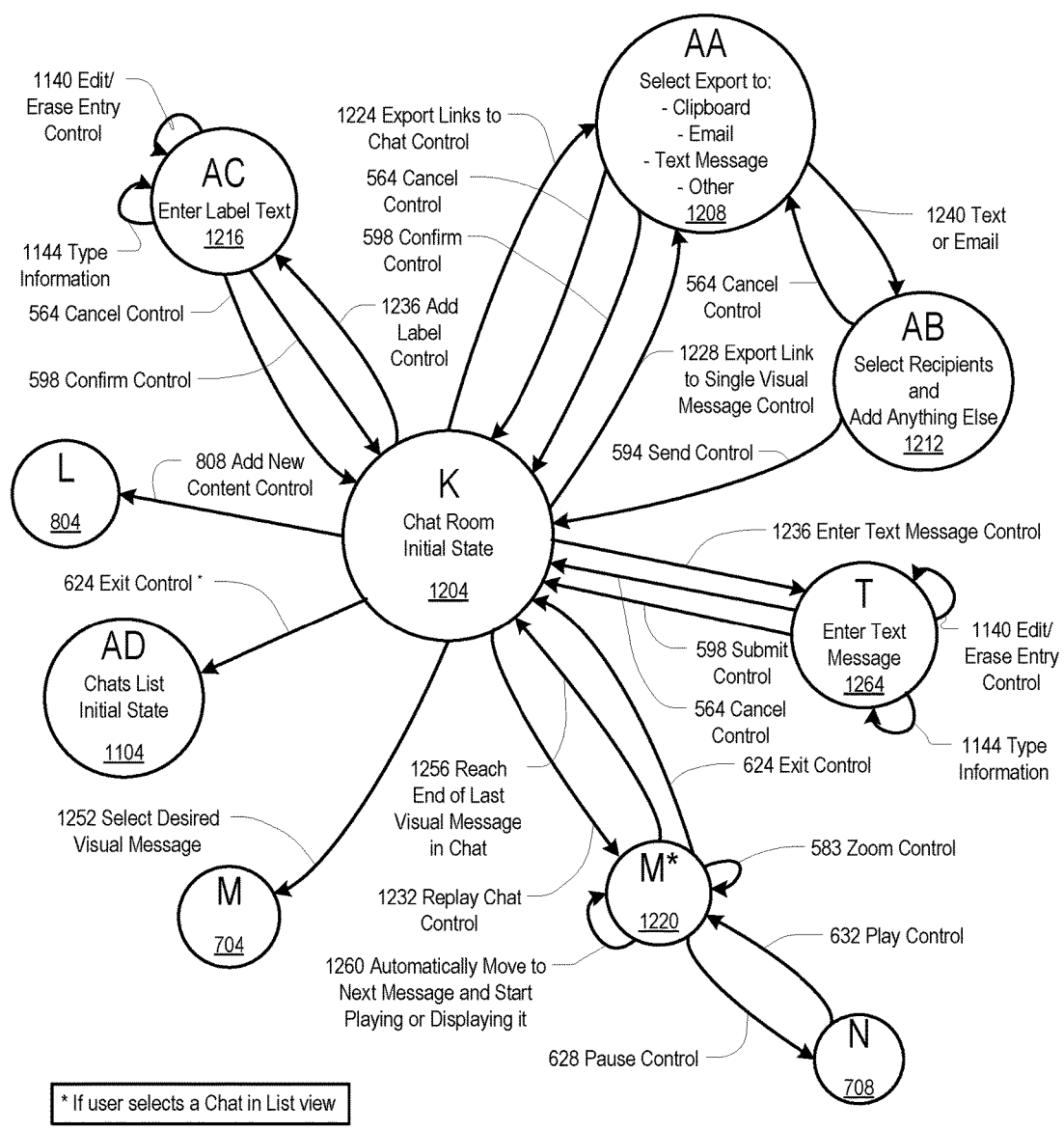
Fig. 12 User Interface Chat Room Details

Fig. 13 User Interface Play Exported Link Details
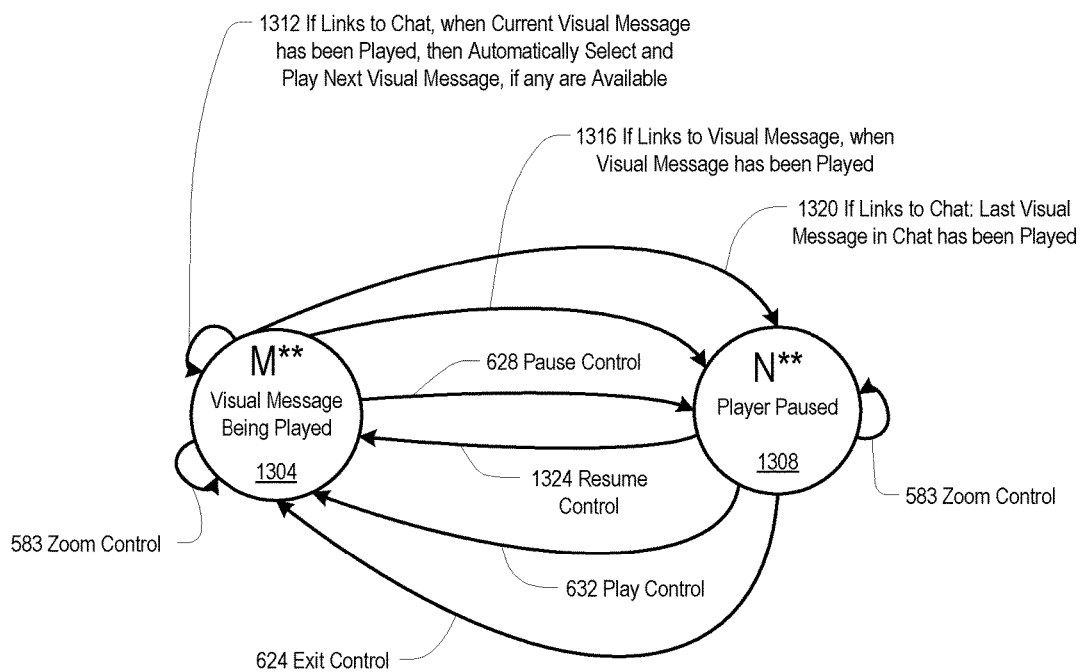

Fig. 14A  Drawing Persistence during Video Playback
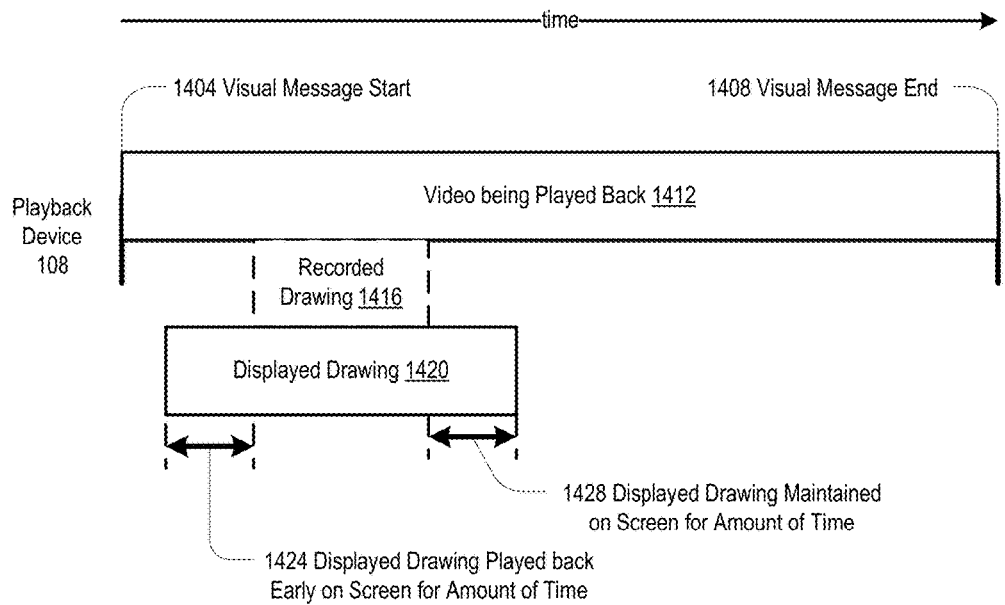
Fig. 14B  Drawing Timestamps during Audio Recording
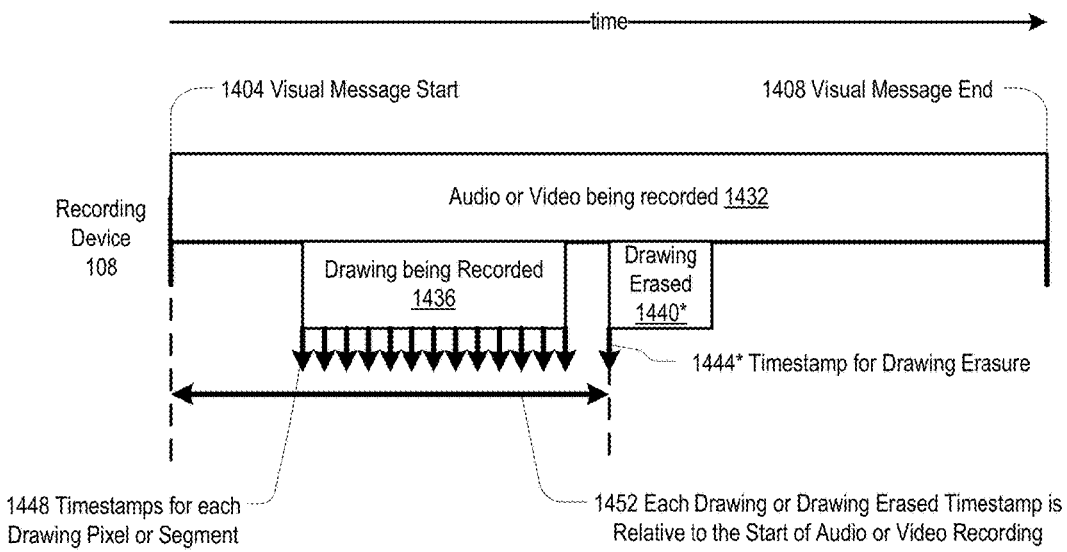

Fig. 15A  Visual Message Display during Chat Replay
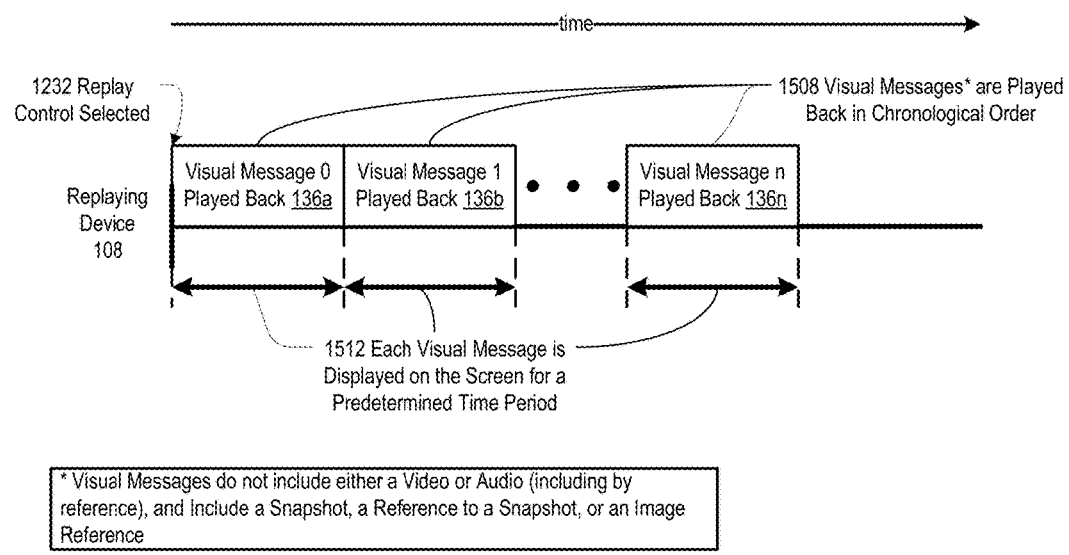
Fig. 15B  Color Assignment based on Order of Participant
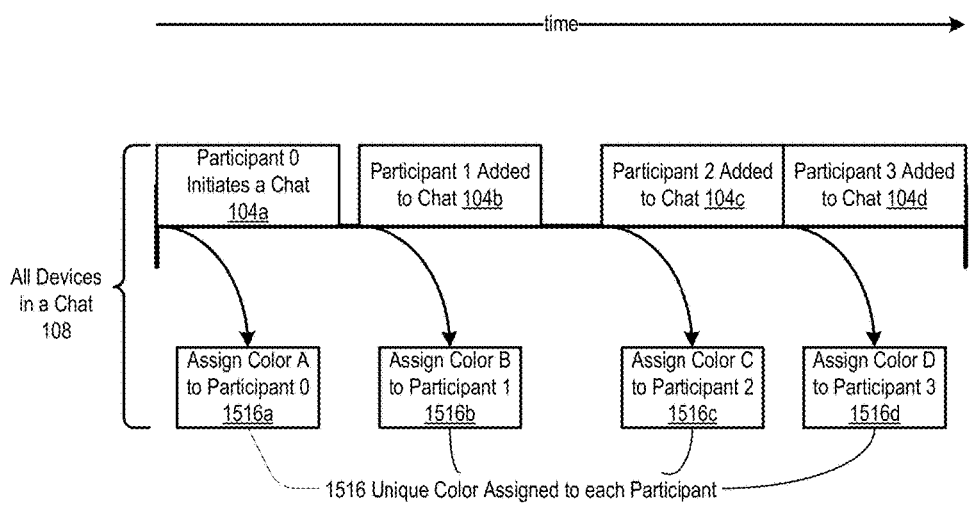

Fig. 16A   Device Screen Contents in State A
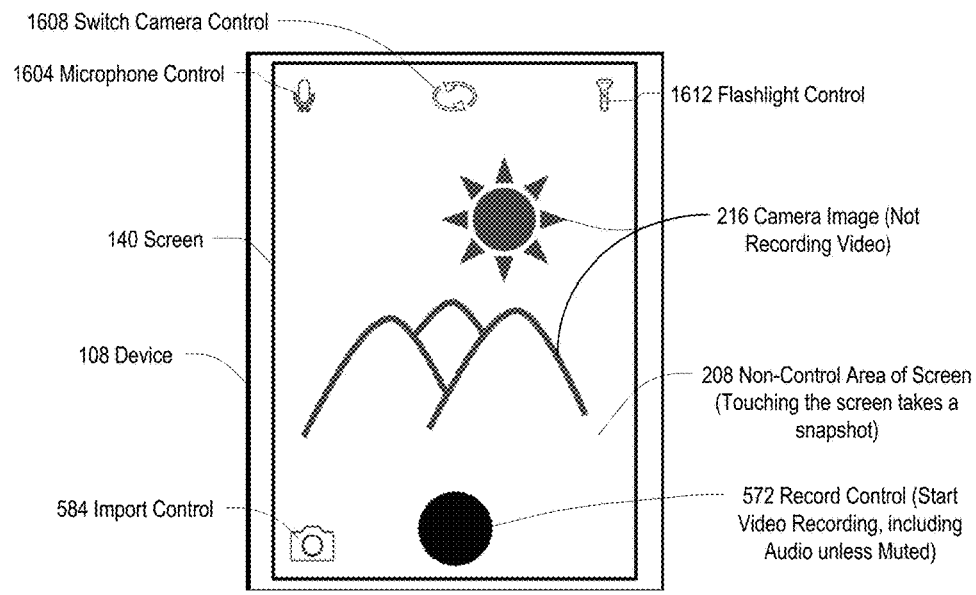
Fig. 16B   Device Screen Contents in State B with Non-Persistent Drawing Shown
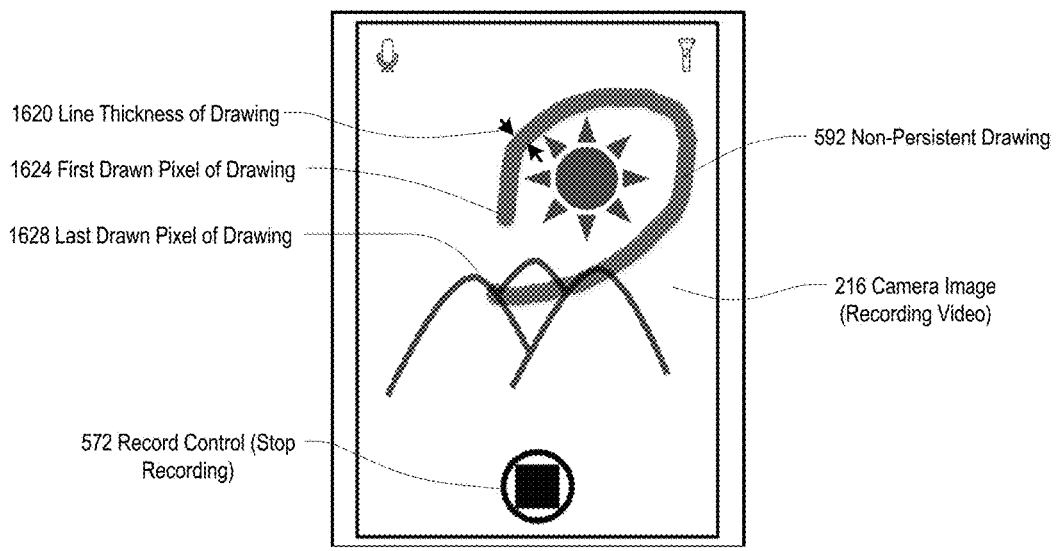

Fig. 16C  Device Screen Contents in State C
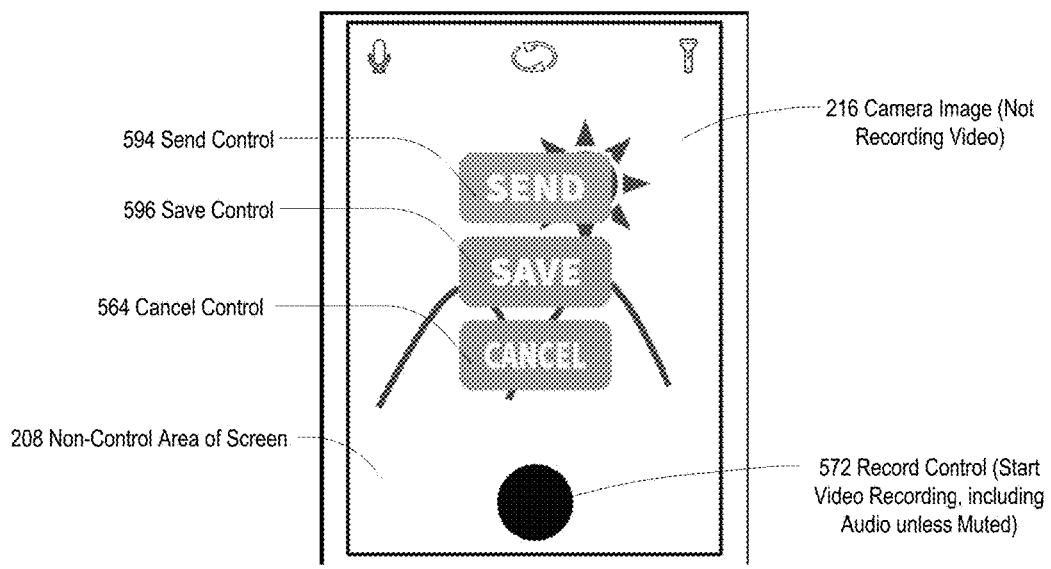
Fig. 16D  Device Screen Contents in State D
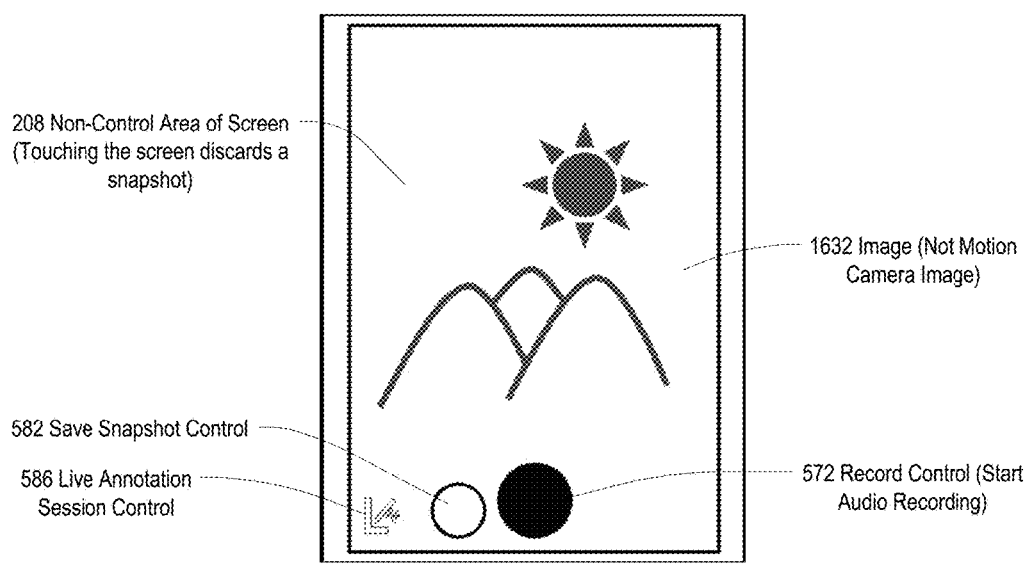

Fig. 16E  Device Screen Contents in State E
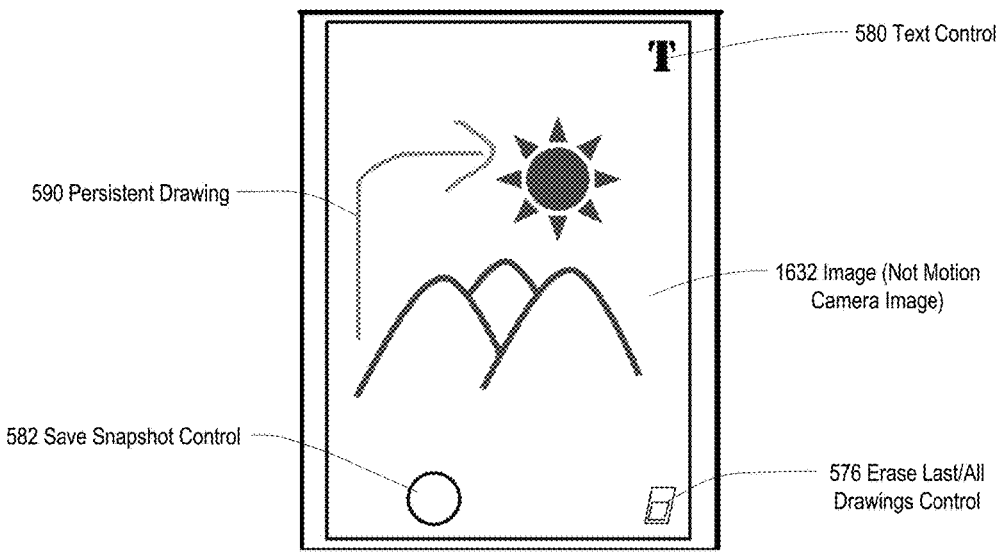
Fig. 16F  Device Screen Contents in State F
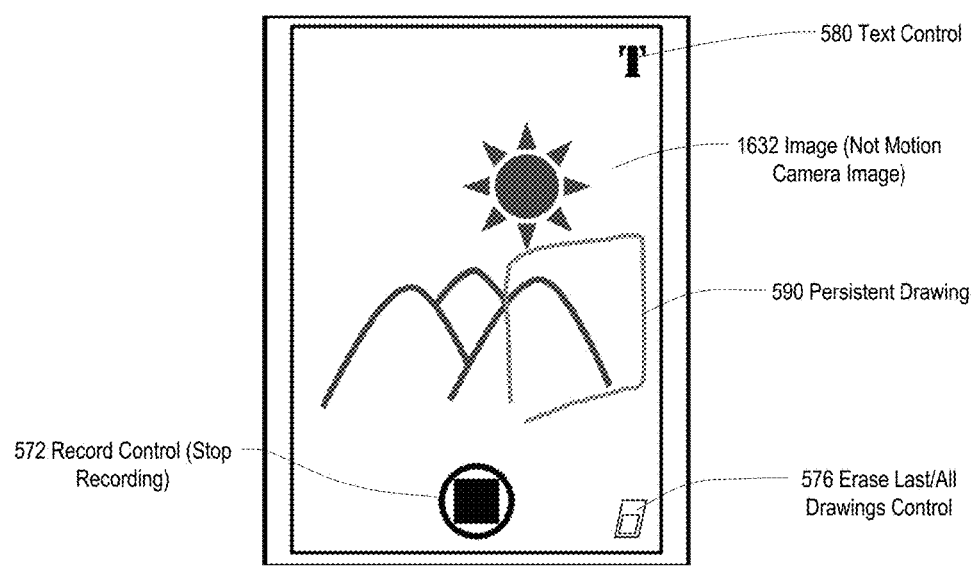

Fig. 16G  Device Screen Contents in State K
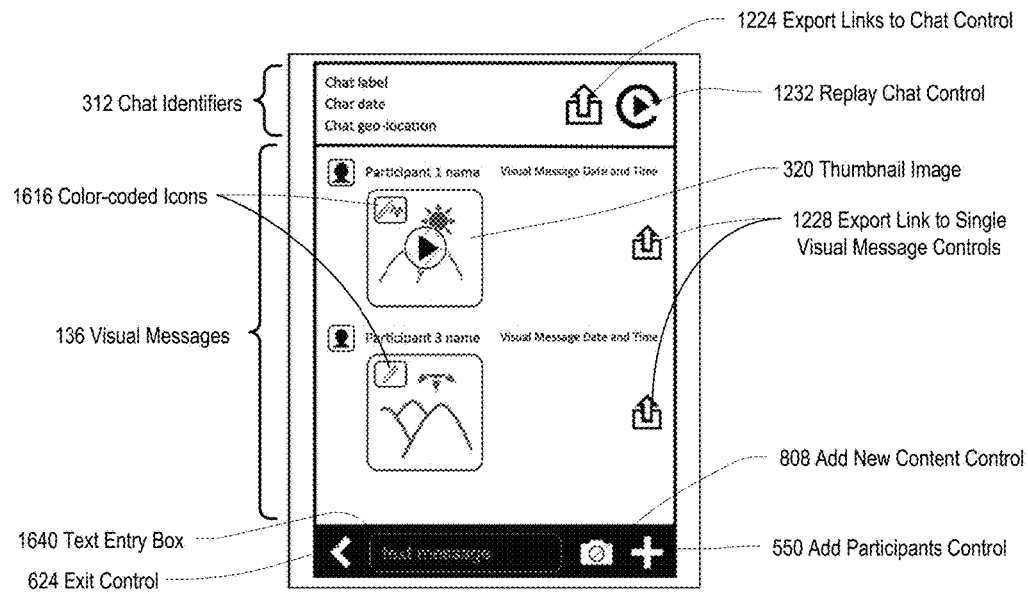
Fig. 16H  Device Screen Contents in State M with Image Displayed while Audio Playing and Persistent Drawing Shown
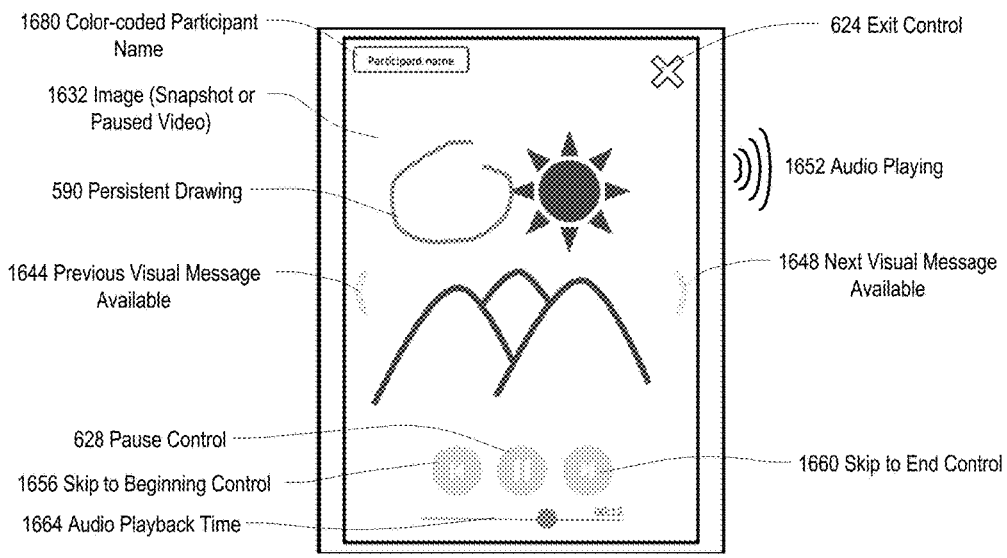

Fig. 16I  Device Screen Contents in State M with Image Displayed while Audio Playing
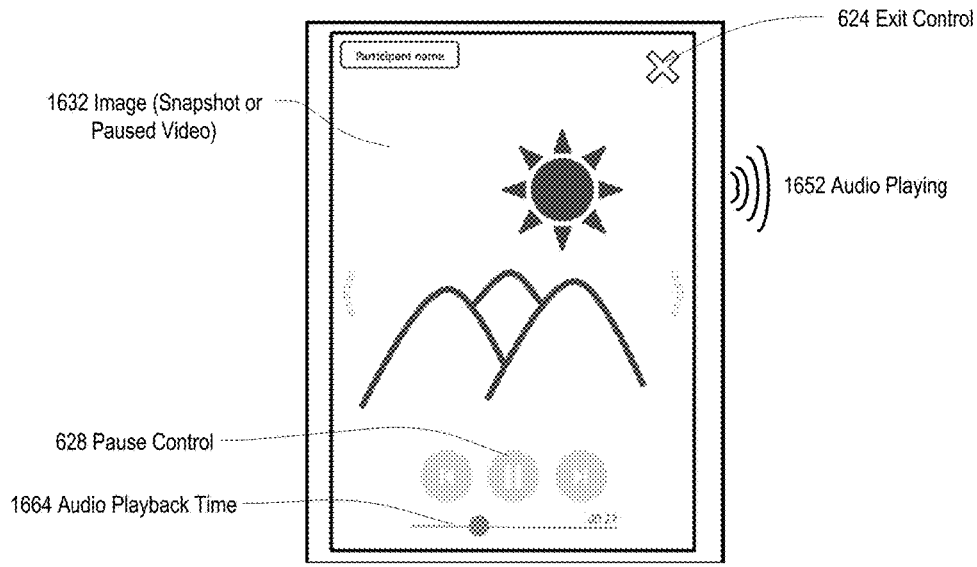
Fig. 16J  Device Screen Contents in State M with Video Playing and Non-Persistent Drawing Shown
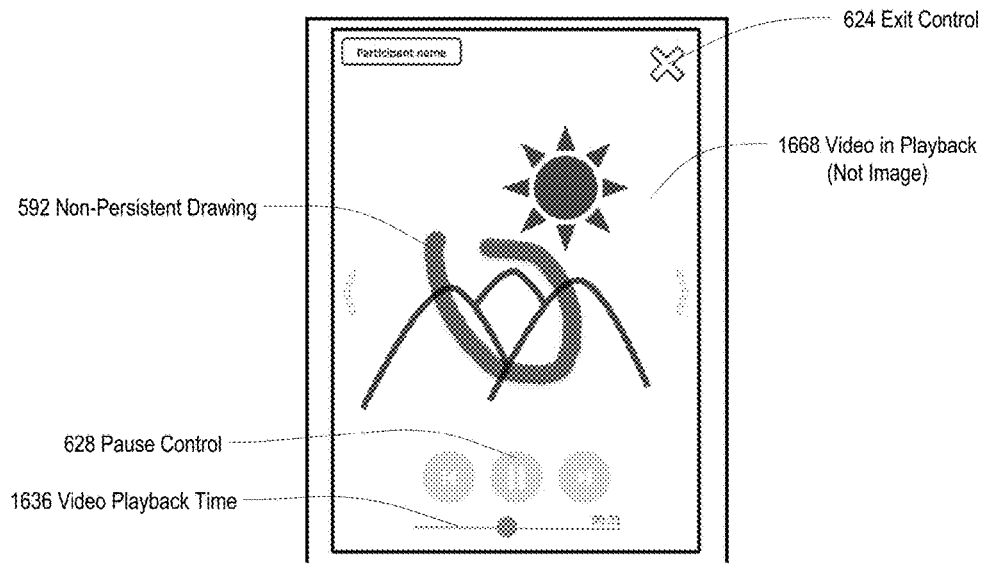

Fig. 16K  Device Screen Contents in State N with Image Displayed, Audio Paused and Persistent Drawings Shown
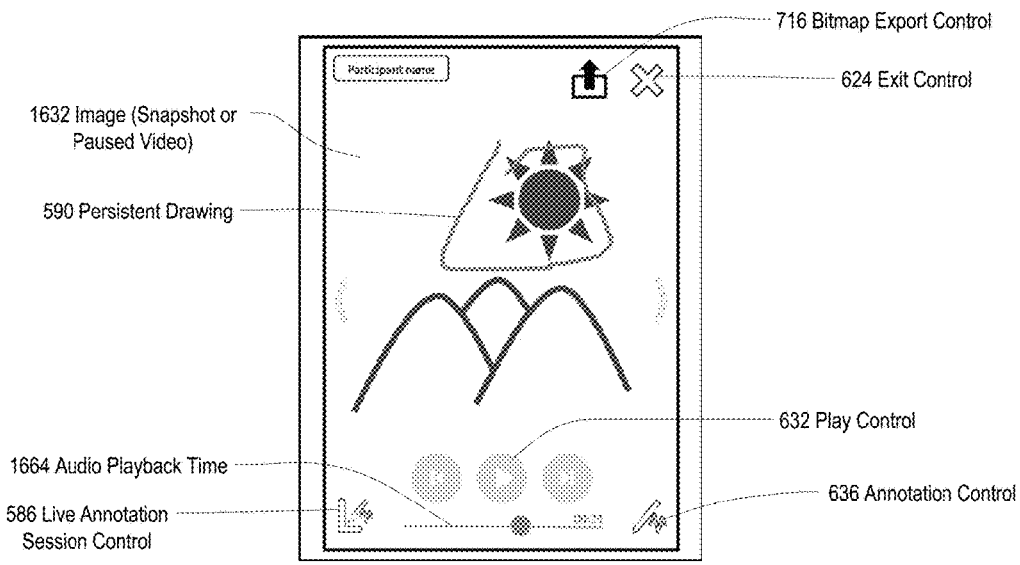
Fig. 16L  Device Screen Contents in State N with Image Displayed and Audio Paused
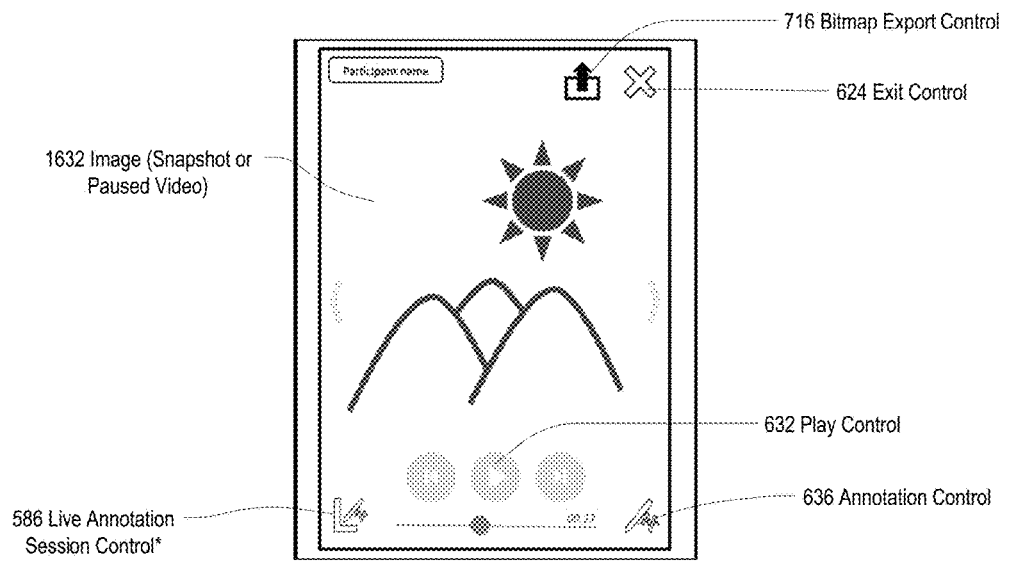

Fig. 16M  Device Screen Contents in State N with Image Displayed, without Audio and with Persistent Drawings Shown
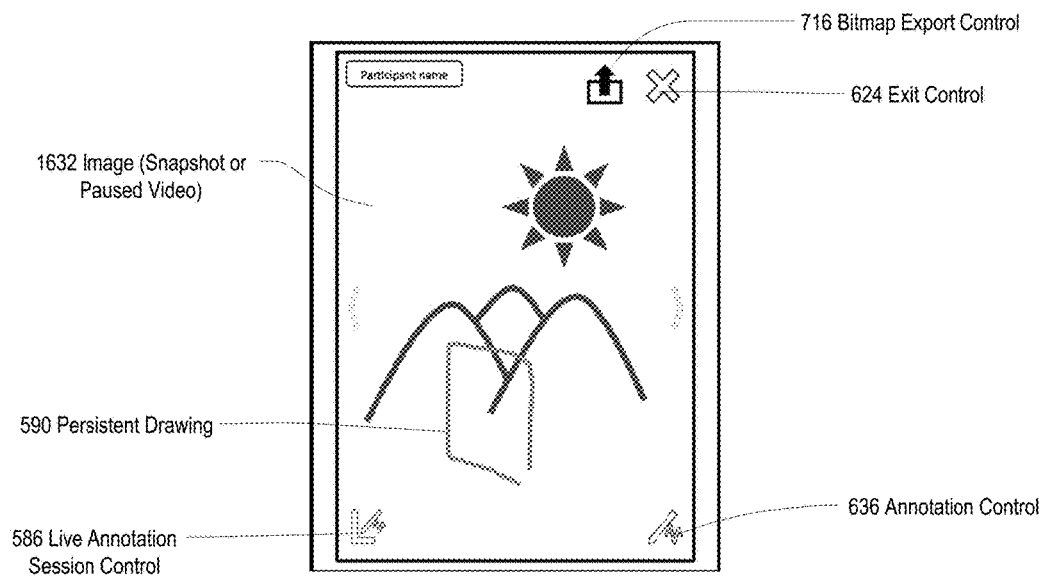
Fig. 16N  Device Screen Contents in State N with Image Displayed and without Audio
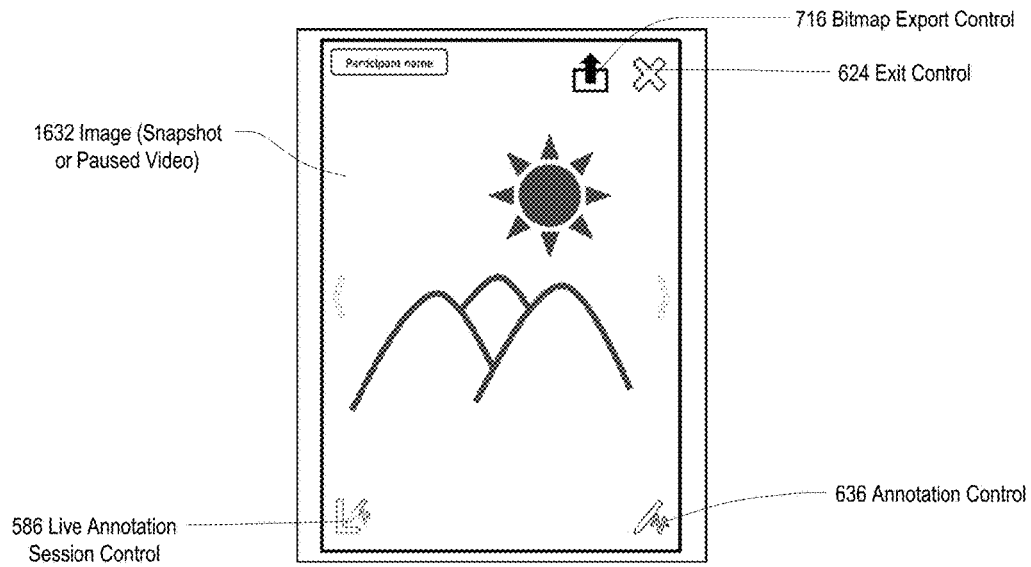

Fig. 16O  Device Screen Contents in State P
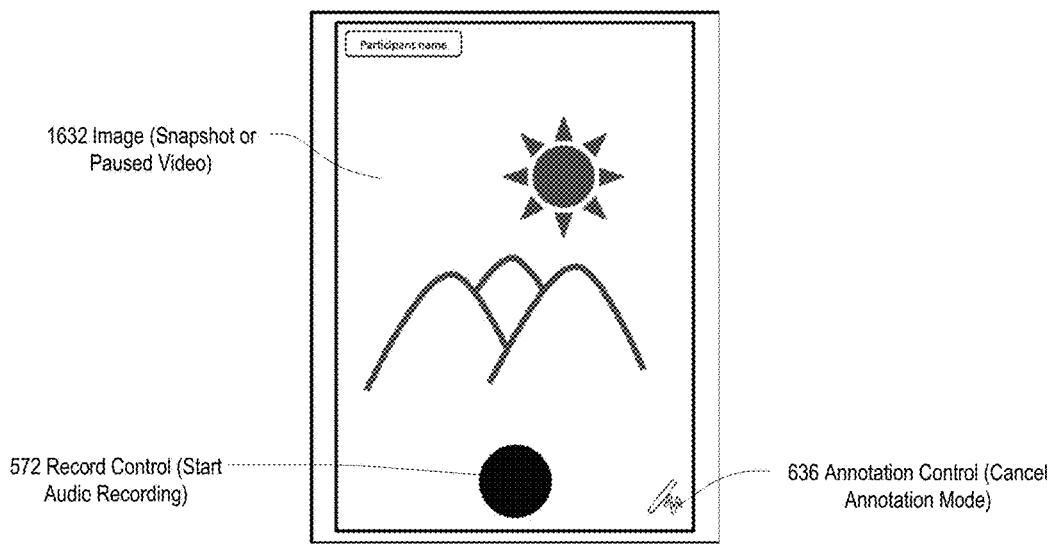
Fig. 16P  Device Screen Contents in State Q with Persistent Drawings Shown
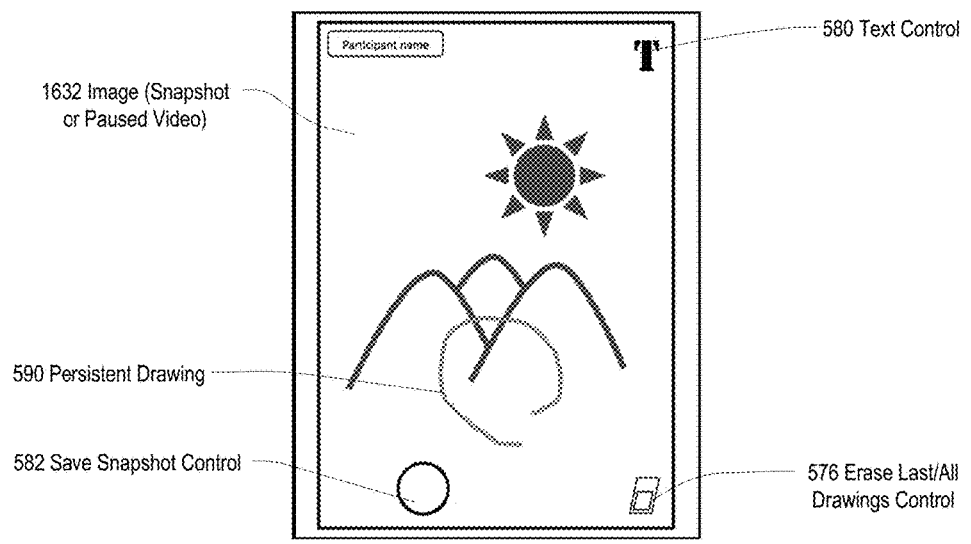

Fig. 16Q  Device Screen Contents in State R with Persistent Drawings Shown
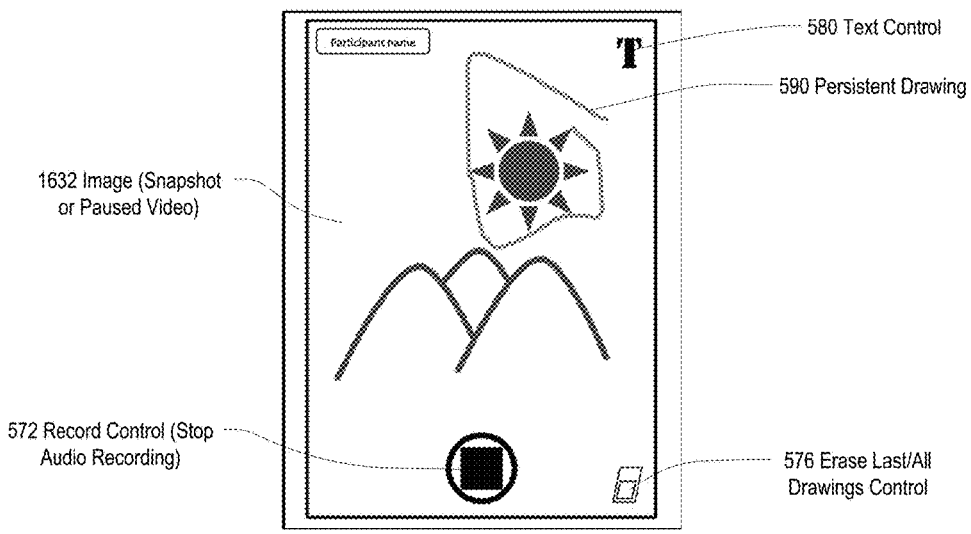
Fig. 16R  Device Screen Contents in State W with Persistent Drawings Shown
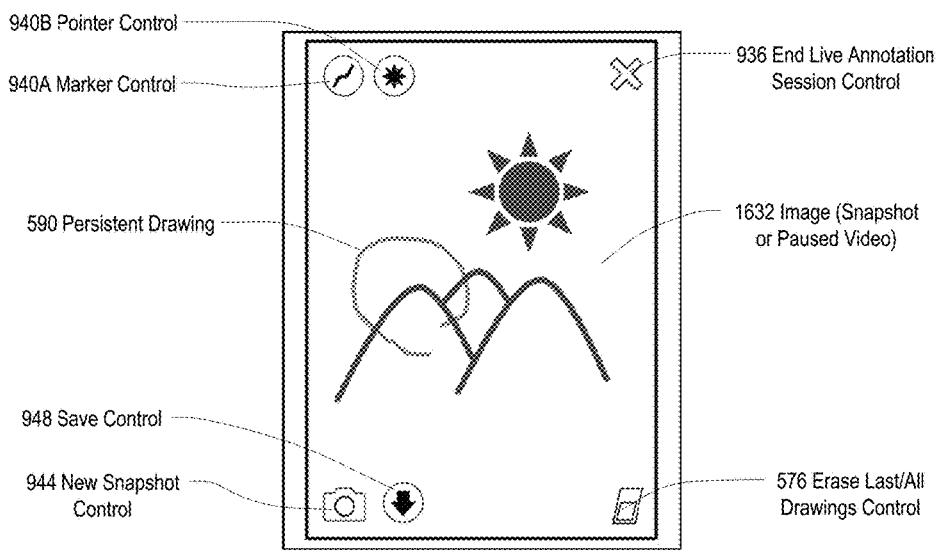

Fig. 16S  Device Screen Contents in State AD
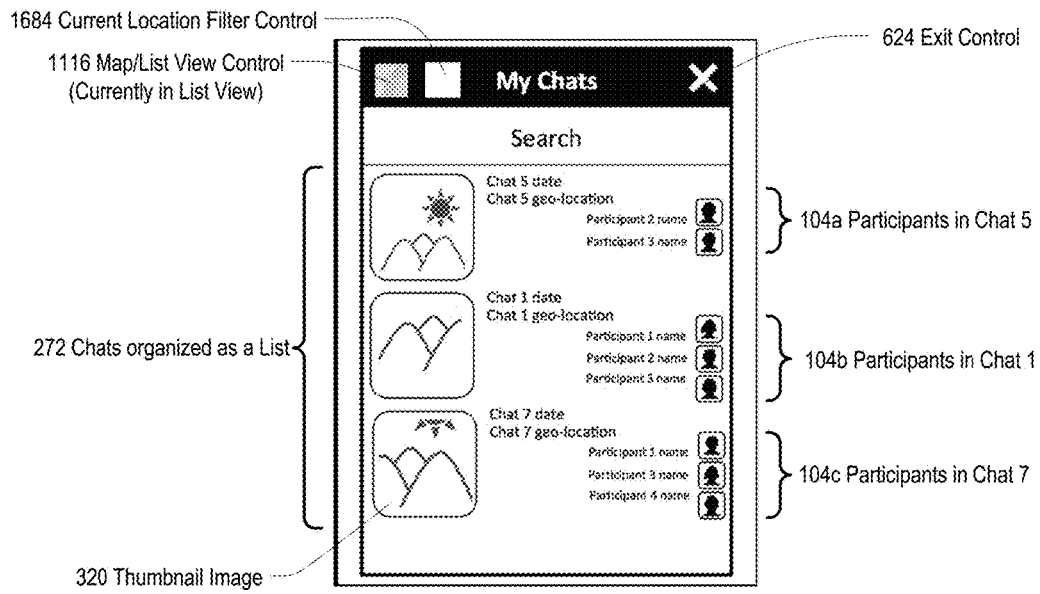
Fig. 16T  Device Screen Contents in State AE
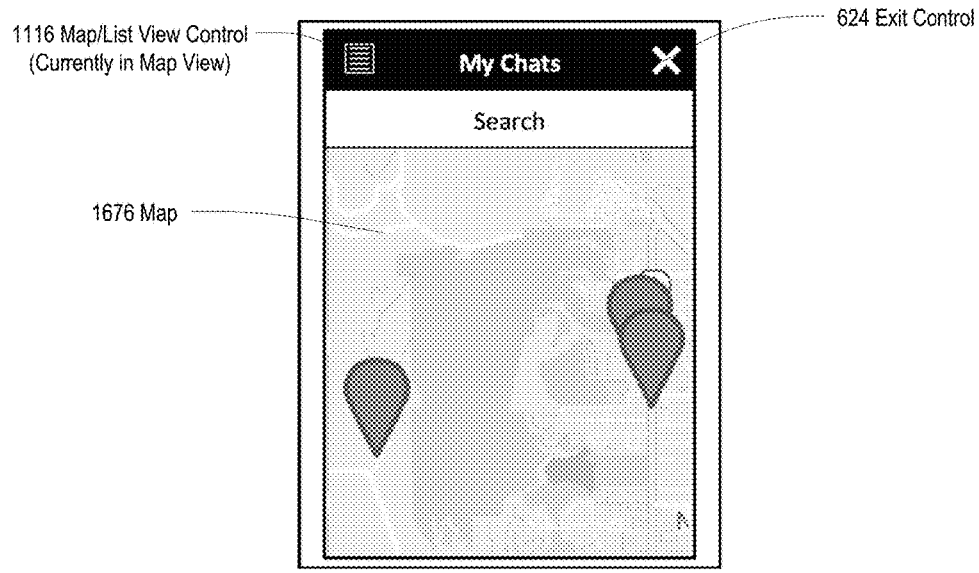

Fig. 16U  Device Screen Contents in State A if Transitioning from State L
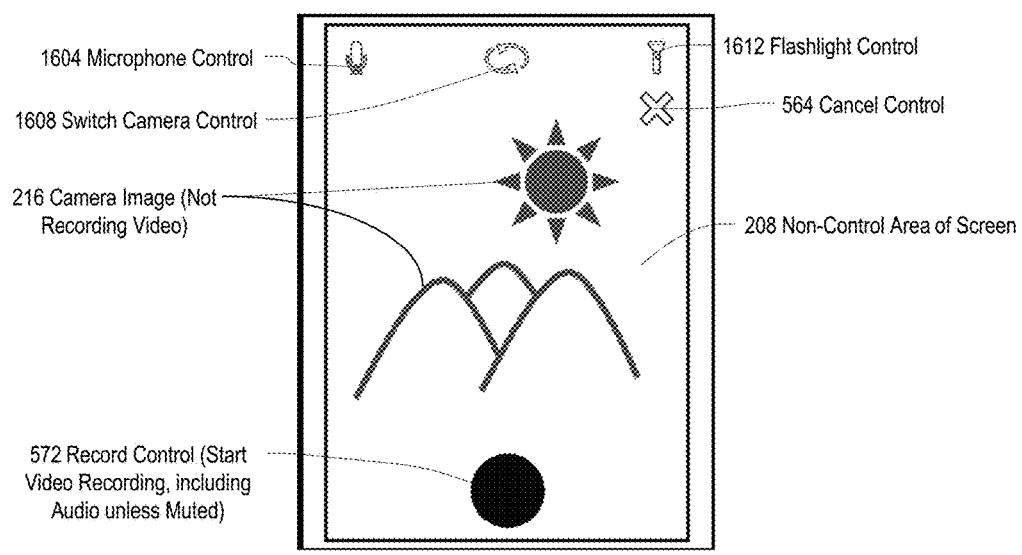

COMMUNICATION DEVICE AND METHOD

CROSS REFERENCE TO RELATED APPLICATIONS

This application is a continuation of International Application No. PCT/US16/52901, filed Sep. 21, 2016, which claims the benefit of U.S. Provisional Application No. 62/222,306, filed Sep. 23, 2015.

FIELD

The present invention is directed to communication technologies. In particular, the present invention is directed to devices, systems, and methods for communicating rich media content between geographically diverse sites.

BACKGROUND

With the introduction of relatively low cost, high capacity broadband telecommunication services in the late 1990s, coupled with powerful computing processors and video compression techniques, videoconferencing has made significant inroads in business, education, medicine and media.

Videoconferencing is the conduct of a videoconference by a set of telecommunication technologies which allow two or more locations to communicate by simultaneous two-way video and audio transmissions. It has also been called 'virtual collaboration' and is a type of groupware. Videoconferencing differs from videophone calls in that it's designed to serve a conference or multiple locations rather than individuals. It is an intermediate form of videotelephony, first used commercially in Germany during the late-1930s and later in the United States during the early 1970s as part of AT&T's development of Picturephone technology.

Videoconferencing uses audio and video telecommunications to bring people at different sites together. This can be as simple as a conversation between people in private offices (point-to-point) or involve several (multipoint) sites in large rooms at multiple locations. Besides the audio and visual transmission of meeting activities, allied videoconferencing technologies can be used to share documents and display information on whiteboards.

SUMMARY

In accordance with embodiments of the present invention, a device is provided. The device includes a processor, a screen for displaying visual information, and a memory coupled to the processor. The memory includes an application configured to perform at least one of record, transmit, receive, play, display, and group visual messages. Each visual message includes at least one of a video, a snapshot, a reference to the video, and a reference to the snapshot. The video and the snapshot are recorded as part of an original video or snapshot visual message. Each visual message also includes at least one of a drawing, audio content, a reference to the drawing, and a reference to the audio content. The drawing and the audio content are not embedded in the video or the snapshot and are recorded as part of a visual message. Each visual message further includes at least one of a timestamp corresponding to a point-in-time when the visual message was recorded, a time reference within an original video, a Global Positioning System coordinate of a device that recorded the visual message, a user ID of a user that recorded the visual message, a participant ID associated with the user ID, or a reference to the timestamp, GPS coordinate, user ID, and participant ID. Each of the references comprises one of a pointer to a storage location and an identifier. When a received visual message comprises the video or a reference to the video and one or more drawings, while the video is playing on the screen the application displays and maintains each of the one or more drawings on the screen for an amount of time before the one or more drawings is removed from the screen and the amount of time is not related to a duration of the video.

In accordance with another embodiment of the present invention, a non-transitory computer readable storage medium is provided. The non-transitory computer readable storage medium is configured to store instructions that when executed cause a processor to perform at least one of recording, transmitting, receiving, playing, displaying, and grouping visual messages on a device comprising a processor. Each visual message includes at least one of a video, a snapshot, a reference to the video, and a reference to the snapshot. The video and the snapshot are recorded as part of an original video or snapshot visual message. Each visual message also includes at least one of a drawing, audio content, a reference to the drawing, and a reference to the audio content. The drawing and the audio content are not embedded in the video or the snapshot and are recorded as part of the visual message. Each visual message further includes at least one of a timestamp corresponding to a point-in-time when the visual message was recorded, a time reference within the original video, a Global Positioning System coordinate of a device that recorded the visual message, a user ID of a user that recorded the visual message, a participant ID associated with the user ID, or a reference to the timestamp, GPS coordinate, user ID, or participant ID. Each of the references includes one of a pointer to a storage location and an identifier. When a received visual message includes the video or a reference to the video and one or more drawings, while the video is playing on a screen of the device the application displays and maintains each of the one or more drawings on the screen for an amount of time before the one or more drawings is removed from the screen, and the amount of time is not related to a duration of the video.

In accordance with yet another embodiment of the present invention, a method is provided. The method includes creating an original video or snapshot visual message by a device including a processor and a memory coupled to the processor. The memory includes an application configured to record, transmit, and receive visual messages, the original video or snapshot visual message including at least one of a video, a snapshot, a reference to the video, and a reference to the snapshot. The original video or snapshot visual message also includes at least one of a drawing, audio content, a reference to the drawing, and a reference to the audio content. The drawing and the audio content are not embedded in the video or the snapshot and are recorded as part of the original visual message. The original video or snapshot visual message further includes at least one of a timestamp corresponding to a point-in-time when the first visual message was recorded, a Global Positioning System coordinate of a device that recorded the original visual message, a user ID of a user that recorded the original visual message, a participant ID associated with the user ID, or a reference to the timestamp, GPS coordinate, user ID, or participant ID. Each of the references includes one of a pointer to a storage location or an identifier. The method also includes transmitting the original video or snapshot visual message to another device and receiving a first derived video or snapshot visual message derived from the original video or snapshot visual message from the other device. The first derived video or snapshot visual message includes a reference to the original video and a time reference within the original video or a reference to the original snapshot and at least one of audio, text, or one or more drawings, and the first derived video or snapshot visual message does not include the original video or original snapshot.

In accordance with yet a further embodiment of the present invention, a visual message is provided. The visual message includes at least one of an original video, an original snapshot, a reference to the video, and a reference to the snapshot, at least one of a drawing, audio content, a reference to the drawing, and a reference to the audio content. The drawing and the audio content are separable from other visual message content without impacting original characteristics of either the original video or original snapshot and are recorded as part of the original visual message. The visual message further includes at least one of a timestamp corresponding to a point-in-time when the original visual message was recorded, a time reference within the original video, a Global Positioning System coordinate of a device that recorded the original visual message, a user ID of a user that recorded the original visual message, a participant ID associated with the user ID, or a reference to the timestamp, GPS coordinate, user ID, and participant ID. Each of the references comprises one of a pointer to a storage location or an identifier. When a received visual message includes the video or a reference to the video and one or more drawings, while the video is playing on a device screen the device displays and maintains each of the one or more drawings on the screen for an amount of time not related to a duration of the video before the one or more drawings is removed from the screen.

An advantage of the present invention is it provides a way to transfer rich media content in a compact payload by only transmitting original content one time and otherwise utilizing compact metadata forms to identify and reference the original content. This has the advantage of being faster to transmit and occupying less communication bandwidth than alternatives.

Another advantage of the present invention is it takes advantage of ease of use aspects in newer mobile computing technologies that have a minimal number of hardware controls and increasingly utilize touchscreen technology. This allows simple annotation to convey complex concepts and provide a small number of context-sensitive controls to perform complex functions without exposing the complexity to users. Less training time is required due to a small number of intuitive controls, and an average person would be inclined to correctly operate the device and application in the absence of training information.

Yet another advantage of the present invention is it allows both fully interactive and semi-interactive operating modes. Fully interactive operating modes are desirable for time-critical applications where obtaining proper answers or solutions quickly may save significant time and money. In some applications (search and rescue, for example), fast expert consultation may even save lives. Semi-interactive operating modes are desirable for off-line, off-hours, or other applications where experts or other consultants may not be available in real time. This may be useful, for example, when communicating across many time zones, countries, or continents, or when expert personnel have very limited time availability.

A further advantage of the present invention is annotation is not embedded into video or snapshots. Although embedding may reduce the size of a transmitted media file, in most cases embedding prevents separating annotation from video or snapshots. By not embedding annotation into video or snapshots, the present invention allows annotation to be separated from the video or snapshots and thus create more compact forms of subsequently transmitted media files that include references to video, snapshots, and annotation.

Yet a further advantage of the present invention is it utilizes intelligent color assignment for drawings and icons in order to uniquely identify the user or participant who created a given visual message or drawing content in visual messages. By assigning colors in the order a participant is added to a chat, visual messages provide additional content and allow a participant to quickly identify and display specific content from a specific participant.

Additional features and advantages of embodiments of the present invention will become more readily apparent from the following description, particularly when taken together with the accompanying drawings.

BRIEF DESCRIPTION OF THE DRAWINGS

FIG. 1 is a block diagram illustrating a data communication network using Visual Messages in accordance with embodiments of the present invention.

FIG. 2 is a block diagram illustrating device functional elements in accordance with embodiments of the present invention.

FIG. 3 is a diagram illustrating metadata in accordance with embodiments of the present invention.

FIG. 4A is a diagram illustrating Content for a Visual Message with Original Video Content in accordance with embodiments of the present invention.

FIG. 4B is a diagram illustrating Content for a Visual Message with Original Snapshot Content in accordance with embodiments of the present invention.

FIG. 4C is a diagram illustrating Content for a Visual Message with Non-Original Snapshot Content in accordance with embodiments of the present invention.

FIG. 4D is a diagram illustrating Content for a Visual Message with Non-Original Video Content in accordance with embodiments of the present invention.

FIG. 5 is a state diagram illustrating User Interface Content Capture Details in accordance with embodiments of the present invention.

FIG. 6 is a state diagram illustrating User Interface Annotation of Existing Visual Message Details in accordance with embodiments of the present invention.

FIG. 7 is a state diagram illustrating User Interface Media Player Details in accordance with embodiments of the present invention.

FIG. 8 is a state diagram illustrating User Interface Existing Chat Content Capture Details in accordance with embodiments of the present invention.

FIG. 9 is a state diagram illustrating User Interface Live Annotation Details for a Caller in accordance with embodiments of the present invention.

FIG. 10 is a state diagram illustrating User Interface Live Annotation Details for a Callee in accordance with embodiments of the present invention.

FIG. 11 is a state diagram illustrating User Interface Chats Screen Details in accordance with embodiments of the present invention.

FIG. 12 is a state diagram illustrating User Interface Chat Room Details in accordance with embodiments of the present invention.

FIG. 13 is a state diagram illustrating User Interface Play Exported Link Details in accordance with embodiments of the present invention.

FIG. 14A is a diagram illustrating Drawing Persistence during Video Playback in accordance with embodiments of the present invention.

FIG. 14B is a diagram illustrating Drawing Timestamps during Audio Recording in accordance with embodiments of the present invention.

FIG. 15A is a diagram illustrating Visual Message Display during Chat Replay in accordance with embodiments of the present invention.

FIG. 15B is a diagram illustrating Color Assignment based on Order of Participant in accordance with embodiments of the present invention.

FIG. 16A is a diagram illustrating Device Screen Contents in State A in accordance with embodiments of the present invention.

FIG. 16B is a diagram illustrating Device Screen Contents in State B with a Non-Persistent Drawing shown in accordance with embodiments of the present invention.

FIG. 16C is a diagram illustrating Device Screen Contents in State C in accordance with embodiments of the present invention.

FIG. 16D is a diagram illustrating Device Screen Contents in State D in accordance with embodiments of the present invention.

FIG. 16E is a diagram illustrating Device Screen Contents in State E in accordance with embodiments of the present invention.

FIG. 16F is a diagram illustrating Device Screen Contents in State F in accordance with embodiments of the present invention.

FIG. 16G is a diagram illustrating Device Screen Contents in State K in accordance with embodiments of the present invention.

FIG. 16H is a diagram illustrating Device Screen Contents in State M with Image Displayed while Audio is Playing and Persistent Drawing Shown in accordance with embodiments of the present invention.

FIG. 16I is a diagram illustrating Device Screen Contents in State M with Image Displayed while Audio is Playing in accordance with embodiments of the present invention.

FIG. 16J is a diagram illustrating Device Screen Contents in State M with Video Playing and a Non-Persistent Drawing Shown in accordance with embodiments of the present invention.

FIG. 16K is a diagram illustrating Device Screen Contents in State N with Image Displayed, Audio Paused, and Persistent Drawing Shown in accordance with embodiments of the present invention.

FIG. 16L is a diagram illustrating Device Screen Contents in State N with Image Displayed and Audio Paused in accordance with embodiments of the present invention.

FIG. 16M is a diagram illustrating Device Screen Contents in State N with Image Displayed, without Audio, and with Persistent Drawings Shown in accordance with embodiments of the present invention.

FIG. 16N is a diagram illustrating Device Screen Contents in State N with Image Displayed and without Audio in accordance with embodiments of the present invention.

FIG. 16O is a diagram illustrating Device Screen Contents in State P in accordance with embodiments of the present invention.

FIG. 16P is a diagram illustrating Device Screen Contents in State Q with Persistent Drawings Shown in accordance with embodiments of the present invention.

FIG. 16Q is a diagram illustrating Device Screen Contents in State R with Persistent Drawings Shown in accordance with embodiments of the present invention.

FIG. 16R is a diagram illustrating Device Screen Contents in State W with Persistent Drawings Shown in accordance with embodiments of the present invention.

FIG. 16S is a diagram illustrating Device Screen Contents in State AD in accordance with embodiments of the present invention.

FIG. 16T is a diagram illustrating Device Screen Contents in State AE in accordance with embodiments of the present invention.

FIG. 16U is a diagram illustrating Device Screen Contents in State A if Transitioning from State L in accordance with embodiments of the present invention.

DETAILED DESCRIPTION

Although traditional videoconferencing systems have the ability to transfer video, audio, still images, text, and documents, such systems are sometimes very large, complex, and expensive. In some cases, videoconferencing systems are site-specific and require people to either be present at the site where the system exists or travel to a site having a compatible videoconferencing system. Additionally, such systems have complex user interfaces and control layouts requiring frequent or in-depth training.

Recognizing the need to communicate rich media content wirelessly across potentially great distances, the present invention seeks to provide rich media content interactively or semi-interactively using common portable communication devices including smart phones, tablets, PDAs, and mobile computers. The present invention also seeks to provide a highly intuitive user interface that may require little or no training for common users. This has the benefit of making such technology both ubiquitous and able to be used by nearly any user familiar with common user interface constructs.

The present invention utilizes the following terminology:

Annotation is any audio, text, or drawings added to a video, a snapshot, or image.

Audio is audible Annotation manually added to a snapshot or image by a user. In most cases, audio is added by speaking into a microphone of a device, although ambient sounds may be captured as audio by simply activating the microphone of the device. Recorded audio has a variable length.

Camera Image is the output of a camera.

Capture is the act of creating a new video or snapshot, along with any associated annotation Chat is one or more visual messages between users or participants. A new chat starts when a first original video or snapshot visual message is created, which corresponds to when the first piece of video or snapshot content is captured or imported. Any successive visual message that results from the interaction of the participants within the chat is associated to the chat itself.

Device is a computing and communication device including at least a processor, memory, a network interface, a display screen, a speaker, and some way to navigate and control the device—such as a keyboard, mouse, touch screen, or other control means.

Drawing is a form of visual annotation manually added to a video, a snapshot, or image by a user or participant. In most cases, drawings are made by moving a finger, stylus, or pointing device on the display screen of a device.

Image is original snapshot content displayed on the screen when playing a visual message or original video content displayed on the screen when playing a visual message while the video is not playing (e.g. paused).

Image Reference includes a reference to original snapshot content displayed on a screen when playing a visual message or original video content displayed on a screen when playing the visual message and while the video is not playing.

Import is the act of including a stored video or snapshot into a visual message, and creating any associated annotation.

Non-embedded means that a visual message component can at any time be separated or removed from other visual message content without impacting the original content of either.

Non-persistent drawing is a drawing that after being drawn on the screen automatically disappears after a certain pre-defined time has elapsed.

Originating participant is a person that starts a chat by creating and distributing an initial visual message.

Participant is a person that is part of a chat.

Persistent drawing is a drawing that after being drawn on the screen remains there until the user erases it, the application changes state, or the user takes another action while remaining in the current state.

Reference is a form of metadata that identifies a video, snapshot, or annotation, and is sometimes associated with a time stamp identifying when it was created. References include at least one of a pointer to a storage location (a location of a video within a database, for example), an identifier, and when a video is being referenced a time reference within the video. The identifier may be anything, including but not limited to a filename, a numerical identifier, a symbolic identifier, and an alphanumeric identifier.

Snapshot is a point-in time capture of a camera image.

Timestamp is the same as a time reference. A timestamp is measured from a current event to something that occurred previously—for example, starting audio recording.

Video is a capture of a camera image over time. Videos have a variable length.

Visual Message is an object including a video or snapshot, a reference to a video or snapshot, metadata, and optional annotation. A visual message includes:

1) a visual message data structure that encapsulates all metadata, all annotations that are not media, and a reference to the media (audio, video, or snapshot).
2) the media itself. The media is transmitted separately to cloud storage and to the recipients' devices. Visual message data structures and media are also stored separately in cloud storage.

X/Y Coordinate is data representing a position on a video, snapshot, or image in terms of X (horizontal) and Y (vertical) coordinates.

Referring now to FIG. 1, a block diagram illustrating a Data Communication Network 100 using Visual Messages in accordance with embodiments of the present invention is shown. A data communication network 100 is any network that allows communication between users or participants 104. Users or participants 104 are interconnected through a network or cloud 112, which may include network or cloud storage 116. Network or cloud 112 is any wired or wireless organization of communication pathways, including LANs, SANs, cellular networks, conventional telephone networks, or any type of network suitable for communicating voice, data, and video in different forms. Cloud storage 116 is any type of data storage present in network or cloud 112, and includes both file-level and block-level storage. In some embodiments, all communication of the present invention is stored within cloud storage 116 in addition to delivery to selected users or participants 104. In other embodiments, some or all communication of the present invention is delivered directly between users or participants 104 and does not involve cloud storage 116 or other forms of storage in the network or cloud 112.

A user or participant 104 is a human user able to communicate through a device 108 to either initiate visual messages 136, or receive visual messages 136. Alternatively, a user or participant 104 may also be a computer or a machine, instead of a human user. There may be any number of users or participants 104 present during communication using the present invention, and FIG. 1 shows a user or participant 104a using an originating participant device 108a to communicate through network or cloud 112 to a user or participant 104b using participant device 108b and one or more other users including user or participant 104n using participant device 108n. Any participant device 108 may be a visual message 136 originator, recipient, or both an originator and recipient. However, in every communication, there is always an originating participant device 108a that transmits an initial or first original video or snapshot visual message 136. Every participant device 108 performs at least one of recording, transmitting, receiving, playing, displaying, and grouping visual messages.

A visual message 136 includes three sets of elements: one of a video, a snapshot, or a reference to a video or a snapshot, one of a drawing, audio content, or a reference to a drawing or audio content, and one of a timestamp, a GPS coordinate, a time reference within the video, a user ID of a user 104 transmitting the visual message 136, a participant ID of the user 104 transmitting the visual message 136, and a reference. In some embodiments, in addition to or in lieu of one or more drawings, audio content, and references to drawings or audio content, visual messages 136 may include one or more text messages.

Devices 108 include at a minimum a processor element 120, a screen element 140, a memory 124, and a network interface 132. The device 108 will be described in more detail with reference to FIG. 2. Memory 124 includes an application 128 which includes software instructions executed by processor 120 to perform the steps of the present invention. Memory 124 may also include any number of visual messages 136, shown as visual message 136a through visual message 136n.

Referring now to FIG. 2, a block diagram illustrating Device 108 Functional Elements in accordance with embodiments of the present invention is shown. Device 108 is any sort of computer known in the art, and includes at least the elements identified in FIG. 1. However, device 108 may include many additional elements to provide greater communication capabilities. Device 108 may be a stationary computer such as a desktop or server, or may be a portable computer of various types. For example, device 108 may be a tablet, notebook computer, hybrid computer, smartphone, intelligent wristwatch, wearable computer, or any other sort of mobile or portable computer.

Processor 120 includes any processing device suitable for executing device applications 128 such as Intel x86-compatible processors, embedded processors, mobile processors, and/or RISC processors. Processor 120 may include several devices including field-programmable gate arrays (FPGAs), memory controllers, North Bridge devices, and/or South Bridge devices. Although in most embodiments, processor 120 fetches application 128 program instructions from memory 124, it should be understood that processor 120 and applications 128, 256, 260 may be configured in any allowable hardware/software configuration, including pure hardware configurations implemented in ASIC or FPGA forms.

The device screen 140 includes controls 204 and non-control areas 208. In most embodiments, controls 204 are "soft controls" displayed on the screen 140 and not necessarily hardware controls or buttons on device 108. Controls 204 generate selected controls 240, and screen 140 displays video, snapshots, drawings, text, icons, and bitmaps 244. Additionally, graphical content 244 on the screen 140 may be captured by the device as described elsewhere in the present application. In some embodiments one or more controls 204 may be "soft controls" and one or more controls 204 may be hardware controls or buttons. In yet other embodiments, controls 204 may be all hardware controls or buttons.

In the preferred embodiment, screen 140 is a touch screen whereby controls 204 may be activated by a finger touch or touching with a stylus or pen. Non-control areas 208 are areas of the screen 140 not including a control 204. The present invention utilizes non-control areas 208 as well as controls 204 to control the application 128. The application 128 of the present invention identifies when the screen 140 has been tapped and a finger, a stylus or a pointing device has drawn on the screen 140 and differentiates between tapping the screen 140 and drawing on the screen 140. In some embodiments, the device 108 does not itself include a screen 140, but is able to interface with a separate screen through various means known in the art.

Device 108 includes memory 124, which may include one or both of volatile and nonvolatile memory types. In some embodiments, the memory 124 includes firmware which includes program instructions that processor 120 fetches and executes, including program instructions for the processes of the present invention. Examples of non-volatile memory 124 include, but are not limited to, flash memory, SD, Erasable Programmable Read Only Memory (EPROM), Electrically Erasable Programmable Read Only Memory (EEPROM), hard disks, and Non-Volatile Read-Only Memory (NOVRAM). Volatile memory 124 stores various data structures and user data. Examples of volatile memory 124 include, but are not limited to, Static Random Access Memory (SRAM), Dual Data Rate Random Access Memory (DDR RAM), Dual Data Rate 2 Random Access Memory (DDR2 RAM), Dual Data Rate 3 Random Access Memory (DDR3 RAM), Zero Capacitor Random Access Memory (Z-RAM), Twin-Transistor Random Access Memory (TTRAM), Asynchronous Random Access Memory (A-RAM), ETA Random Access Memory (ETA RAM), and other forms of temporary memory.

In addition to application 128 and individual messages 136, memory 124 may also include a video & audio player application(s) 256, a text storage application 260, and metadata 264. The video & audio player application(s) 256 plays back received visual messages 136, and aids the user experience with the application 128. The text storage application 260 provides temporary storage for alphanumeric text strings importable or exportable by the application 128, and will be described in more detail herein. Metadata 264 includes data structures used to organize visual messages 136, and is included in visual messages 136 when transmitted to other users or participant devices 108. Memory 124 also serves as device storage 252, which will be described in more detail herein.

Network interface 132 is any wired or wireless interface able to connect to network or cloud 112 in order to transmit and receive visual messages 136 and chats 140 including visual messages 136.

In most embodiments device 108 includes a camera 212, which produces a camera image 216 used by application 128. A camera 212 is required on the originating participant device 104a to create an initial visual message 136 including a video or a snapshot. In some embodiments, device 108 includes both a front camera 212 as well as a rear camera 212 as well as a means to switch the camera image 216 between the front camera 212 and the rear camera 212. In other embodiments, the device 108 does not itself include a camera 212, but is able to interface with a separate camera through various means known in the art.

Device 108 also typically includes a microphone 220, which generates recorded audio 268a in response to words or exclamations spoken by users or participants 104 as well as any other sounds detected by the microphone 220. In most embodiments, the microphone 220 has an associated mute function to enable or disable the microphone 220 under user or participant 104 control. In some embodiments, the device 108 does not itself include a microphone 220, but is able to interface with a separate microphone through various means known in the art.

In some embodiments, device 108 includes a speaker 224 to playback audio 268b. In some embodiments, a device 108 may also include a headphone jack or a wireless capability for connection to an external speaker or headphones, or it may include a headphone jack or a wireless capability in lieu of a speaker 224. Although the term "audio" is used throughout the present application, it should be understood that the distinction between recorded audio 268a and playback audio 268b depends on the context of whether audio is being recorded or played back.

Some mobile devices such as smart phones also include a flashlight 248, which generates visible light to improve picture quality of the camera 212 in dim or dark environments.

Finally, device 108 may include a Global Positioning System (GPS) receiver 228, which interfaces with GPS satellites in orbit around the earth to determine accurate location of the device 108. The GPS receiver 228 produces GPS coordinates 232 used by the application 128 to determine, record, and possibly display user device 108 location.

Referring now to FIG. 3, a diagram illustrating Metadata 264 in accordance with embodiments of the present invention is shown. Metadata 264 includes data structures and variables required to manage visual messages 136 and control transactions involving visual messages 136. Specifically, a chat 272 is a group of one or more visual messages 136. A chat 272 begins with an initial or first original video or snapshot visual message 136, and may include any number of subsequent visual messages 136, specifically any combination of original video or snapshot visual messages and non-original video or snapshot visual messages. Within a device 108 or system 100, there may be any number of chats 272.

The metadata 304 for each visual message 136 includes one or more chat identifiers 312, as well as a visual message ID 308. Therefore, the metadata 264 expands as new visual messages 136 are added to a device 108. Chat identifiers 312 include one or more parameters that are used to identify each chat 272 from other chats 272. Chat identifiers 312 may include a chat ID 316, a thumbnail image 320, a time and date 324a identifying when the chat 272 was created or originated, a time and date 324b identifying a creation time of a last visual message in the chat in chronological order. a chat label 328, a location 332 of a device 108 that initiated the chat 272 and created the initial visual message 136, and user IDs 336 for all users or participants 104 in the chat 272.

Metadata 264 also includes visual message metadata 304 for each visual message 136. In addition to the visual message ID 308, the visual message metadata 304 may possibly include an image reference ID 344 identifying a visual message 136 that contains the original video or snapshot referenced by the current visual message 136 or a reference to the original video or snapshot referenced by the current visual message 136.

Visual message metadata 304 also includes a chat or group ID 340, which is assigned when each visual message was recorded, as well as an image reference ID 344, creation timestamp 348, a participant ID 352 of the creator that created the visual message 136, a location of the device 356 when the visual message 136 was created, an image reference timestamp 360, a reference to video content 364, a reference to audio content 368, drawings or references to drawings 372, and a text message or references to text messages 376.

Referring now to FIG. 4A, a diagram illustrating Content for a Visual Message 136 with Original Video Content in accordance with embodiments of the present invention is shown. For a Visual Message 136 with Original Video Content, the original video visual message 136*a* includes the original video 404*a* or a reference to the original video 404*a*, optional audio annotation 408*a*, optional text annotation 412*a*, optional drawing annotation 416*a*, and visual message metadata 304*a*. Therefore, an original video visual message 136*a* includes at least an original video 404*a* or a reference to an original video 404*a* and visual message metadata 340*a*, and may possibly include audio 408*a*, text annotation 412*a*, and one or more drawings 416*a*.

In the original video visual message 136*a*, annotation 408*a*, 412*a*, 416*a* and metadata 304*a* are not embedded into video 404*a*. Although embedding may reduce the size of a transmitted media file, in most cases embedding prevents separating annotation from video 404*a*. By not embedding annotation into video 404*a*, the present invention allows annotation 408*a*, 412*a*, 416*a* to be separated from the video 404*a* and thus allow each of the video 404*a* and the annotation 408*a*, 412*a*, 416*a* to be subsequently analyzed, used, or otherwise treated independently of each other.

Referring now to FIG. 4B, a diagram illustrating Content for a Visual Message 136 with Original Snapshot Content in accordance with embodiments of the present invention is shown. For a visual message 136 with original snapshot content, the original snapshot visual message 136*b* includes the original snapshot or a reference to the original snapshot 420*a*, optional audio annotation 408*b*, optional text annotation 412*b*, optional drawing annotation 416*b*, and visual message metadata 304*b*. Therefore, an original snapshot visual message 136*b* includes at least a snapshot or a reference to the original snapshot 420*a* and visual message metadata 304*b*, and may possibly include audio 408*b*, text annotation 412*b*, and one or more drawings 416*b*.

In the original snapshot visual message 136*b*, annotation 408*b*, 412*b*, 416*b* and metadata 304*b* are not embedded into snapshot 420*a*. Although embedding may reduce the size of a transmitted media file, in most cases embedding prevents separating annotation from snapshot 420*a*. By not embedding annotation into snapshot 420*a*, the present invention allows annotation 408*b*, 412*b*, 416*b* to be separated from the snapshot 420*a* and thus allow each of the snapshot 420*a* and the annotation 408*b*, 412*b*, 416*b* to be subsequently analyzed, used, or otherwise treated independently of each other.

Referring now to FIG. 4C, a diagram illustrating Content for a Visual Message 136 with Non-Original Snapshot Content in accordance with embodiments of the present invention is shown. For a visual message 136 with non-original snapshot content, the non-original snapshot visual message 136*c* includes an image reference for an original snapshot or a reference to an original snapshot visual message 424*a*, optional audio annotation 408*c*, optional text annotation 412*c*, optional drawing annotation 416*c*, and visual message metadata 304*c*. Text annotations 412*c* and drawing annotations 416*c* include new text and drawing annotations as well as text annotations and drawing annotations included in previous visual messages 136 or a reference to them. This is described in greater detail in FIG. 6. It should be noted that only original audio annotation 408 is transmitted in any visual message 136, since including previous audio annotation 408 with current audio annotation 408 will likely result in garbled playback that is difficult or impossible to understand. Therefore, a non-original snapshot visual message 136*c* does not include a reference to audio 408 from a previous visual message 136. Also, a non-original snapshot visual message 136*c* does not include an original snapshot 420 since the original snapshot 420 is already stored on the devices 108 of the chat participants 104.

Referring now to FIG. 4D, a diagram illustrating Content for a Visual Message with Non-Original Video Content in accordance with embodiments of the present invention is shown. For a visual message 136 with non-original video content, the non-original video visual message 136*d* includes an image reference for an original video or a reference to an original video visual message, including a timestamp, 432*a*. The timestamp identifies the exact time in the original video 404 that the image refers to. This way, a receiving device 108 will be able to properly display an image based on the original video or a reference to the original video 404 and the timestamp. The non-original video visual message 136*d* may also include optional audio annotation 408*d*, optional text annotation 412*d*, and optional drawing annotation 416*d*. A non-original video visual message 136*d* does not include an original video 404 since the original video 404 is already stored on the devices 108 of the chat participants 104. Finally, the non-original video visual message 136*d* includes visual message metadata 304*d*. Therefore, a non-original video visual message 136*d* includes at least an image reference for an original video or a reference to an original video visual message, including a timestamp, 432*a* and visual message metadata 304*d*.

Referring now to FIG. 5, a state diagram illustrating User Interface Content Capture Details in accordance with embodiments of the present invention is shown. FIG. 5 shows the most common states used to capture visual messages 136 based on a video 404 or a snapshot 420. The user interface associated with the most common states illustrated in FIGS. 5-13 is shown in FIGS. 16A-16U.

In the preferred embodiment, upon starting the application 128, a camera screen initial state A 504 is entered. It should be noted that the application 128 can be configured or programmed to start from a different screen or state without deviating from the present invention. Selecting (activating a control in the User Interface) a record control 572 starts recording the camera image 216 as video 404 to a visual message 136 and transitions to state B 520. Selecting (tapping/clicking) the screen 140 in a non-control area of the screen 208 takes a snapshot 420 of the current camera image 216 displayed on the screen 140, and transitions to state D 508. As an alternative to tapping/clicking the screen 140 in a non-control area of the screen 208, a separate "freeze" control may be provided to take the snapshot 420. The screen 140 includes both controls as well as non-control areas of the screen 208. Non-control areas of the screen 208 are areas of the screen 140 that do not include a control. Controls include both hardware buttons as well as software-controlled icons representing defined functions performed by the device 108.

While in state A 504, a microphone in the device, a selection of one of two different cameras, and a flashlight 544 may be selected by the user or participant 104. This is described in more detail with reference to FIG. 16A.

Finally, an import control 584 may be selected to transition to state J 560 to select a video or snapshot to import as part of a visual message 136.

In state B 520, a flashlight in the device may be toggled on or off 556, and non-persistent drawings 592 may be drawn while the video 404 is recording. Non-persistent drawings 592 are drawings 416 that are displayed on the screen 140 only temporarily. Pressing the record control 572 again stops recording the video 404 and transitions to state C 524.

In state C 524, one or more visual messages 136 have been captured, and may include either a video 404 or a snapshot 420. Pressing the record control 572 starts recording a video 404 and transitions to state B 520. Selecting or tapping the screen 140 in a non-control area 208 takes a snapshot 420 and transitions to state D 508. Selecting a send control 594 transitions to state G 532 to select participants 104 to receive the visual message or messages 136. Selecting a save control 596 creates a new chat 536, which then transitions back to state A 504.

In the preferred embodiment, selecting the save control 596 causes the originating device 108a to transmit the visual message or messages 136 to cloud storage 116. Then, at a later time, when a new user or participant 104 is added, the new user or participant 104 is notified of the visual message or messages 136 and the device 108 of the user or participant 104 retrieves the visual message or messages 136 from the cloud storage 116. In other embodiments, selecting the save control 596 causes the originating device 108a to store the visual message or messages 136 to the device storage 252. Then, at a later time, when a user or participant 104 is added, the originating device 108a transmits the visual message or messages 136 directly to the selected participants 532.

Selecting a cancel control 564 discards all captured visual messages 540, which then transitions back to state A 504. While in state C 524, a microphone in the device, a selection of one of two different cameras, and a flashlight 544 may be selected by the user or participant 104. In another embodiment, the send control 594 and the save control 596 may also allow the user of device 108 to select a subset of the captured visual messages 136 to be respectively sent or saved.

In state D 508, a snapshot 420 has been taken. A zoom control 582 zooms the snapshot 420 either in or out. In one embodiment, separate zoom in/zoom out controls are provided in the user interface. In another embodiment, the screen 140 is a touch screen that zooms the snapshot 420 in or out based on either expanding or pinching two fingers on the screen 140. In other embodiments, other forms of control may be used to zoom a screen image 140 or snapshot 420. When drawings 416 are present on the screen while zooming the video 404 or the snapshot 420 or when drawings 416 are drawn on the screen 140 as a result of playing video 404 or audio 408 and after zooming the video 404 or the snapshot 420 the act of zooming preserves an absolute reference between the drawings 416 and a corresponding video 404 or snapshot 420 as well as preserves a line thickness 1620 of the drawings 416 while zooming.

By tapping or selecting the screen in a non-control area 208, the snapshot is deleted 512, and control transitions back to state A 504. As an alternative to tapping/clicking the screen 140 in a non-control area of the screen 208, a separate "unfreeze" control may be provided to delete the snapshot 420 and return to state A 504.

A user or participant 104 may draw on the screen 578 using any suitable pointing device, cursor, finger, or stylus to create one or more freehand drawings 416 on the screen 140, and this will transition control to state E 516. A drawing 416 is started when one of the finger and stylus makes contact with a non-control area of the screen 140 and moves at least a predetermined distance while staying in contact with the screen 140 or the pointing device moves at least the predetermined distance while the pointing device is selected, wherein a drawing 416 is ended when one of the finger and stylus after moving at least the predetermined distance loses contact with the screen 140 or the pointing device is deselected after moving the predetermined distance. The predetermined distance applies to any drawing 416, regardless of how it was drawn or what state the application 128 is in while drawing. The predetermine distance is the minimum distance between two subsequent positions of a finger or pointing device on the screen 140 that can be detected by the device 108. In some embodiments, this corresponds to one physical pixel on the screen 140. In other embodiments this corresponds to one physical point on the screen 140.

While in state D 508, selecting the record control 572 starts recording audio 408 to the snapshot-based visual message 136, and transitions to state F 528. Selecting a save snapshot control 582 transitions from state D 508 to state C 524 to save a snapshot-based visual message 136 without audio 408, text 412, or drawings 416. In addition to selecting the save snapshot control 582, tapping the screen once 568 after state D 508 was entered from state C 524 causes control to transition back to state C 524. Finally, a live annotation session control 586 is available in state D 508 if state D 508 was entered from state A 504. Selecting the live annotation session control 586 transitions from state D 508 to state H 548.

In state E 516, the visual message 136 includes a snapshot 420 and possibly text 412 and one or more drawings 416. Selecting the save snapshot control 582 or tapping the screen once 568 after the previous states were state C 524 and state D 508 transitions to state C 524. Tapping the screen once 568 after the previous states were state A 504 and state D 508 transitions back to state A 504.

While in state E 516, persistent drawings 590 or text 580 may be added to the visual message 136, and either a last drawing or all drawings 576 may be erased from the screen 140 and visual message 136. In a preferred embodiment, a last drawing is erased by selecting an erase control 576 one time, and all drawings are erased by holding down the erase control 576. In other embodiments, erase control 576 may allow a user or participant 104 to selectively erase one or more of the drawings 416 present on the screen 140.

In state F 528, audio 408 is being recorded by the device 108 and the visual message 136 includes a snapshot 420 with audio 408 and possibly text 412 and one or more drawings 416. Selecting the record button 572 while in state F 528 stops the audio recording and transitions to state C 524. While in state F 528, either persistent or non-persistent drawings 590 or text 580 may be added to the visual message 136, and either a last or all drawings 576 may be erased from the screen 140. It is important to note that in state F 528, any drawings erased from the screen 140 are not erased from the visual message 136. In other words, the visual message 136 will include the drawings 416 as well as showing the drawings 416 being erased. In a preferred embodiment, a last drawing is erased by selecting an erase control 576 one time, and all drawings are erased by holding down the erase control 576 as previously described. In other embodiments, erase control 576 may allow a user or participant 104 to selectively erase one or more of the drawings 416 present on the screen 140.

State G 532 allows a user or participant 104 to select one or more participants 104 the visual message or messages 136 will be delivered to. An add participants control 550 is used to add each of the one or more participants 104. Selecting a confirm control 598 creates a new chat 536 and transitions back to state A 504.

In the preferred embodiment, selecting the confirm control 598 causes the originating device 108a to transmit the visual message or messages 136 to cloud storage 116. The user or participant 104 is notified of the visual message or messages 136 and the device 108 of the user or participant 104 retrieves the visual message or messages 136 from the cloud storage 116. In other embodiments, selecting the confirm control 598 causes the originating device 108a to transmit the visual message or messages 136 directly to the selected participants 532. The send control 594 followed by the confirm control 598, and the save control 596, are the mechanisms by which the originating device 108a transmits visual messages 136.

In state H 548, selecting an add parties control 588 allows the user or participant 104 using the device 108 to select one or more parties in live annotation session mode. Selecting a confirm control 598 transitions to state I 552, and selecting a cancel control 564 transitions back to state D 508.

State J 560 allows a user or participant 104 of the device 108 to select media to import for a visual message 136. Selecting the cancel control 564 transitions back to state A 504. Selecting a snapshot to import 546 transitions to state D 508, and selecting a video to import 542 transitions to state C 524. In other embodiments, selecting a video to import 542 may allow a user or participant 104 of the device 108 to take some actions with respect to the video 404 before transitioning to state C 524.

Referring now to FIG. 6, a state diagram illustrating user interface annotation of existing visual message 136 details in accordance with embodiments of the present invention is shown. FIG. 6 shows processes of the present invention involved with adding annotation to existing visual messages 136. Annotation includes any combination of audio 408, text 412, or drawings 416.

State M 704 is a state where a selected visual message 136 is being played and/or displayed. A zoom control 582 zooms the snapshot 420 either in or out. When drawings 416 are present on the screen while zooming the video 404 or the snapshot 420 or when drawings 416 are drawn on the screen 140 as a result of playing video 404 or audio 408 and after zooming the video 404 or the snapshot 420 the act of zooming preserves an absolute reference between the drawings 416 and a corresponding video 404 or snapshot 420 as well as preserves a line thickness 1620 of the drawings 416 while zooming. Selecting an exit control 624 transitions to state K 1204. If the visual message 136 content is played through the end of the visual message 644, or there is no video or audio to be played 656, flow transitions to state N 708 without any intervention required by the user or participant 104 of the device 108. Selecting a pause control 628 also causes a transition to state N 708.

In state N 708, a video and/or audio player application 256 is paused during playback of either a video 404 or a snapshot 420. Selecting a zoom control 582 zooms the snapshot 420 either in or out. When drawings 416 are present on the screen 140 while zooming the paused video 404 or the snapshot 420 the act of zooming preserves an absolute reference between the drawings 416 and a corresponding paused video 404 or snapshot 420 as well as preserves a line thickness 1620 of the drawings 416 while zooming. Selecting an exit control 624 transitions to state K 1204. Selecting a play control 632 transitions flow back to state M 704. Selecting a live annotation session control 586 transitions to state O 604 to select one or more existing participants 104. Selecting an annotation control 636 transitions to state P 608 which activates annotation mode.

In state O 604, selecting the confirm control 598 transitions to state I 552, and selecting cancel control 564 transitions back to state N 708. While in state O 604, an add participants control 550 allows a user or participant 104 to add participants 104.

In state P 608, selecting the annotation cancel control 640 transitions to state N 708, and selecting the record control 572 transitions to state R 616 to record audio 408. Selecting a zoom control 582 zooms the snapshot 420 either in or out. When drawings 416 are present on the screen 140 while zooming the paused video 404 or the snapshot 420 the act of zooming preserves an absolute reference between the drawings 416 and a corresponding paused video 404 or snapshot 420 as well as preserves a line thickness 1620 of the drawings 416 while zooming. A user or participant 104 may draw on the screen 578 using any suitable pointing device, cursor, finger, or stylus to create one or more freehand drawings 416 on the screen 140, and this will transition control to state Q 612. Selecting the save snapshot control 582 exits annotation mode and transitions to state S 620. Text annotations 412 may be deleted by selecting an erase text annotations control 652, and all drawings 416 are erased by selecting the erase all drawings control 576. In other embodiments, erase control 576 may allow a user or participant 104 to selectively erase one or more of the drawings 416 present on the screen 140.

In state Q 612, persistent drawings 590 may be added in addition to text 580 by either drawing on the screen 140 or selecting a text control 580. The last drawing 416 or all drawings 416 are erased by selecting the erase last/all drawings control 576. In other embodiments, erase control 576 may allow a user or participant 104 to selectively erase one or more of the drawings 416 present on the screen 140. Selecting the save snapshot control 582 from state Q 612 exits annotation mode and transitions to state S 620.

In state R 616, audio 408 is being recorded. While audio 408 is being recorded, persistent or non-persistent drawings 590 or text 580 may be added as described previously. An erase last/all drawings control 576 erases either the last or all drawings 416 as described previously. In other embodiments, erase control 576 may allow a user or participant 104 to selectively erase one or more of the drawings 416 present on the screen 140. Selecting the record control 572 while in state R 616 stops recording the audio 408 and exits annotation mode and then transitions to state S 620.

In state S 620, selecting the cancel control 564 or selecting a send or save control 648 (depending on whether there are already participants 104 selected) transitions to state N 708. In state S 620, selecting a send or save control 648 causes the captured visual message 136 to be added to the chat 272.

Referring now to FIG. 7, a state diagram illustrating User Interface Media Player Details in accordance with embodiments of the present invention is shown. FIG. 7 shows principle aspects of the present invention involved with playing visual messages 136 through a video and audio player application 256 on the device 108.

State K 1204 is the initial state of a chat room with a user interface generally corresponding to FIG. 16G. While in state K 1204 the user 104 selecting a visual message 136 from those in the chat room 728 transitions control to state M 704, where the selected message is played/displayed.

From state M 704, selecting the exit control 624 returns control to state K 1204. Selecting either the pause control 628 or if there is no video or audio to be played 732 or playing the content through to the end 736 transitions control to state N 708. Selecting a zoom control 582 zooms the video 404 or the snapshot 420 either in or out. When drawings 416 are present on the screen while zooming the video 404 or the snapshot 420 or when drawings 416 are drawn on the screen 140 as a result of playing video 404 or audio 408 and after zooming the video 404 or the snapshot 420 the act of zooming preserves an absolute reference between the drawings 416 and a corresponding video 404 or snapshot 420 as well as preserves a line thickness 1620 of the drawings 416 while zooming. Swiping a non-control area of the screen 208 in a leftward direction displays a next visual message 136 and begins playing the next visual message 136, if a next visual message 136 is available. Swiping a non-control area of the screen 208 in a rightward direction displays a previous visual message 136 and begins playing the previous visual message 136, if a previous visual message 136 is available. Note that although screen "swiping" is a manual action used with touchscreen displays, any sort of control may be used in lieu of a swiping actions, including selecting or activating one or more hardware controls or soft controls.

From state N 708, either state O 604 or state P 608 may be entered as described with reference to FIG. 6. Selecting a bitmap export control 716 transitions to state Z 712 where the bitmap may be exported to one of a text message, an email, a camera roll, or a file system. The application 128 creates a bitmap including the image and everything displayed on top of the image excluding controls and saves the bitmap to the text storage application 260. The text storage application 260 may be a device 108 clipboard or a device 108 buffer. After the application 128 saves the bitmap to the text storage application 260, the user or participant 104 may include the bitmap into at least one of a text message, email, or document, or save the bitmap to device storage 252 or cloud storage 116.

Selecting the exit control 624 while in state N 708 transitions back to state K 1204. Selecting the play control 632 transitions back to state M 704, and swiping the screen 140 either right 720 or left 724 displays and plays a previous or next visual message 136 as described previously. It should be noted that previous and next visual messages 136 are defined as chronologically before and after, respectively, the current visual message 136. Also, if a visual message 136 includes video 404, video 404 and any drawings 416 are played back. If the visual message 136 includes a snapshot 420, if the visual message 136 includes audio 408 then audio 408 is played back along with any persistent and non-persistent drawings 592. If the visual message 136 includes a snapshot 420, if the visual message 136 includes no audio 408 then any drawings 416 are played back instantly as persistent drawings 590.

Referring now to FIG. 8, a state diagram illustrating User Interface Existing Chat Content Capture Details in accordance with embodiments of the present invention is shown.

In state K 1204, selecting an add new content control 808 transitions to state L 804 where the new content is selected. In state L 804, selecting the cancel control 564 transitions back to state K 1204. Selecting an import media control 808 transitions to state J.

State J 560 allows a user or participant 104 of the device 108 to select media to import for a visual message 136. Selecting the cancel control 564 or selecting a video 404 to import 542 transitions back to state K 1204. Selecting a snapshot to import 546 transitions to state D 508.

In state L 804, upon selecting a capture new content control 808 transitions to state A 504. Selecting the record control 572 starts recording the camera image 216 as video 404 to a visual message 136 and transitions to state B 520. Selecting (tapping/clicking) the screen 140 in a non-control area of the screen 208 takes a snapshot of the current camera image 216 displayed on the screen 140, and transitions to state D 508. The screen 140 includes both controls as well as non-control areas of the screen 208.

While in state A 504, a microphone in the device, a selection of one of two different cameras, and a flashlight 544 may be selected by the user or participant 104. This is described in more detail with reference to FIG. 16A. Finally, a cancel control 564 transitions to state K 1204.

In state B 520, a flashlight in the device may be toggled on or off 556, and non-persistent drawings 592 may be drawn while the video 404 is recording. Non-persistent drawings 592 are drawings 416 that are displayed on the screen 140 only temporarily. Pressing the record control 572 again stops recording the video 404 and transitions to state C 524.

In state C 524, one or more visual messages 136 have been captured, and may include either a video 404 or a snapshot 420. Pressing the record control 572 starts recording a video 404 and transitions to state B 520. Selecting or tapping the screen 140 in a non-control area 208 takes a snapshot 420 and transitions to state D 508. Selecting a send control 594 or save control 596 transitions to state K 1204. Selecting a cancel control 564 discards all captured visual messages 540, which then transitions back to state A 504. While in state C 524, a microphone in the device, a selection of one of two different cameras, and a flashlight 544 may be selected by the user or participant 104. In another embodiment, the send control 594 and the save control 596 may also allow the user 104 of device 108 to select a subset of the captured visual messages 136 to be respectively sent or saved.

In state D 508, a snapshot 420 has been taken. A zoom control 582 zooms the snapshot 420 either in or out. By tapping or selecting the screen in a non-control area 208, the snapshot is deleted 512, and control transitions back to state A 504.

A user or participant 104 may draw on the screen 578 using any suitable pointing device, cursor, finger, or stylus to create one or more freehand drawings 416 on the screen 140, and this will transition control to state E 516. While in state D 508, selecting the record control 572 starts recording audio 408 to the snapshot-based visual message 136, and transitions to state F 528. Selecting a save snapshot control 582 transitions from state D 508 to state C 524 to save a snapshot-based visual message 136 without audio 408, text 412, or drawings 416. Tapping the screen once 568 after state D 508 was entered from state C 524 causes control to transition back to state C 524 and deletes the snapshot 512. Selecting a live annotation control 586 transitions to state O 604 to select one or more existing participants 104.

In state E 516, the visual message 136 includes a snapshot 420 and possibly text 412 and one or more drawings 416. Selecting the save snapshot control 582 or tapping the screen once 568 after the previous states were state C 524 and state D 508 transitions to state C 524. Tapping/selecting the screen once 568 after the previous states were state A 504 and state D 508 transitions back to state A 504.

While in state E 516, persistent drawings 590 or text 580 may be added to the visual message 136, and either a last drawing or all drawings 576 may be erased from the screen 140 and visual message 136. In other embodiments, erase control 576 may allow a user or participant 104 to selectively erase one or more of the drawings 416.

In state F 528, audio 408 is being recorded by the device 108 and the visual message 136 includes a snapshot 420 with audio 408 and possibly text 412 and one or more drawings 416. Selecting the record button 572 while in state F 528 stops the audio recording in transitions to state C 524. While in state F 528, either persistent or non-persistent drawings 590 or text 580 may be added to the visual message 136, and either a last drawing or all drawings 576 may be erased from the screen 140 and visual message 136. In other embodiments, erase control 576 may allow a user or participant 104 to selectively erase one or more of the drawings 416 present on the screen 140.

Referring now to FIG. 9, a state diagram illustrating User Interface Live Annotation Details for a Caller in accordance with embodiments of the present invention is shown. A caller is the initiator of a live annotation session.

In state I 552, if either the callee rejects the call 956 or the caller cancels the call 952, the transition will go back to whichever state the device 108 and application 128 were in prior to the call (most likely states D 508 or N 708, for example). If the callee accepts the request 960, then the call may go through and transitions to state $V_1$ 928 to wait.

In state $V_1$ 928, if either the callee or caller selects a cancel control 564, the transition will go back to whichever state the device 108 and application 128 where in prior to the call. If either visual content is presented to the caller 568 or the callee cancels capture activity 564, the transition will go to state $W_1$ 904 where live annotation session control occurs. Control remains in state $V_1$ 928 while visual content is retrieved when the callee captures new content 964.

In state $W_1$ 904, a live annotation session is ongoing and includes live audio 408, and a live marker 940A or live pointer 940B. Control is returned to state $V_1$ 928 when the callee selects the new snapshot control 944. The caller selecting a new snapshot control 944 causes the application 128 to transition to state $XP_1$ 908, and the caller selecting an end live annotation session control 936 transitions to whatever state the application 128 was in previously to entering live annotation mode.

While in state $W_1$ 904, the marker control 940A and pointer control 940B may be selected. Selecting a save control 948 will create a new visual message 136 comprising an image reference 344 or a snapshot 420, and all drawings 416 including their respective color coding and any text messages 408 present on the screen 140 when the save control 948 is selected. A snapshot 420 is included in the new visual message 136 only when the live annotation session was initiated from the camera screen or when a confirm control 598 was used at least once by either the caller or the callee during the current live annotation session and prior to a save control 948 being selected. The new visual message 136 is added to a new chat 272 if prior to entering state I the application 128 was in state H 548 and previously state D 508 with reference to FIG. 5. In all other cases, the new visual message 136 is added to an existing chat 272.

In state $XP_1$ 908, selecting the cancel control 564 returns control to state $W_1$ 904. Selecting an import media control 808 transitions to snapshot selection state $X_1^*$ 916, and selecting a capture new snapshot control 976 transitions to the camera viewfinder state $X_1$ 924.

From state $X_1^*$ 916, selecting the cancel control 564 transitions back to state $XP_1$ 908, and selecting a snapshot 972 transitions to state $Y_1^*$ 912.

From state $Y_1^*$ 912, selecting the cancel control 564 transitions back to state $X_1^*$ 916, and selecting either a confirm control 598 or a cancel import control 564 transitions to state $W_1$ 904. When a confirm control 598 is selected, the selected snapshot is displayed on the screen 140 of device 128 and also transmitted to the other parties in the live annotation session. While in state $Y_1^*$ 912, selecting the zoom control 582 zooms the snapshot 420 either in or out.

From state $Y_1$ 920, tapping/selecting a non-control area of the screen 568 transitions to state $X_1$ 924. Either selecting the cancel control 564 or the confirm control 598 transitions back to state $W_1$ 904. When a confirm control 598 is selected, the captured snapshot is displayed on the screen 140 of device 128 and also transmitted to the other parties in the live annotation session.

From state $X_1$ 924, tapping/selecting a non-control area of the screen 568 transitions to state $Y_1$ 920. Selecting the cancel control 564 transitions back to state $XP_1$ 908. Finally, the flashlight or front/rear camera may be selected 932 by appropriate controls as previously described.

Referring now to FIG. 10, a state diagram illustrating User Interface Live Annotation Details for a callee in accordance with embodiments of the present invention is shown. A callee is a non-initiating participant 104 of a live annotation session.

In state U 1032, if either the callee rejects the call 1024 or the caller cancels the call 1020, the transition will go back to whichever state the device 108 and application 128 were in prior to the call. If the callee accepts the request 1032, then the call may go through and transitions to state $V_2$ 1028 to wait.

In state $V_2$ 1028, if either the callee or caller selects a cancel control 564, the transition will go back to whichever state the device 108 and application 128 wherein prior to the call. If either visual content is presented to the callee 568 or the caller cancels capture activity 564, the transition will go to state $W_2$ 1004 where live annotation session control occurs. Control remains in state $V_2$ 1028 while visual content is retrieved when the caller captures new content and when the Live Annotation Session is initiated from the camera screen 1036.

In state $W_2$ 1004, a live annotation session is ongoing and includes live audio 408, and a live marker 940A or pointer 940B. Control is returned to state $V_2$ 1028 when the caller selects the new snapshot control 944. The callee selecting the new snapshot control 944 causes the application 128 to transition to state $XP_2$ 1008, and the callee selecting an end live annotation session control 936 transitions to whatever state the application 128 was in previously to entering live annotation mode.

While in state $W_2$ 1004, the marker control 940A and pointer control 940B may be selected. Selecting a save control 948 will create a new visual message 136 comprising an image reference 944 or a snapshot 420, and all drawings 416 including their respective color coding and any text messages 412 present on the screen 140 when the save control 948 is selected. A snapshot 420 is included in the new visual message 136 only when the live annotation session was initiated from the camera screen or when a confirm control 598 was used at least once by either the caller or the callee during the current live annotation session and prior to a save control 948 being selected. The new visual message 136 is added to a new chat 272 if prior to entering state I the application 128 was in state H 548 and previously state D 508 with reference to FIG. 5. In all other cases, the new visual message 136 is added to an existing chat 272.

In state $XP_2$ 1008, selecting the cancel control 564 returns control to state $W_2$ 1004. Selecting an import media control 808 transitions to snapshot selection state $X_2^*$ 1016, and selecting a capture new snapshot control 976 transitions to the camera viewfinder state $X_2$ 1024.

From state $X_2^*$ 1016, selecting the cancel control 564 transitions back to state $XP_2$ 1008, and selecting a snapshot 972 transitions to state $Y_2^*$ 1012.

From state $Y_2^*$ 1012, selecting the cancel control 564 transitions back to state $W_2$ 1004. When a confirm control 598 is selected, the selected snapshot is displayed on the screen 140 of device 128 and also transmitted to the other parties in the live annotation session.

From state $Y_2$ 1020, tapping/selecting a non-control area of the screen 568 transitions to state $X_2$ 1024. Either selecting the cancel control 564 or the confirm control 598 transitions back to state $W_2$ 1004. When a confirm control 598 is selected, the captured snapshot is displayed on the screen 140 of device 128 and also transmitted to the other parties in the live annotation session.

From state $X_2$ 1024, tapping/selecting a non-control area of the screen 568 transitions to state $Y_2$ 1020. Selecting the cancel control 564 transitions back to state $XP_2$ 1008. Finally, the flashlight or front/rear camera may be selected 932 by appropriate controls as previously described.

Referring now to FIG. 11, a state diagram illustrating User Interface Chats Screen Details in accordance with embodiments of the present invention is shown.

In state A 504, if the previous state was not state L 804, a left swipe 720 action in a non-control area of the screen 208 transitions to state AD 1104, which is an initial state for a list of all chats 272 for the user of device 108.

In state AD 1104, selecting the exit control 624 transitions to state A 504. Tapping/selecting the search box 1136 transitions to state AF 1112 in order to perform a search. Selecting a map view control 1116 transitions to state AE 1108, which is a map view of device 108 locations used in a chat 272 selected from state AD 1104. Selecting a desired chat 1120 in state AD 1104 transitions to state K 1204, the chat room initial state. State AD 1104 also includes a current location filter control 1124. Selecting a current location filter control 1124 automatically filters the list of chats 272 based on their location so that only chats that originated within a predefined radius from the current location of the device 108 are shown. A predefined radius may be configured by the user of device 108 or a default radius may be available in the application 128. In other embodiments, a different geometric form or a different algorithm may be used in lieu of a circle of predefined radius.

In state AE 1108, selecting the list view control 1116 transitions back to the chats list in state AD 1104. In the preferred embodiment, the list view control 1116 is the same control as the map view control 1116, and therefore toggles between list view and map view. When a chats visible on map control 1128 is selected, control transitions to state AD 1104. Selecting a desired chat 1120 transitions to state K 1204, and tapping/selecting the search box 1136 transitions to state AF 1112. Selecting a zoom control 582 zooms the map either in or out, and will update the chats 272 that are displayed on the map accordingly so that only those that originated within the map area are displayed.

In state AF 1112, search criteria are entered, including a keyword, location, participant 104 name, or time. The desired search criteria are typed into a text entry box 1144, and an edit/erase entry control 1140 is provided to modify or delete the search criteria information. Selecting a cancel control 564 or a search control 1132 transitions back to state AE 1108 if in map view, and back to state AD 1104 if in list view.

Referring now to FIG. 12, a state diagram illustrating User Interface Chats Room Details in accordance with embodiments of the present invention is shown. FIG. 12 provides a more comprehensive illustration of application 128 and user interface operation involving the chat room initial state, state K 1204.

In state K 1204, selecting the add new content control 808 transitions to state L 804. Selecting an add label control 1236 transitions to state AC 1216, and selecting the exit control 624 transitions to state AD 1104 or state AE 1108 depending on whether state K 1204 was entered from list view or map view, respectively. Selecting an export links to chat control 1224 or selecting an export link to single visual message control 1228 transitions to state AA 1208. Selecting a desired visual message 1252 while in state K 1204 transitions to state M 704. Selecting an enter text message control 1236 transitions to state T 1264. Finally, selecting the replay chat control 1232 transitions to state M* 1220.

When in state M* 1220, reaching the end of the last visual message in the chat 1256 or selecting the exit control 624 transitions to state K 1204. Selecting the pause control 628 transitions to state N 708. Selecting the zoom control 582 zooms the video 404 or the snapshot 420 either in or out. When drawings 416 are present on the screen 140 while zooming the video 404 or the snapshot 420 or when drawings 416 are drawn on the screen 140 as a result of playing video 404 or audio 408 and after zooming the video 404 or the snapshot 420 the act of zooming preserves an absolute reference between the drawings 416 and a corresponding video 404 or snapshot 420 as well as preserves a line thickness 1620 of the drawings 416 while zooming. Because state M* 1220 reflects replay chat mode, while in state M* the application 128 automatically moves to a next visual message 136 and starts playing/displaying the next visual message 136, if a next visual message 136 exists.

In state N 708, selecting the play control 632 (if replay chat 1232 has been previously selected) transitions back to state M* 1220.

State AA 1208 provides link export to a clipboard (or similar text storage application 260), and email, a text message, or some other application or location able to accept a text string via link export. In the preferred embodiment, the exported link is a hyperlink. Selecting a text message or email 1240 transitions to state AB 1212. Selecting either the cancel control 564 or the confirm control 598 transitions back to state K 1204.

State AB 1212 allows a user or participant 104 to select recipients and add anything else, such as text in an email or text in a text message. Selecting the cancel control 564 transitions back to state AA 1208, and selecting the send control 594 transitions back to state K 1204.

State AC 1216 allows a user or participant 104 to enter label text. Selecting the cancel control 564 or the confirm control 598 transitions back to state K 1204. While in state AC 1216, information is typed into a text box 1144, and an edit/erase entry control 1140 is also provided to clear the contents of the text box. Upon selecting the confirm control 598, the chat metadata 328 is also updated based on the text entered in the text box 1144.

State T 1264 allows a user or participant 104 to enter a text message. Selecting the cancel control 564 or the submit control 598 transitions back to state K 1204. While in state T 1264, information is typed into a text box 1144, and an edit/erase entry control 1140 is also provided to clear the contents of the text box. Upon selecting the submit control 598, the text message is submitted to the chat 272.

Referring now to FIG. 13, a state diagram illustrating User Interface Play Exported Link Details in accordance with embodiments of the present invention is shown.

State M 1304 is used for playing back a visual message 136 or the visual messages 136 of a chat 272 based on an exported link. Selecting the pause control 628 transitions to state N 1308. If the link is to a visual message 136, when the visual message 136 has been played 1316 a transition occurs to state N 1308. If the link is to a chat 272, and a last visual message 136 in the chat 272 has been played 1320, a transition occurs to state N 1308. Selecting the zoom control 582 zooms the visual message 136 being played either in or out. Finally, if the link is to a chat 272 when the current visual message 136 has been played, then while in state M 1304 a next visual message 136 is automatically selected and played, if a next visual message 136** is available.

In state N 1308 the video and audio player application 256 is paused. Selecting either the exit control 624, play control 632, or the resume control 1324 transitions back to state M 1304.

Referring now to FIG. 14A, a diagram illustrating Drawing Persistence during Video Playback in accordance with embodiments of the present invention is shown. A playback device 108 plays back visual messages 136. Each visual message includes a visual message start 1404 and a visual message end 1408. When drawings are initially recorded 1416, each pixel or each segment of the drawing 1416 has an associated x, y screen position as well as a timestamp relative to the start of a video being played back 1412. Therefore, a recorded drawing 1416 will include a series of data points including this information. When a receiving device 108 receives a visual message including a video being played back 1412 and a recorded drawing 1416, it would be possible to simply play back the recorded drawing 1416 according to the timestamps recorded for each pixel or segment of the drawing 1416.

The present invention recognizes that receiving users or participants 104 may not know that the visual message 136 includes a recorded drawing 1416, and may not know visually where and when the recorded drawing 1416 will appear on the screen 140. Therefore, receiving users or participants 104 may possibly not notice a recorded drawing 1416 until after the recorded drawing 1416 has disappeared from the screen 140 (since the recorded drawing 1416 is a non-persistent drawing 592). In order to aid in recognition and visibility, the present invention includes embodiments to display a recorded drawing 1416 an extended time before the recorded drawing 1416 starts and after the recorded drawing 1416 ends. In one embodiment, a displayed drawing 1420 is played back early on the screen 140 for an amount of time 1424. In a second embodiment, a displayed drawing 1420 is maintained on the screen 140 for an amount of time 1428. In a third embodiment, a displayed drawing 1420 is played back early on the screen 1424 and maintained on the screen 1428 for an amount of time.

Practically speaking, the amount of time should be no less than 150 milliseconds (ms) in order for a human user 104 to notice the displayed drawing 1420. Additionally the amount of time should not be greater than about 1200 ms in order to not lose context with other drawings or video content.

Referring now to FIG. 14B, a diagram illustrating Drawing Timestamps during Audio Recording in accordance with embodiments of the present invention is shown. A recording device 108 records audio 268a or video 404 to visual messages 136. Each visual message 136 includes a visual message start 1404 and a visual message end 1408. In visual messages 136 where audio or video is being recorded 1432, one or more drawings may be recorded 1436 and, except when video is being recorded, subsequently erased 1440. When drawings are initially recorded 1436, each pixel or segment of the drawing 1436 has an associated x, y screen position as well as a timestamp 1448. Each erased drawing 1440 includes a timestamp for drawing erasure 1444 corresponding to the activation of a drawing erase control 576 by a user or participant 104. Therefore, a visual message 136 including audio or video being recorded 1432, one or more drawings 1436, and one or more erased drawings 1440 includes timestamps relative to the start of the audio or video recording 1452.

Referring now to FIG. 15A, a diagram illustrating Visual Message Display during Chat Replay in accordance with embodiments of the present invention is shown. When a device 108 stores multiple visual messages 136 in a chat 272, and the visual messages 136 do not include either a video 404 or audio 408 and do include either a snapshot 420, a reference to a snapshot 420, or an image reference 424, the present invention includes a feature to aid in visual message 136 viewability and understanding. Video 404 and audio 408 have a display time that is the same as the length of the video 404 or audio 408 recording, and there is no need to display them for any given time period since playback length is determined by the length of the video 404 or audio 408 recording.

A user or participant 104 may select a replay chat control 1232 in order to replay a sequence of visual messages 136 of a chat 272 in chronological order 1508. The chronological order 1508 is based on a creation timestamp 348 for each visual message 136. Activation of the replay chat control 1232 causes the screen 140 to display each visual message 136 on the screen 140 for a predetermined time period 1512. In the preferred embodiment, predetermined time period 1512 is minimum 1 and maximum 5 seconds (s). In another embodiment, the user of device 108 may be able to manually transition to the next visual message without having to wait for a predetermined time. In another embodiment, the predetermined time can be configured by the user or a default may be available in the application 128.

Referring now to FIG. 15B, a diagram illustrating Color Assignment Based on Order of Participant 104 in accordance with embodiments of the present invention is shown. The present invention provides visual message 136 content to users or participants 104 through various means. For example, it is helpful when viewing a screen 140 of a device 108 to identify an original visual message 136 or visual message participant 104 initiating a chat 272 by a predetermined color 1516, and subsequent participants 104 in the order they were added to the chat 272.

In a given chat 272 including four devices 108, participant 104*a* initiates the chat 272. The device 108 corresponding to participant 104*a* assigns color A to participant 0 1516*a*. The next participant 104 added to the chat 272 in chronological order is participant 1 104*b*, and color B is assigned to participant 1 1516*b*. The next participant 104 added to the chat 272 in chronological order is participant 2 104*c*, and color C is assigned to participant 2 1516*c*. Finally, the last participant 104 added to the chat 272 in chronological order is participant 3 104*d*, and color D is assigned to participant 3 1516*d*.

Preferably, the colors used to designate participant 104 order are highly visible colors easily distinguished from each other, such as bright yellow, magenta, and high visibility green. In the preferred embodiment, each visual message 136 displayed on the screen 140 includes an icon including symbology identifying the type of content in the corresponding visual message 136 as well as a color 1516 identifying the order the corresponding participant 104 who created the visual message was added to the chat 272.

Referring now to FIG. 16A, a diagram illustrating Device Screen Contents in State A 504 in accordance with embodiments of the present invention is shown. State A 504 represents the initial state of the device 108 and screen 140 when the application 128 is started. Transitions into or out of state A 504 are shown in more detail in FIGS. 5, 8, and 11. The screen 140 displays the camera image 216, which is whatever the camera 212 is viewing. Therefore, when a user or participant 104 moves the camera 212 the camera image 216 changes accordingly. The other screen elements shown and described are static on the screen 140 and appear in the same place on the screen 140 regardless of the camera image 216.

The screen 140 includes both controls as well as non-control areas of the screen 208. Non-control areas of the screen 208 are areas of the screen 140 that do not include a control. Controls include both hardware buttons as well as software-controlled icons representing defined functions performed by the device 108. The controls include at least one of a microphone control 1604, a switch camera control 1608, a flashlight control 1612, and import control 584, and a record control 572.

The microphone control 1604 toggles between muting and un-muting a microphone 220 associated with the device 108. Devices 108 may not include a microphone 220, however, and in such cases a microphone control 1604 may not be present on the screen 140.

The switch camera control 1608 toggles between a front camera 212 and a rear camera 212 found on many types of portable devices 108. However, in some embodiments, a switch camera control 1608 is not provided for devices 108 having only a single camera 212 or no camera 212.

The flashlight control 1612 toggles between a flashlight 248 in the device 108 turned on or off. A flashlight 248 may be helpful when recording camera images 216 not in good light or in the dark. Devices 108 may not include a flashlight 248, however, and in such cases a flashlight control 1612 may not be present on the screen 140.

The import control 584 is used to import a stored snapshot or video into a visual message 136. This may be helpful for visual messages 136 that will rely on a previously stored snapshot or video.

In state A 504, the record control 572 begins video recording, including audio 408 unless the microphone control 1604 has muting selected. In that case, the record control 572 only records video and possibly optional text messages 412 or drawings 416.

Referring now to FIG. 16B, a diagram illustrating Device Screen Contents in State B 520 with a Non-Persistent Drawing Shown in accordance with embodiments of the present invention is shown. Transitions into or out of state B 520 are shown in more detail in FIGS. 5 and 8. State B 520 represents a state where a user or participant 104 starts recording of a video 404, with or without audio 408, from state A 504. In state B, the screen 140 displays the camera image 216 as well as text messages 412 and one or more non-persistent drawings 592.

Non-persistent drawings 592 are drawings 416 that do not remain on the screen 140, and disappear approximately 200 ms after the last pixel of the drawing 416 is drawn. Non-persistent drawings 592 are helpful by drawing attention to a particular item on the screen 140 without cluttering the screen after the item on the screen 140 has been identified. Each non persistent drawing 592 includes at least a first drawn pixel of the drawing 1624 and a last drawn pixel of the drawing 1628.

In the preferred embodiment, the microphone control 1604 and flashlight control 1612 are displayed on the screen 140 while in state B 520. Additionally, the record control 572 is displayed as well but with a different appearance than in state A 504. Specifically, in the preferred embodiment the record control 572 includes a square graphic representing a stop recording control used with traditional recording equipment.

Referring now to FIG. 16C, a diagram illustrating Device Screen Contents in State C 524 in accordance with embodiments of the present invention is shown. Transitions into or out of state C 524 are shown in more detail in FIGS. 5 and 8. State C 524 represents a state where one or more visual messages 136 have been captured, including but not limited to selecting the record control 572 (stop recording) from state B 520. While in state C 524, the screen displays the camera image 216.

While in state C 524, a user or participant 104 may select either of the microphone control 1604, switch camera control 1608, or flashlight control 1612 as described with respect to state A 504. The record control 572 is also displayed on the screen 140, which will allow additional video recording, including audio unless the microphone 220 is muted by the microphone control 1604.

Central to state C 524 is the display of three controls that take action on the visual message 136. A cancel control 564 cancels all captured visual messages 136 and returns control to state A 504. A send control 594 transitions state C 524 to state G 532 to select users or participants 104 to send the captured visual messages 136 to. Finally, a save control 596 saves the captured visual messages 136 to the device 108 and a new chat is created 536. In another embodiment, the send control 594 and the save control 596 may also allow the user of device 108 to select a subset of the captured visual messages 136 to be respectively sent or saved. In other embodiments, the three controls may be displayed in another way on screen 140. In yet other embodiment, the application 128 may provide access to the respective send, save, or cancel capabilities in a completely different way.

Referring now to FIG. 16D, a diagram illustrating Device Screen Contents in State D 508 in accordance with embodiments of the present invention is shown. Transitions into or out of state D 508 are shown in more detail in FIGS. 5 and 8. State D 508 represents the state when a snapshot 420 has been taken. Most commonly, state D is entered from either states A 504 or C 524 after tapping the screen 140 in a non-control area 208.

In state D 508, a snapshot 1632 is displayed on the screen 140, and not a camera image 216 from the camera 212. From state D 508, audio recording 408 may be initiated by selecting the record control 572. A save snapshot control 582 is also present on the screen 140, which initiates a transition to state C 524 to determine disposition of new snapshot 420.

State D 508 also provides a live annotation session control 586 in order to initiate a live annotation session with other users or participants 104. A live annotation session is an online interactive session between two or more users or participants 104 in contrast to the off-line mode whereby visual messages 136 are transferred to other users or participants 104 and cloud storage 116. Selecting the live annotation session control 586 transitions from state D 508 to state H 548.

Referring now to FIG. 16E, a diagram illustrating Device Screen Contents in State E 516 in accordance with embodiments of the present invention is shown. Transitions into or out of state E 516 are shown in more detail in FIGS. 5 and 8. State E 516 represents the state where a user or participant 104 starts drawing on the screen 140 after taking a snapshot 420, 432 in state D 508. Because the drawings are on top of a snapshot 420, 432, and no audio 408 is being recorded, the drawings are persistent drawings 590. Persistent drawings 590 remain on the screen 140 as long as the corresponding visual message 136 is displayed.

While in state E 516, text messages 412 may be created by selecting a text control 580 and typing text to be displayed as part of the visual message 136. An erase control 576 is also provided to delete the last or all drawings drawn on the screen while in state E 516. In the preferred embodiment, a single tap or selecting erase control 576 will delete only the most recent drawing, and holding down the erase control 576 will delete all drawings 416 made while in state E 516.

Referring now to FIG. 16F, a diagram illustrating Device Screen Contents in State F 528 in accordance with embodiments of the present invention is shown. Transitions into or out of state F 528 are shown in more detail in FIGS. 5 and 8. State F 528 represents the state where a visual message 136 is recorded, which includes a snapshot 420 with audio 408 and optional persistent and non-persistent drawings 590 and/or text 412.

While in state F 528, text messages 412 may be created by selecting a text control 580 and typing text to be displayed as part of the visual message 136. An erase control 576 is also provided to delete the last or all persistent drawings 590 drawn on the screen while in state F 528. In the preferred embodiment, a single tap or selecting erase control 576 will delete only the most recent drawing, and holding down the erase control 576 will delete all drawings made while in state F 528.

The record control 572 is displayed as well but as described in State B 520 for Stop Recording functionality. Specifically, the record control 572 includes a square graphic representing a stop recording control used with traditional recording equipment.

Referring now to FIG. 16G, a diagram illustrating Device Screen Contents in State K 1204 in accordance with embodiments of the present invention is shown. Transitions into or out of state K 1204 are shown in more detail in FIGS. 6-8 and 11-12. State K 1204 represents a state where a chat room is initially displayed. The chat room displays and organizes chat information and visual messages 136 of a selected chat 272.

In the preferred embodiment, the chat room of state K 1204 includes three areas: a top area providing chat identifiers 312 for a selected chat 272, an export links control 1224, and a replay chat control 1232, a center area displaying visual messages 136 of the selected chat 272, and a control area at the bottom of the screen 140.

Each displayed visual message 136 includes a thumbnail image 320 of the visual message 136 including colored icons 1616 and other symbology that identify the type of visual message 136 content as well as order of visual message 136 creation. Each visual message 136 also identifies the name of the participant 104 that created the visual message 136 and the date and time 348 the visual message 136 was created. An export link to single visual message control 1228 is also provided for each visual message 136. In another embodiment, the export link to single visual message control 1228 may not be provided.

In the preferred embodiment, chat identifiers 312 include a chat label 328, a chat date 324*a*, and a chat Geo-location 332, as described with reference to FIG. 3. However, in other embodiments, the same or different chat identifiers 312 are shown. Different chats 272 may have different chat identifiers 312. Touching or selecting a chat label 328, activates the add label control 1236 and transitions to state AC 1216. In another embodiment, the add label control 1236 may be activated in a different way, for instance through a control displayed on the screen 140 in proximity to a chat label 328.

The export links to chat control 1224 creates a unique link to the entire chat 272 (including one or more visual messages 136) in order to allow the exported links 1224 two be sent to other users or participants 104 (or anyone) through a text message or email or embedded in a document. When a recipient 104 clicks on the exported links 1224, the entire chat 272 will be played back.

The replay chat control 1232 allows the user or participant 104 of the device 108 to play back in chronological sequence all visual messages 136 in the chat 272. Therefore, the replay chat control 1232 plays back the current chat 272 on the same device 108 while the export links to chat control 1224 allows a recipient user or participant 104 to play back the current chat 272 on a different device 108 or any other computing device 108.

The control area on the bottom of the screen in state K 1204 includes an exit control 624, a text entry box 1640, and add new content control 808, and an add participants control 550. The exit control 624 transitions from state K 1204 to state AD 1104 or AE 1108. The text entry box 1640 allows entry of a text message label in state AC 1216. The add new content control 808 transitions to state L 804 to add selected new content to a chat 272. The add participants control 550 allows additional users or participants 104 to be added to the current chat 272.

Referring now to FIG. 16H, a diagram illustrating Device Screen Contents in State M 704 with Image Displayed while Audio 408 is Playing and Persistent Drawings 590 Shown in accordance with embodiments of the present invention is shown. Transitions into or out of state M 704 are shown in more detail in FIGS. 6-7 and 12-13. State M 704 represents a state where a selected visual message 136 is being played or displayed while audio is playing 1652 and persistent drawings 590 are shown on the screen 140.

The screen 140 displays an image 1632, which can be either a snapshot 420 or a paused video. A participant 104 name identifies the user or participant 104 who created the visual message 136. An exit control 624 transitions to state K 1204, where the visual messages 136 of the current chat 304 are managed. If previous visual messages are available to view 1644, an indicator is provided on the screen 140. Also, if a next visual message is available to view 1648, an indicator is provided on the screen 140.

Standard playback controls are provided on the screen 140, including a skip to beginning control 1656, a pause control 628, and a skip to end control 1660. The skip to beginning control 1656 moves the playback to the beginning of the recording and pauses the playback. The pause control 628 pauses playback of the current visual message 136 until the pause control 628 is again selected. In the preferred embodiment, the pause control 628 changes to a "play" graphic when paused, and toggles between "play" and "pause" each time it is selected. The skip to end control 1660 moves all playback to the end of the recording for any audio 408, text 412, or persistent drawings 590. An audio playback time track 1664 appears on the screen to show how far playback has progressed relative to the total length of the audio recording. In another embodiment, the skip to beginning control 1656 replays the current visual message 136 on the screen 140 from the beginning of the visual message 136, which will playback any audio 408, text 412, or persistent and non-persistent drawings 590 in the sequence they were recorded.

Referring now to FIG. 16I, a diagram illustrating Device Screen Contents in State M 704 with Image Displayed while Audio is Playing in accordance with embodiments of the present invention is shown. Transitions into or out of state M 704 are shown in more detail in FIGS. 6-7 and 12-13. State M 704 represents a state where a selected visual message 136 is being played or displayed while audio is playing 1652.

The screen 140 displays an image 1632, which can be either a snapshot 420 or a paused video. A participant 104 name identifies the user or participant 104 who created the visual message 136. An exit control 624 transitions to state K 1204, where the visual messages 136 of the current chat 272 are managed. If previous visual messages are available to view 1644, an indicator is provided on the screen 140. Also, if a next visual message is available to view 1648, an indicator is provided on the screen 140.

Standard playback controls are provided on the screen 140, including a skip to beginning control 1656, a pause control 628, and a skip to end control 1660. The skip to beginning control 1656 moves the playback to the beginning of the recording and pauses the playback. The pause control 628 pauses playback of the current visual message 136 until the pause control 628 is again selected. In the preferred embodiment, the pause control 628 changes to a "play" graphic when paused, and toggles between "play" and "pause" each time it is selected. The skip to end control 1660 moves all playback to the end of the recording for any audio 408 An audio playback time track 1664 appears on the screen to show how far playback has progressed relative to the total length of the audio recording. In another embodiment, the skip to beginning control 1656 replays the current visual message 136 on the screen 140 from the beginning of the visual message 136, which will playback any audio 408, text 412, or persistent and non-persistent drawings 590 in the sequence they were recorded.

Referring now to FIG. 16J, a diagram illustrating Device Screen Contents in State M 704 with Video Playing and a Non-Persistent Drawing Shown in accordance with embodiments of the present invention is shown. Transitions into or out of state M 704 are shown in more detail in FIGS. 6-7 and 12-13. State M 704 represents a state where a selected visual message 136 is being played or displayed while a video is playing 1668 and non-persistent drawings 592 are shown on the screen 140.

The screen 140 displays a video 1668 being played, and not an image 1632. A participant 104 name identifies the user or participant 104 who created the visual message 136. An exit control 624 transitions to state K 1204, where the visual messages 136 of the current chat 272 are managed. If previous visual messages are available to view 1644, an indicator is provided on the screen 140. Also, if a next visual message is available to view 1648, an indicator is provided on the screen 140.

Standard playback controls are provided on the screen 140, including a skip to beginning control 1656, a pause control 628, and a skip to end control 1660. The skip to beginning control 1656 moves the playback to the beginning of the recording and pauses the playback. The pause control 628 pauses playback of the current visual message 136 until the pause control 628 is again selected. In the preferred embodiment, the pause control 628 changes to a "play" graphic when paused, and toggles between "play" and "pause" each time it is selected. The skip to end control 1660 moves all playback to the end of the recording. A video playback time track 1636 appears on the screen to show how far video playback has progressed relative to the total length of the video recording. In another embodiment, the skip to beginning control 1656 replays the current visual message 136 on the screen 140 from the beginning of the visual message 136, which will playback any video 404, text 412, or non-persistent drawings 590 in the sequence they were recorded.

Referring now to FIG. 16K, a diagram illustrating Device Screen Contents in State N 708 with Image Displayed, Audio Paused, and Persistent Drawings Shown in accordance with embodiments of the present invention is shown. Transitions into or out of state N 708 are shown in more detail in FIGS. 6-7 and 12-13. State N 708 represents a state where a video and audio player application 256 in the device 108 is paused.

The screen 140 displays an image 1632, which can be either a snapshot 420 or a paused video. A participant 104 name identifies the user or participant 104 who created the visual message 136. An exit control 624 transitions to state K 1204, where the visual messages 136 the current chat 272 are managed. If previous visual messages are available to view 1644, an indicator is provided on the screen 140. Also, if a next visual message is available to view 1648, an indicator is provided on the screen 140.

State N 708 also provides a bitmap export control 716, which allows a bitmap of the image 1632 on the screen 140 to be exported to state Z 712 where the bitmap may be included in a text message, email, camera roll, file system, or other information transfer medium.

Standard playback controls are provided on the screen 140, including a skip to beginning control 1656, a play control 632, and a skip to end control 1660. The skip to beginning control 1656 moves the playback to the beginning of the recording. The play control 632 resumes playback of the current visual message 136. In the preferred embodiment, the play control 632 changes to a "pause" graphic when played, and toggles between "play" and "pause" each time it is selected. The skip to end control 1660 moves all playback to the end of the recording. An audio playback time track 1664 appears on the screen to show how far audio playback has progressed relative to the total length of the audio recording.

State N 708 also provides a live annotation session control 586 in order to initiate a live annotation session with other users or participants 104. A live annotation session is an online interactive session between two or more users or participants 104 in contrast to the off-line mode whereby visual messages 136 are transferred to other users or participants 104 and cloud storage 116. Selecting the live annotation session control 586 transitions from state N 708 to state O 604 to select participants 104.

State N 708 also provides an annotation control 636 in order to allow the user or participant 104 using the device 108 to add additional audio 408, text 412, or drawing 416 annotation to the image 1632. Selecting the annotation control 636 transitions from state N 708 to state P 608.

Referring now to FIG. 16L, a diagram illustrating Device Screen Contents in State N with Image Displayed and Audio Paused in accordance with embodiments of the present invention is shown. Transitions into or out of state N 708 are shown in more detail in FIGS. 6-7 and 12-13. State N 708 represents a state where a video and audio player application 256 in the device 108 is paused.

FIG. 16L represents similar content is shown in FIG. 16K, except that no persistent drawings 590 are included in the visual message 136. The rest of the controls displayed on the screen 140 are identical to those described with reference to FIG. 16K.

Referring now to FIG. 16M, a diagram illustrating Device Screen Contents in State N 708 with Image Displayed, without Audio, and with Persistent Drawings Shown in accordance with embodiments of the present invention is shown. Transitions into or out of state N 708 are shown in more detail in FIGS. 6-7 and 12-13.

FIG. 16M represents similar content is shown in FIG. 16K, except that no audio 408 is included in the visual message 136. Therefore no playback controls 628, 632, 1656, or 1660 are provided, and no playback track 1636 or 1664 is provided. The rest of the controls displayed on the screen 140 are identical to those described with reference to FIG. 16L.

Referring now to FIG. 16N, a diagram illustrating Device Screen Contents in State N 708 with Image Displayed and without Audio in accordance with embodiments of the present invention is shown. Transitions into or out of state N 708 are shown in more detail in FIGS. 6-7 and 12-13. State N 708 represents a state where a video and audio player application 256 in the device 108 is paused.

FIG. 16N represents similar content is shown in FIG. 16M, except that persistent drawings 590 are included in the visual message 136. The controls displayed on the screen 140 are identical to those described with reference to FIG. 16M.

Referring now to FIG. 16O, a diagram illustrating Device Screen Contents in State P 608 in accordance with embodiments of the present invention is shown. Transitions into or out of state O 608 are shown in more detail in FIGS. 6-7 and 12-13. State O 608 represents a state where annotation mode is activated from state N 708. Thus, a recipient 104 in response to activating the annotation mode may create a new visual message 136 based on an image 1632 and with other annotations optionally added.

In state P 608, an image 1632 is displayed on the screen 140. A record control 572 is present in order to initiate audio 408 recording, and an annotation control 636 is provided on the screen 140 in order to cancel annotation mode. The user of device 108 can cancel annotation mode and return to state N 708 only while in state P 608.

Referring now to FIG. 16P, a diagram illustrating Device Screen Contents in State Q 612 with Persistent Drawings 590 shown in accordance with embodiments of the present invention is shown. Transitions into or out of state Q 612 are shown in more detail in FIG. 6. State Q 612 represents a state entered once a user or participant 104 starts drawing on the screen 140 while in state P 608.

While in state Q 612, text messages 412 may be created by selecting a text control 580 and typing text to be displayed as part of the visual message 136. An erase control 576 is also provided to delete the last or all drawings drawn on the screen. In the preferred embodiment, a single tap or selecting erase control 576 will delete only the most recent drawing, and holding down the erase control 576 for at least a minimum amount of time will delete all drawings made while in state Q 612.

State Q 612 also includes a save snapshot control 582, which saves the image 1632 with any annotations to the device 108.

Referring now to FIG. 16Q, a diagram illustrating Device Screen Contents in State R 616 with Persistent Drawings 590 shown in accordance with embodiments of the present invention is shown. Transitions into or out of state R 616 are shown in more detail in FIG. 6. State R 616 represents a state entered once a user or participant 104 starts recording audio 408 while an annotation mode P 608.

While in state R 616, text messages may be created by selecting a text control 580 and typing text to be displayed as part of the visual message 136. Also, while in state R 616, persistent and non-persistent drawings 590 can be drawn on the screen. An erase control 576 is also provided to delete the last or all drawings drawn on the screen. In the preferred embodiment, a single tap or selecting erase control 576 will delete only the most recent drawing, and holding down the erase control 576 for at least a minimum amount of time will delete all drawings made while in state R 616. In other embodiments, control 576 may allow a user or participant 104 to selectively erase one or more of the drawings present on the screen.

State R 616 also includes a record control 572, which ends audio 408 recording to the device 108. Also, the participant name of the user or participant 104 that created the visual message 136 is also shown on the screen 140.

Referring now to FIG. 16R, a diagram illustrating Device Screen Contents in States $W_1$ 904, $W_2$ 1004 with persistent drawings 590 shown in accordance with embodiments of the present invention is shown. Transitions into or out of states $W_1$ 904, $W_2$ 1004 are shown in more detail in FIGS. 9 and 10. States $W_1$ 904, $W_2$ 1004 represent states entered once a user or participant 104 has selected live annotation mode through state I 552.

States $W_1$ 904, $W_2$ 1004 include a marker control 940A and a pointer control 940B, although the market control and pointer control may be combined into a single control with toggle states. The marker control 940A places a visual marker at a location on the screen designated by a pointing device, a cursor, a finger, or stylus. The pointer control 940B displays a visual pointer on the screen which may be moved by the user or participant 104 and real time without leaving a graphic on the screen in addition to the moving pointer. The pointer is also moved by a pointing device, a cursor, a finger, or a stylus.

States $W_1$ 904, $W_2$ 1004 also includes an end live annotation session control 936, which when selected transitions from states $W_1$ 904, $W_2$ 1004 back to whichever state was used to enter live annotation session mode. States $W_1$ 904, $W_2$ 1004 further includes a save control 948, which saves all annotations made in live annotation session mode to the device 108. States W₁ 904, W₂ 1004 additionally includes a new snapshot control 944, which transitions to one of states XP₁ 908 and XP₂ 1008. This is described in more detail in FIGS. 9 and 10.

An erase control 576 is also provided to delete the last or all drawings drawn on the screen. In the preferred embodiment, a single tap or selecting erase control 576 will delete only the most recent drawing 416, and holding down the erase control 576 will delete all drawings 416 made while in states W₁ 904, W₂ 1004.

Referring now to FIG. 16S, a diagram illustrating Device Screen Contents in State AD 1104 in accordance with embodiments of the present invention is shown. Transitions into or out of state AD 1104 is shown in more detail in FIGS. 11 and 12. State AD 1104 represents a state whereby all available chats 272 are present in list form. After selecting a desired chat 272 from the list in state AD 1104, state K 1204 is entered.

State AD 1104 displays the chats 272 organized is a list, with each chat 272 identified by a thumbnail image 320, a creation timestamp 348, a Chat Geo-location 332, and names of a number of participants 104 in the chat 272. In the preferred embodiment, chats 272 are listed in chronological order based on the time of the last visual message 136 or text message that was added to the chat 272.

State AD 1104 also includes an exit control 624 to return to state K 1204, and a map/list view control 1116 that toggles between list view in state AD 1104 and map view in state AE 1108. Also available is a current location filter control 1684.

Referring now to FIG. 16T, a diagram illustrating Device Screen Contents in State AE 1108 in accordance with embodiments of the present invention is shown. Transitions into or out of state AE 1108 is shown in more detail in FIG. 11. State AE 1108 represents a state whereby all available chats 272 are present in map form. After selecting a desired chat 272 from the list in state AE 1108, state K 1204 is entered.

Map view displays a map 1676 on the screen 140, with each chat 272 that originated within the area of map identified on the map 1676. Any suitable commercial software application may use to provide the map function, including GOGGLE MAPS.

State AE 1108 also includes an exit control 624 to return to state K 1204, and a map/list view control 1116 that toggles between list view in state AD 1104 and map view in state AE 1108.

Referring now to FIG. 16U, a diagram illustrating Device Screen Contents in State A 504 if Transitioning from State L 804 in accordance with embodiments of the present invention is shown. Transitions between states A 504 and State L 804 are shown in more detail in FIG. 8.

The microphone control 1604 toggles between muting and un-muting a microphone 220 in the device 108. Devices 108 may not include a microphone 220, however, and in such cases a microphone control 1604 may not be present on the screen 140.

The switch camera control 1608 toggles between a front camera 212 and a rear camera 212 found on many types of portable devices 108. However, in some embodiments, a switch camera control 1608 is not provided for devices 108 having only a single camera 212.

The flashlight control 1612 toggles between a flashlight 248 in the device 108 turned on or off. A flashlight 248 may be helpful when recording camera images 216 not in good light or in the dark. Devices 108 may not include a flashlight 248, however, any such cases a flashlight control 1612 may not be present on the screen 140.

State A 504, if transitioning from State L 804, also includes a cancel control 564, which returns control to state K 1204. The record control 572 allows the user of device 108 to start video recording.

Although specific control embodiments have been described herein, it should be readily recognized that any alternative embodiment including selecting or activating multiple controls or different types of controls than illustrated/described covered by the present invention. However, the preferred embodiment of the present invention includes throughout concepts of control consolidation and control context where the specific meaning of a control depends on the state from which the control is activated and what has previously occurred prior to selecting the control. Limiting the number of controls in this way has several benefits: a simpler screen providing more space to display video and snapshots, simpler user or participant 104 training, and the ability to include more functionality in devices 108 having reduced size screens 140.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A device, comprising: a processor;
a screen for displaying visual information; and
a memory, coupled to the processor, comprising:
an application configured to perform at least one of record, transmit, receive, play, display, and group visual messages, each visual message comprising:
at least one of a video, a snapshot, a reference to the video, and a reference to the snapshot, wherein in response to the visual message comprises the video or the snapshot, the video or the snapshot are recorded as part of an original video or snapshot visual message;
at least one of a drawing, audio content, a reference to the drawing, and a reference to the audio content, wherein in response to the visual message comprising the drawing or the audio content, the drawing or audio content are not embedded in the video or the snapshot and are recorded as part of a visual message; and
at least one of a timestamp corresponding to a point-in-time when the visual message was recorded, a time reference within the video, a Global Positioning System coordinate of a device that recorded the visual message, a user ID of a user that recorded the visual message, a participant ID associated with the user ID, or a reference to the timestamp, GPS coordinate, user ID, and participant ID;
wherein in response to the visual message comprises one or more references, each of the one or more references comprises one of a pointer to a storage location and an identifier,
wherein when a received visual message comprises the video or a reference to the video and one or more drawings, while the video is playing on the screen the application displays and maintains each of the one or more drawings on the screen for an amount of time not related to a duration of the video before the one or more drawings is removed from the screen,
wherein when playing a visual message:

in response to one of the user performing a left swipe on the screen or the user selecting a left swipe control the application plays a next visual message in chronological order in response to the next visual message exists; and in response to one of the user performing a right swipe on the screen or the user selecting a right swipe control the application plays a previous visual message to the current visual message in chronological order in response to the previous visual message exists.

2. The device of claim 1, further comprising:
a microphone for recording audio,
wherein while audio is being recorded to a visual message the application records timestamps in the visual message for all drawings created or erased relative to the start of the audio recording.

3. The device of claim 1, wherein the application is further configured to:
provide a replay control to responsively play all visual messages that are part of a group in chronological order, wherein the application displays visual messages not comprising audio or video and comprising one of a snapshot, a reference to a snapshot, and an image reference on a replaying device for a predetermined time period before a next visual message is played, wherein the device is a replaying device when receiving and playing a visual message, wherein in response to the visual message comprises an image reference, the image reference comprises a reference to original snapshot content displayed on the screen when playing a visual message or original video content displayed on the screen when playing the visual message and while the video is not playing.

4. The device of claim 1, further comprising:
a camera providing a camera image, wherein the video comprises a capture of the camera image over time, wherein the snapshot comprises a point-in time capture of the camera image, wherein while the video is being recorded, wherein in response to the visual message comprises one or more drawings the application records timestamps in the visual message for all drawings created, relative to the start of the video recording.

5. The device of claim 4, further comprising:
device storage,
wherein the application displays the camera image on the screen, wherein the screen comprises one or more controls and non-control areas, wherein in response to the user selecting a record control the application starts recording a video from the camera image, wherein in response to the user selecting an import control the application either imports a snapshot from the device storage and responsively displays the snapshot on the screen or imports a video, wherein the user selecting the screen in a non-control area a first time or selecting a freeze control causes the application to capture a snapshot from the camera image and responsively display the snapshot on the screen, wherein in response to the user selecting the screen in a non-control area a second time or respectively selecting an unfreeze control the application removes the snapshot from the screen and displays the camera image, wherein the freeze control and unfreeze control are one of the same or different controls.

6. The device of claim 5, wherein the user selecting the screen or a control comprises one of clicking on the screen or a control with a pointing device, or touching the screen or a control with one of a finger or stylus, wherein the application identifies when the screen has been tapped and one of the finger, the stylus and the pointing device has drawn on the screen; and differentiates between screen tap and drawing on the screen.

7. The device of claim 6, wherein in response to the device captures or imports the snapshot, the user selects a save snapshot control without drawing on the screen to save only the snapshot as the visual message, a record control records at least one of audio or drawings with the snapshot as the visual message, and the save snapshot control after drawing on the screen without first activating a different control records the drawings on the screen with the snapshot as the visual message, wherein in response to the user selects a live annotation control the application starts a live annotation session based on the captured or imported snapshot.

8. The device of claim 5, wherein in response to playing a visual message comprising a drawing and a video or a reference to a video, during playback of the visual message and while the video is playing the application displays the drawing 150 to 1,200 milliseconds prior to a first timestamp and maintains displaying the drawing 150 to 1,200 milliseconds after a last timestamp, wherein the first timestamp corresponds to a first drawn pixel of the drawing and the last timestamp corresponds to a last drawn pixel of the drawing, wherein timestamps of the drawing are referenced to the beginning of the video.

9. The device of claim 2, wherein a user creates the drawings freehand on the screen using one of a finger, a stylus, and a pointing device, wherein a drawing is started when one of the finger or stylus makes contact with a non-control area of the screen and moves at least a predetermined distance while staying in contact with the screen or the pointing device moves at least the predetermined distance while the pointing device is selected, wherein a drawing is ended when one of the finger or stylus after moving at least the predetermined distance loses contact with the screen or the pointing device is deselected after moving the predetermined distance.

10. The device of claim 9, wherein an image comprises snapshot content displayed on the screen when playing a visual message or video content displayed on the screen when the visual message comprises video while the video is not playing, wherein when drawings are present on the screen while zooming the image or the video or when drawings are drawn on the screen after zooming the image or the video the act of zooming preserves an absolute reference between the drawings and a corresponding image or video as well as preserves a line thickness of the drawings while zooming.

11. The device of claim 9, wherein when playing a visual message and, in response to the visual message comprises audio or video while one or more of audio or video is not playing, an annotation control is provided on the screen, wherein in response to the user selecting the annotation control:
in response to the user selecting a save snapshot control without drawing on the screen, the application saves an image reference and one of all, some, or none of the drawings displayed on the screen as a new visual message;
in response to the user selecting a record control, the application records as a new visual message at least one of audio and new drawings with the image reference and with one of all, some, or none of the drawings present on the screen when the record control is selected; and in response to the user selecting the save snapshot control after drawing on the screen without first selecting another control, the application records as a new visual message the new drawings on the screen with the image reference and with one of all, some, or none of the drawings present on the screen when the save snapshot control is selected, wherein each drawing that is one or more of saved or recorded as part of the new visual message is saved or recorded together with a color coding that is associated with the drawing, wherein the color coding is assigned to the drawing when the drawing is originally created, wherein an image reference comprises a reference to an image, wherein in response to the image is related to a video then the reference to the image comprises a combination of a reference to an original video visual message comprising the original video or a reference to the original video and a timestamp measured from the beginning of the video to when a playing of the video was paused, automatically paused, or paused and the playing had not yet started, wherein in response to the image is related to a snapshot then the reference to the image comprises a reference to an original snapshot visual message comprising the original snapshot or a reference to the original snapshot.

12. The device of claim 1, the device further comprising a text storage application providing temporary storage for text strings, wherein when playing a visual message and in response to the visual message comprises one or more of audio or video while audio or video is not playing, in response to the user selects a bitmap export control, the application creates a bitmap comprising the image and everything displayed on top of the image excluding controls and saves the bitmap to the text storage application, wherein the text storage application comprises one or more of a device clipboard or a device buffer.

13. The device of claim 12, wherein in response to the application saves the bitmap to the text storage application, the user includes the bitmap into at least one of a text message, email, or document, or saves the bitmap to device storage.

14. The device of claim 12, wherein in response to the user selecting a link export control, the application creates a hyperlink to the visual message or a group of visual messages associated with the link export control and saves the hyperlink to the text storage application.

15. The device of claim 14, wherein after the application saves the hyperlink to the text storage application, the user includes the hyperlink into at least one of a text message, email, and document.

16. The device of claim 15, wherein in response to the user selecting the hyperlink the application plays the visual message or the group of visual messages associated with the hyperlink.

17. The device of claim 1, wherein the application is further configured to:

create a plurality of chats, each chat of the plurality of chats comprising one or more visual messages that have been assigned a common group ID when each of the one or more visual messages were recorded, wherein each chat of the plurality of chats comprises at least one chat identifier, comprising:
a chat ID;
a thumbnail image;
a time and date when the chat started, corresponding to the time and date associated with a first original video or snapshot visual message in the chat in chronological order;
a chat label, in response to a label has been assigned to the chat;
a location, corresponding to a Global Positioning System coordinate associated with the first original video or snapshot visual message; and
names of chat participants;
display the plurality of chats in the reverse chronological order of chat activity; and select a chat from the plurality of chats based on one or more chat identifiers.

18. The device of claim 17, wherein the application is further configured to:

assign a unique predefined color to each of one or more participants in a chat based on the order each participant of the one or more participants was added to the chat;
draw using only the unique predefined color corresponding to a participant that is drawing; and
preserve the same unique predefined colors in all devices in order to assign the same color to the same chat participant within the chat.

19. The device of claim 18, wherein the application is further configured to: assign an icon to each visual message in a chat that identifies the type of content in the visual message, wherein in response to a visual message contains an image reference, the application: assigns the unique predefined color associated with the chat participant that recorded the visual message to the icon; and
when any information about the visual message is displayed, displays the icon in a way that allows the user to associate the icon with the visual message and the information.

20. The device of claim 1, wherein when playing a visual message and in response to the visual message comprises one or more of audio or video while audio or video is not playing:

in response to the user selecting a live annotation session control, the application sends a live annotation request notification comprising the image reference to one or more selected chat participants,
wherein in response to each of the selected chat participants accepting the live annotation request the device of the corresponding chat participant responsively retrieves from the device storage or cloud storage a visual message corresponding to the image reference and subsequently and responsively displays on the screen the image related to the image reference,
wherein in response to at least one of the selected chat participants accepting the live annotation request, at least one of a drawing, a pointer, and audio is exchanged live and in real-time between the devices that are part of the live annotation session.

21. The device of claim 20, wherein a user of each device that is part of a live annotation session at any time during the session one or more of draws on the device screen, uses a pointer on the device screen, or chooses between drawing and using the pointer, wherein selecting between drawing and using the pointer comprises selecting a marker control and a pointer control, respectively, or selecting a single toggle-marker-pointer control, wherein for each drawing that is drawn on the screen of a participating device the participating device transmits coordinates of each pixel or each segment of the drawing relative to the image in real-time to all other participating devices, wherein upon the participating devices receiving the coordinates of each pixel or segment of the drawing, the application displays a drawing on the respective receiving device screen based on the received drawing coordinates relative to the image, wherein when using the pointer, no drawing is drawn on the device screen of the participant using the pointer but instead an area where one of a finger, a stylus, and a pointing device makes contact with a non-control area of the screen is highlighted as long as the contact with the screen is maintained, wherein when the pointer is used, the coordinates of the area where one of the finger, the stylus, and the pointing device makes contact with a non-control area of the screen of the device using the pointer relative to the image are transmitted in real-time to all other participating devices, wherein upon the participating devices receiving the coordinates of the pointer the application highlights a corresponding area based on the received coordinates and relative to the image on the corresponding device screen for as long as the coordinates do not change or for a predefined period after they have changed, wherein on the participating device transmitting the coordinates, the coordinates are normalized to the size of the image on the transmitting device before being transmitted, wherein on participating devices receiving the normalized coordinates the normalized coordinates are denormalized based on the size of the image on the receiving device, wherein the participating device transmitting the coordinates transmits information about the size of the image on the transmitting device together with the coordinates, wherein on participating devices receiving the coordinates, the received coordinates are scaled based on the received information about the size of the image on the transmitting device and the size of the image on the receiving device.

22. The device of claim 21, wherein in response to a live annotation session participant selecting a save control during a live annotation session, the device corresponding to the participant creates a new visual message comprising one of an image reference or an original snapshot, and all drawings comprising their respective color coding and any text messages present on the screen when the user selects the save control, wherein controls displayed on the screen when the save control is selected are not included in a new visual message, wherein an image reference is included in the new visual message except when a new snapshot is captured or imported during the current live annotation session and prior to the save control being selected, wherein the new visual message is added to a same chat or assigned to a same group of visual messages that the visual message that was displayed when the live annotation session was initiated belongs to.

23. The device of claim 20, wherein during the live annotation session in response to a live annotation session participant selecting a new snapshot control, the session is put on hold, wherein a live annotation session on hold displays a corresponding message to each participant and allows live audio between all participants, wherein a participant who activated the new snapshot control imports a snapshot or captures a new snapshot from the camera image and confirms the selection.

24. The device of claim 23, wherein in response to confirming the selection, the application transmits the imported snapshot or new snapshot to the other session participants and cloud storage, and each device in the live annotation session displays the received snapshot and resumes the live annotation session.

25. A non-transitory computer readable storage medium configured to store instructions that when executed cause a processor to perform:
at least one of recording, transmitting, receiving, playing, displaying, and grouping visual messages on a device comprising the processor, each visual message comprising:
at least one of a video, a snapshot, a reference to the video, and a reference to the snapshot, wherein in response to the visual message comprises the video or the snapshot, the video or the snapshot are recorded as part of an original video or snapshot visual message;
at least one of a drawing, audio content, a reference to the drawing, and a reference to the audio content, wherein in response to the visual message comprises the drawing or the audio content, the drawing or the audio content are not embedded in the video or the snapshot and are recorded as part of the visual message; and
at least one of a timestamp corresponding to a point-in-time when the visual message was recorded, a time reference within the original video, a Global Positioning System coordinate of a device that recorded the visual message, a user ID of a user that recorded the visual message, a participant ID associated with the user ID, or a reference to the timestamp, GPS coordinate, user ID, or participant ID;
wherein in response to the visual message comprises one or more references, each of the one or more references comprises one of a pointer to a storage location and an identifier,
wherein in response to a received visual message comprises the video or a reference to the video and one or more drawings, while the video is playing on a screen of the device the application displays and maintains each of the one or more drawings on the screen for an amount of time not related to a duration of the video before the one or more drawings is removed from the screen,
wherein when playing a visual message:
in response to one of the user performing a left swipe on the screen or the user selecting a left swipe control the non-transitory computer readable storage medium plays a next visual message in chronological order in response to the next visual message exists; and
in response to one of the user performing a right swipe on the screen or the user selecting a right swipe control the non-transitory computer readable storage medium plays a previous visual message to the current visual message in chronological order in response to the previous visual message exists.

26. The non-transitory computer readable storage medium of claim 25, wherein the device further comprises a microphone for recording audio,
wherein while audio is being recorded to a visual message the non-transitory computer readable storage medium records timestamps in the visual message for all drawings created or erased relative to the start of the audio recording.

27. The non-transitory computer readable storage medium of claim 25, wherein the non-transitory computer readable storage medium is further configured to:
provide a replay control to responsively play all visual messages that are part of a group in chronological order, wherein the non-transitory computer readable storage medium displays visual messages not comprising audio or video and comprising one of a snapshot, a reference to a snapshot, and an image reference on a replaying device for a predetermined time period before a next visual message is played, wherein the device is a replaying device when receiving and playing a visual message, wherein in response to the visual message comprises an image reference, the image reference comprises a reference to original snapshot content displayed on the screen when playing a visual message or original video content displayed on the screen when playing the visual message and while the video is not playing.

28. The non-transitory computer readable storage medium of claim 25, wherein the device further comprises:
a camera providing a camera image, wherein the video comprises a capture of the camera image over time, wherein the snapshot comprises a point-in time capture of the camera image, wherein while the video is being recorded, wherein in response to the visual message comprises one or more drawings the non-transitory computer readable storage medium records timestamps in the visual message for all drawings created, relative to the start of the video recording.

29. The non-transitory computer readable storage medium of claim 28, wherein the device further comprises:
device storage,
wherein the non-transitory computer readable storage medium displays the camera image on the screen, wherein the screen comprises one or more controls and non-control areas, wherein in response to the user selecting a record control the non-transitory computer readable storage medium starts recording a video from the camera image, wherein in response to the user selecting an import control the non-transitory computer readable storage medium either imports a snapshot from the device storage and responsively displays the snapshot on the screen or imports a video, wherein the user selecting the screen in a non-control area a first time or selecting a freeze control causes the non-transitory computer readable storage medium to capture a snapshot from the camera image and responsively display the snapshot on the screen, wherein in response to the user selecting the screen in a non-control area a second time or respectively selecting an unfreeze control the non-transitory computer readable storage medium removes the snapshot from the screen and displays the camera image, wherein the freeze control and unfreeze control are one of the same or different controls.

30. The non-transitory computer readable storage medium of claim 29, wherein the user selecting the screen or a control comprises one of clicking on the screen or a control with a pointing device, or touching the screen or a control with one of a finger or stylus, wherein the non-transitory computer readable storage medium identifies when the screen has been tapped and one of the finger, the stylus and the pointing device has drawn on the screen; and differentiates between screen tap and drawing on the screen.

31. The non-transitory computer readable storage medium of claim 30, wherein in response to the device captures or imports the snapshot, the user selects a save snapshot control without drawing on the screen to save only the snapshot as the visual message, a record control records at least one of audio or drawings with the snapshot as the visual message, and the save snapshot control after drawing on the screen without first activating a different control records the drawings on the screen with the snapshot as the visual message, wherein in response to the user selects a live annotation control the application starts a live annotation session based on the captured or imported snapshot.

32. The non-transitory computer readable storage medium of claim 29, wherein in response to playing a visual message comprising a drawing and a video or a reference to a video, during playback of the visual message and while the video is playing the non-transitory computer readable storage medium displays the drawing 150 to 1,200 milliseconds prior to a first timestamp and maintains displaying the drawing 100 to 1,200 milliseconds after a last timestamp, wherein the first timestamp corresponds to a first drawn pixel of the drawing and the last timestamp corresponds to a last drawn pixel of the drawing, wherein timestamps of the drawing are referenced to the beginning of the video.

33. The non-transitory computer readable storage medium of claim 26, wherein a user creates the drawings freehand on the screen using one of a finger, a stylus, and a pointing device, wherein a drawing is started when one of the finger or stylus makes contact with a non-control area of the screen and moves at least a predetermined distance while staying in contact with the screen or the pointing device moves at least the predetermined distance while the pointing device is selected, wherein a drawing is ended when one of the finger or stylus after moving at least the predetermined distance loses contact with the screen or the pointing device is deselected after moving the predetermined distance.

34. The non-transitory computer readable storage medium of claim 33, wherein an image comprises snapshot content displayed on the screen when playing a visual message or video content displayed on the screen when the visual message comprises video while the video is not playing, wherein when drawings are present on the screen while zooming the image or the video or when drawings are drawn on the screen after zooming the image or the video the act of zooming preserves an absolute reference between the drawings and a corresponding image or video as well as preserves a line thickness of the drawings while zooming.

35. The non-transitory computer readable storage medium of claim 33, wherein when playing a visual message and, in response to the visual message comprises one or more of audio or video while audio or video is not playing, an annotation control is provided on the screen, wherein in response to the user selecting the annotation control:
in response to the user selecting a save snapshot control without drawing on the screen, the non-transitory computer readable storage medium saves an image reference and one of all, some, or none of the drawings displayed on the screen as a new visual message;
in response to the user selecting a record control, the non-transitory computer readable storage medium records as a new visual message at least one of audio and new drawings with the image reference and with one of all, some, or none of the drawings present on the screen when the record control is selected; and
in response to the user selecting the save snapshot control after drawing on the screen without first selecting another control, the non-transitory computer readable storage medium records as a new visual message the new drawings on the screen with the image reference and with one of all, some, or none of the drawings present on the screen when the save snapshot control is selected, wherein each drawing that is saved or recorded as part of the new visual message is saved or recorded together with a color coding that is associated with the drawing, wherein the color coding is assigned to the drawing when the drawing is originally created, wherein an image reference comprises a reference to an image, wherein in response to the image is related to a video then the reference to the image comprises a combination of a reference to an original video visual message comprising the original video or a reference to the original video and a timestamp measured from the beginning of the video to when the playing of the video was paused, automatically paused, or was on pause and the playing had not yet started or been started, wherein in response to the image is related to a snapshot then the reference to the image comprises a reference to an original snapshot visual message comprising the original snapshot or a reference to the original snapshot.

36. The non-transitory computer readable storage medium of claim 25, the device further comprising a text storage application providing temporary storage for text strings, wherein when playing a visual message and in response to the visual message comprises one or more of audio or video while audio or video is not playing, in response to the user selects a bitmap export control, the non-transitory computer readable storage medium creates a bitmap comprising the image and everything displayed on top of the image excluding controls and saves the bitmap to the text storage application, wherein the text storage application comprises one or more of a device clipboard or a device buffer.

37. The non-transitory computer readable storage medium of claim 36, wherein in response to the non-transitory computer readable storage medium saves the bitmap to the text storage application, the user includes the bitmap into at least one of a text message, email, or document, or saves the bitmap to device storage.

38. The non-transitory computer readable storage medium of claim 36, wherein in response to the user selecting a link export control, the non-transitory computer readable storage medium creates a hyperlink to the visual message or a group of visual messages associated with the link export control and saves the hyperlink to the text storage application.

39. The non-transitory computer readable storage medium of claim 38, wherein after the non-transitory computer readable storage medium saves the hyperlink to the text storage application, the user includes the hyperlink into at least one of a text message, email, and document.

40. The non-transitory computer readable storage medium of claim 39, wherein in response to the user selecting the hyperlink the non-transitory computer readable storage medium plays the visual message or the group of visual messages associated with the hyperlink.

41. The non-transitory computer readable storage medium of claim 25, wherein the non-transitory computer readable storage medium is further configured to:

create a plurality of chats, each chat of the plurality of chats comprising one or more visual messages that have been assigned a common group ID when each of the one or more visual messages were recorded, wherein each chat of the plurality of chats comprises at least one chat identifier, comprising:
a chat ID;
a thumbnail image;
a time and date when the chat started, corresponding to the time and date associated with a first original video or snapshot visual message in the chat in chronological order;
a chat label, in response to a label has been assigned to the chat;
a location, corresponding to a Global Positioning System coordinate associated with the first original video or snapshot visual message; and
names of chat participants;
display the plurality of chats in the reverse chronological order of chat activity; and select a chat from the plurality of chats based on one or more chat identifiers.

42. The non-transitory computer readable storage medium of claim 36, wherein the non-transitory computer readable storage medium is further configured to: assign a unique predefined color to each of one or more participants in a chat based on the order each participant of the one or more participants was added to the chat;

draw using only the unique predefined color corresponding to a participant that is drawing; and
preserve the same unique predefined colors in all devices in order to assign the same color to the same chat participant within the chat.

43. The non-transitory computer readable storage medium of claim 42, further comprising:

assigning an icon to each visual message in a chat that identifies the type of content in the visual message,
wherein in response to a visual message contains an image reference, the non-transitory computer readable storage medium:
assigns the unique predefined color associated with the chat participant that recorded the visual message to the icon; and
when any information about the visual message is displayed, displays the icon in a way that allows the user to associate the icon with the visual message and the information.

44. The non-transitory computer readable storage medium of claim 25, wherein when playing a visual message and in response to the visual message comprises one or more of audio or video while audio or video is not playing:

in response to the user selecting a live annotation session control, the non-transitory computer readable storage medium further comprising:
sending a live annotation request notification comprising the image reference to one or more selected chat participants,
wherein in response to each of the selected chat participants accepting the live annotation request the device of the corresponding chat participant responsively retrieves from the device storage or cloud storage a visual message corresponding to the image reference and subsequently and responsively displays on the screen the image related to the image reference,
wherein in response to at least one of the selected chat participants accepting the live annotation request, at least one of a drawing, a pointer, and audio is exchanged live and in real-time between the devices that are part of the live annotation session.

45. The non-transitory computer readable storage medium of claim 44, wherein a user of each device that is part of a live annotation session at any time during the session one or more of draws on the device screen, uses a pointer on the device screen, or chooses between drawing and using the pointer, wherein selecting between drawing and using the pointer comprises selecting a marker control and a pointer control, respectively, or selecting a single toggle-marker-pointer control, wherein for each drawing that is drawn on the screen of a participating device the participating device transmits coordinates of each pixel or each segment of the drawing relative to the image in real-time to all other participating devices, wherein upon the participating devices receiving the coordinates of each pixel or segment of the drawing, the non-transitory computer readable storage medium further comprising:

displaying a drawing on the respective receiving device screen based on the received drawing coordinates relative to the image, wherein when using the pointer, no drawing is drawn on the device screen of the participant using the pointer but instead an area where one of a finger, a stylus, and a pointing device makes contact with a non-control area of the screen is highlighted as long as the contact with the screen is maintained, wherein when the pointer is used, the coordinates of the area where one of the finger, the stylus, and the pointing device makes contact with a non-control area of the screen of the device using the pointer relative to the image are transmitted in real-time to all other participating devices, wherein upon the participating devices receiving the coordinates of the pointer the non-transitory computer readable storage medium highlights a corresponding area based on the received coordinates and relative to the image on the corresponding device screen for as long as the coordinates do not change or for a predefined period after they have changed, wherein on participating device transmitting the coordinates, the coordinates are normalized to the size of the image on the transmitting device before being transmitted, wherein on participating devices receiving the normalized coordinates the normalized coordinates are denormalized based on the size of the image on the receiving device, wherein the participating device transmitting the coordinates transmits information about the size of the image on the transmitting device together with the coordinates, wherein on participating devices receiving the coordinates, the received coordinates are scaled based on the received information about the size of the image on the transmitting device and the size of the image on the receiving device.

46. The non-transitory computer readable storage medium of claim 45, wherein in response to a live annotation session participant selecting a save control during a live annotation session, the device corresponding to the participant creates a new visual message comprising one of an image reference or a snapshot, and all drawings comprising their respective color coding and any text messages present on the screen when the user selects the save control, wherein controls displayed on the screen when the save control is selected are not included in a new visual message, wherein an image reference is included in the new visual message except when a new snapshot is captured or imported during the current live annotation session and prior to the save control being selected, wherein the new visual message is added to a same chat or assigned to a same group of visual messages that the visual message that was displayed when the live annotation session was initiated belongs to.

47. The non-transitory computer readable storage medium of claim 44, wherein during the live annotation session in response to a live annotation session participant selecting a new snapshot control, the session is put on hold, wherein a live annotation session on hold displays a corresponding message to each participant and allows live audio between all participants, wherein a participant who activated the new snapshot control imports a snapshot or captures a new snapshot from the camera image and confirms the selection.

48. The non-transitory computer readable storage medium of claim 47, wherein in response to confirming the selection, the non-transitory computer readable storage medium further comprising:

transmitting the imported snapshot or new snapshot to the other session participants and cloud storage, and each device in the live annotation session displays the received snapshot and resumes the live annotation session.

49. A method, comprising:

creating an original video or snapshot visual message, by a device comprising a processor and a memory, coupled to the processor, the memory comprising:

an application configured to record, transmit, and receive visual messages, the original video or snapshot visual message comprising:

at least one of an original video, an original snapshot, a reference to the video, and a reference to the snapshot;

at least one of a drawing, audio content, a reference to the drawing, and a reference to the audio content, wherein in response to the visual message comprises the drawing or the audio content, the drawing or audio content are not embedded in the video or the snapshot and are recorded as part of the original visual message; and at least one of a timestamp corresponding to a point-in-time when the original visual message was recorded, a time reference within the original video, a Global Positioning System coordinate of a device that recorded the original visual message, a user ID of a user that recorded the original visual message, a participant ID associated with the user ID, or a reference to the timestamp, GPS coordinate, user ID, and participant ID;

wherein in response to the visual message comprises one or more references, each of the one or more references comprises one of a pointer to a storage location or an identifier, transmitting the original video or snapshot visual message to another device; and receiving a first derived video or snapshot visual message derived from the original video or snapshot visual message from the other device, wherein the first derived video or snapshot visual message comprises a reference to the original video or original snapshot and at least one of audio, text, or one or more drawings, wherein the first derived video or snapshot visual message does not include the original video or original snapshot, wherein when playing a visual message:

in response to one of the user performing a left swipe on the screen or the user selecting a left swipe control the application plays a next visual message in chronological order in response to the next visual message exists; and in response to one of the user performing a right swipe on the screen or the user selecting a right swipe control the application plays a previous visual message to the current visual message in chronological order in response to the previous visual message exists.

50. The method of claim 49, further comprising:

creating a second derived video or snapshot visual message derived from the first derived video or snapshot visual message, wherein the second derived video or snapshot visual message comprises a reference to the original video or original snapshot and at least one of audio, text, or one or more drawings, wherein the video or snapshot visual message does not include the original video or original snapshot; and transmitting the second derived video or snapshot visual message to another device.

51. A visual message, comprising:

at least one of an original video, an original snapshot, a reference to the video, and a reference to the snapshot;

at least one of a drawing, audio content, a reference to the drawing, and a reference to the audio content, wherein in response to the visual message comprises the drawing or the audio content, the drawing or the audio content are separable from other visual message content without impacting original characteristics of either the original video or original snapshot and are recorded as part of the original visual message; and at least one of a timestamp corresponding to a point-in-time when the original visual message was recorded, a time reference within the original video, a Global Positioning System coordinate of a device that recorded the original visual message, a user ID of a user that recorded the original visual message, a participant ID associated with the user ID, or a reference to the timestamp, GPS coordinate, user ID, and participant ID, wherein in response to the visual message comprises one or more references, each of the one or references comprises one of a pointer to a storage location or an identifier, wherein when a received visual message comprises the video or a reference to the video and one or more drawings, while the video is playing on a device screen the device displays and maintains each of the one or more drawings on the screen for an amount of time not related to a duration of the video before the one or more drawings is removed from the screen, wherein when playing a visual message:

in response to one of the user performing a left swipe on the screen or the user selecting a left swipe control an application plays a next visual message in chronological order in response to the next visual message exists; and in response to one of the user performing a right swipe on the screen or the user selecting a right swipe control the application plays a previous visual message to the current visual message in chronological order in response to the previous visual message exists.

* * * * *